US012737342B2

(12) United States Patent
Li et al.

(10) Patent No.: US 12,737,342 B2
(45) Date of Patent: Sep. 15, 2026

(54) METHODS, ARCHITECTURES, APPARATUSES AND SYSTEMS DIRECTED TO BLOCKCHAIN-ENABLED MODEL STORAGE, SHARING AND DEPLOYMENT FOR SUPPORTING DISTRIBUTED LEARNING

(71) Applicant: InterDigital Patent Holdings, Inc., Wilmington, DE (US)

(72) Inventors: Xu Li, Plainsboro, NJ (US); Chonggang Wang, Princeton, NJ (US); Paul Russell, Lawrence, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/282,495

(22) PCT Filed: Mar. 15, 2022

(86) PCT No.: PCT/US2022/020301

§ 371 (c)(1),
(2) Date: Sep. 15, 2023

(87) PCT Pub. No.: WO2022/197650

PCT Pub. Date: Sep. 22, 2022

(65) Prior Publication Data

US 2024/0045851 A1 Feb. 8, 2024

Related U.S. Application Data

(60) Provisional application No. 63/161,194, filed on Mar. 15, 2021.

(51) Int. Cl.
*G06F 16/23* (2019.01)
*H04L 9/00* (2022.01)

(52) U.S. Cl.
CPC ................ *G06F 16/23* (2019.01); *H04L 9/50* (2022.05)

(58) Field of Classification Search
CPC ............. G06F 16/23; G06F 16/25; H04L 9/50
See application file for complete search history.

(56) References Cited

U.S. PATENT DOCUMENTS 7,877,511 B1 1/2011 Berger et al.
10,299,128 B1 5/2019 Suthar et al.
(Continued)

FOREIGN PATENT DOCUMENTS

CN 107924389 A 4/2018
CN 109617787 A 4/2019
(Continued)

OTHER PUBLICATIONS

"3rd Generation Partnership Project; Technical Specification Group Services and System Aspects;5G System (5GS) Location Services (LCS); Stage 2 (Release 16)", 3GPP TS 23.273 V16.3.0, Mar. 2020, 94 pages.

(Continued)

*Primary Examiner* — Merilyn P Nguyen
(74) *Attorney, Agent, or Firm* — Julian F. Santos

(57) ABSTRACT

Procedures, methods, architectures, apparatuses, systems, devices, and computer program products directed to blockchain-enabled model storage, sharing and deployment for supporting federated learning are provided. Among the methods is a method directed to blockchain-enabled storage of distributed learning data that may include receiving information indicating a blockchain storage request, including information associated with a distributed learning task; obtaining information identifying one or more blockchains based on a blockchain storage solution, wherein the blockchain storage solution is based on the information indicating a blockchain storage request; determining blockchain-related instructions based on the blockchain storage solution, (Continued)

wherein the blockchain-related instructions comprise at least some of the information identifying one or more blockchains; and transmitting the blockchain-related instructions to a plurality of distributed participant nodes.

20 Claims, 28 Drawing Sheets

(56) References Cited

U.S. PATENT DOCUMENTS

| | | | |
|---|---|---|---|
| 10,554,407 | B1 * | 2/2020 | Greco .................. G06F 16/178 |
| 10,630,485 | B2 | 4/2020 | Zinder |
| 10,713,100 | B2 | 7/2020 | Shi et al. |
| 10,789,597 | B2 | 9/2020 | Brashers et al. |
| 10,795,977 | B2 | 10/2020 | Salomon |
| 10,884,810 | B1 | 1/2021 | Verma et al. |
| 11,200,569 | B1 | 12/2021 | James et al. |
| 12,192,275 | B2 * | 1/2025 | Viswanathan ...... H04L 67/1074 |
| 2015/0081470 | A1 | 3/2015 | Westphal |
| 2016/0292672 | A1 | 10/2016 | Fay et al. |
| 2018/0096323 | A1 | 4/2018 | Baber et al. |
| 2018/0121909 | A1 | 5/2018 | Christidis et al. |
| 2018/0225640 | A1 * | 8/2018 | Chapman ............ G06Q 20/401 |
| 2019/0034922 | A1 | 1/2019 | Castinado et al. |
| 2019/0182254 | A1 | 6/2019 | Christidis et al. |
| 2019/0188699 | A1 | 6/2019 | Thibodeau et al. |
| 2019/0199700 | A1 | 6/2019 | Abramowitz |
| 2019/0236562 | A1 * | 8/2019 | Padmanabhan ......... H04L 63/00 |
| 2019/0238486 | A1 | 8/2019 | Zizka |
| 2019/0251199 | A1 | 8/2019 | Klianev |
| 2019/0278852 | A1 | 9/2019 | Jayachandran et al. |
| 2019/0280878 | A1 | 9/2019 | Xia |
| 2019/0325532 | A1 * | 10/2019 | Torrenegra ......... G06Q 10/1053 |
| 2019/0349742 | A1 | 11/2019 | Kim et al. |
| 2019/0356641 | A1 * | 11/2019 | Isaacson ............ G06Q 30/0625 |
| 2019/0372834 | A1 | 12/2019 | Patil et al. |
| 2019/0373521 | A1 | 12/2019 | Crawford |
| 2019/0379754 | A1 | 12/2019 | Krishnaswamy |
| 2020/0007513 | A1 | 1/2020 | Gleichauf |
| 2020/0022201 | A1 | 1/2020 | Ross et al. |
| 2020/0034839 | A1 | 1/2020 | Soundararajan et al. |
| 2020/0092084 | A1 | 3/2020 | Maroney et al. |
| 2020/0143466 | A1 | 5/2020 | Wu et al. |
| 2020/0151686 | A1 | 5/2020 | Komandur et al. |
| 2020/0187022 | A1 | 6/2020 | Ross et al. |
| 2020/0193292 | A1 | 6/2020 | Weng et al. |
| 2020/0195495 | A1 | 6/2020 | Parker et al. |
| 2020/0219045 | A1 * | 7/2020 | Kikinis ............. G06Q 20/3672 |
| 2020/0374974 | A1 | 11/2020 | Sun et al. |
| 2020/0387893 | A1 | 12/2020 | Maim |
| 2020/0396065 | A1 * | 12/2020 | Gutierrez-Sheris .......................... H04L 9/3297 |
| 2021/0067339 | A1 | 3/2021 | Schiatti et al. |
| 2021/0075610 | A1 | 3/2021 | Covaci et al. |
| 2021/0126771 | A1 | 4/2021 | Bae et al. |
| 2021/0136042 | A1 | 5/2021 | Wang et al. |
| 2021/0160312 | A1 | 5/2021 | Yang |
| 2021/0176038 | A1 * | 6/2021 | Bortnikov ............. H04L 9/0894 |
| 2021/0303713 | A1 * | 9/2021 | Sreedhar .............. H04L 9/3247 |
| 2021/0320926 | A1 | 10/2021 | Shina et al. |
| 2021/0406871 | A1 | 12/2021 | Ravinathan et al. |
| 2022/0172180 | A1 | 6/2022 | Komiyama |
| 2022/0337436 | A1 | 10/2022 | Beaudet et al. |
| 2023/0206199 | A1 | 6/2023 | Chua et al. |
| 2023/0245117 | A1 | 8/2023 | Higgins et al. |

FOREIGN PATENT DOCUMENTS

| | | | |
|---|---|---|---|
| CN | 109714752 | A | 5/2019 |
| CN | 110024357 | A | 7/2019 |
| CN | 110351388 | A | 10/2019 |
| CN | 110619317 | A | 12/2019 |
| CN | 110915245 | A | 3/2020 |
| CN | 111052120 | A | 4/2020 |
| CN | 111226199 | A | 6/2020 |
| CN | 111885133 | A | 11/2020 |
| CN | 112434280 | A | 3/2021 |
| WO | WO 2019032968 | A1 | 2/2019 |
| WO | WO 2019213775 | A1 | 11/2019 |
| WO | WO 2019217428 | A1 | 11/2019 |
| WO | WO 2020030936 | A1 | 2/2020 |
| WO | WO 2022006320 | A1 | 1/2022 |
| WO | WO 2022006324 | A1 | 1/2022 |
| WO | WO 2022006361 | A1 | 1/2022 |

OTHER PUBLICATIONS

"Permissioned Distributed Ledger (PDL); Application Scenarios", ETSI GR PDL 003 V1.1.1 (Dec. 2020), 38 pages.
"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, (Mar. 2020), 107 pages.
English Language Abstract, Chinese Publication No. 110619317, Dec. 27, 2019, 1 page.
"3rd Generation Partnership Project; Technical Specification Group Services and System Aspects; Policy and charging control framework for the 5G System (5GS); Stage 2 (Release 16)", 3GPP TS 23.503 V16.4.1, Apr. 2020, 115 pages.
"3rd Generation Partnership Project; Technical Specification Group Services and System Aspects; System architecture for the 5G System (5GS); Stage 2 (Release 16)", 3GPP TS 23.501 V16.4.0, Mar. 2020, 430 pages.
"3rd Generation Partnership Project; Technical Specification Group Services and System Aspects; Study on application layer support for Factories of the Future in 5G network; (Release 17)", 3GPP TR 23.745 V0.8.0, May 2020, 36 pages.
English Language Abstract, Chinese Publication No. 111885133, Nov. 3, 2020, 1 page.
"3rd Generation Partnership Project; Technical Specification Group Services and System Aspects; 5G System (5GS) Location Services (LCS); Stage 2 (Release 16)", 3GPP TS 23.273 V16.0.0, Jun. 2019, 86 pages.
Qiong Zhang et al.: "Demo: A Blockchain Based Protocol for Federated Learning", IEEE 28th International Conference on Network Protocols (ICNP), Oct. 13, 2020, 2 pages.
"3rd Generation Partnership Project; Technical Specification Group Services and System Aspects; Procedures for the 5G System (5GS); Stage 2 (Release 16)", 3GPP TS 23.502 V16.4.0, Mar. 2020, 213 pages.
Lu Yunlong et al: "Blockchain and Federated Learning for 5G Beyond", IEEE Network, IEEE Service Center, vol. 35, No. 1, Dec. 20, 2020, 8 pages.
"3rd Generation Partnership Project; Technical Specification Group Services and System Aspects; Study on application layer support for Unmanned Aerial Systems (UAS); (Release 17)", 3GPP TR 23.755 V0.7.0, Apr. 2020, 19 pages.
"O-RAN Architecture Description", O-RAN.WG1.O-RAN—Architecture-Description-v02.00, version 02.00.07, O-RAN Alliance, Jul. 2020.
"3rd Generation Partnership Project; Technical Specification Group Services and System Aspects; Architecture enhancements for 5G System (5GS) to support network data analytics services (Release 16)", 3GPP TS 23.288 V16.3.0, Mar. 2020, 62 pages.
3rd Generation Partnership Project; Technical Specification Group Services and System Aspects; Study on support of the 5GMSG Service; (Release 17), 3GPP TR 23.700-24 V0.1.0, Aug. 2019, 13 pages.
"Guidelines on writing a CR", 3GPP Tdoc S1-220008, 3GPP TSG SA1#97e, e-meeting, Feb. 14-24, 2022, 12 pages.
English translation of CN 112434280 A, 18 pages.
English Translation of CN110351388 A, 21 pages.
CN109714752 A English Translation dated Jan. 22, 2026.
CN109617787A English Translation dated Jan. 22, 2026.

* cited by examiner

| Key Techniques in Each Step: | 1 | 2 | 3 | 4 | 5 |
|---|---|---|---|---|---|
| Cryptography | Yes | Yes | | | |
| Hashing | Yes | | Yes | | |
| Merkle Tree | | | Yes | | |
| Distributed Ledgers | | | | | Yes |
| P2P Networking | | Yes | Yes | Yes | Yes |
| Consensus Protocol | | | | Yes | |

General Workflow of a Blockchain System

5G System Architecture

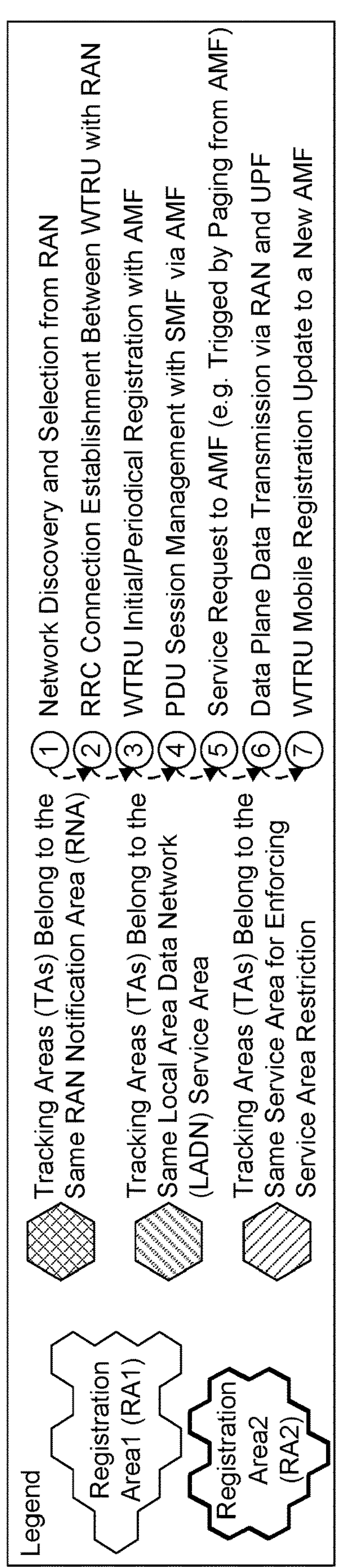
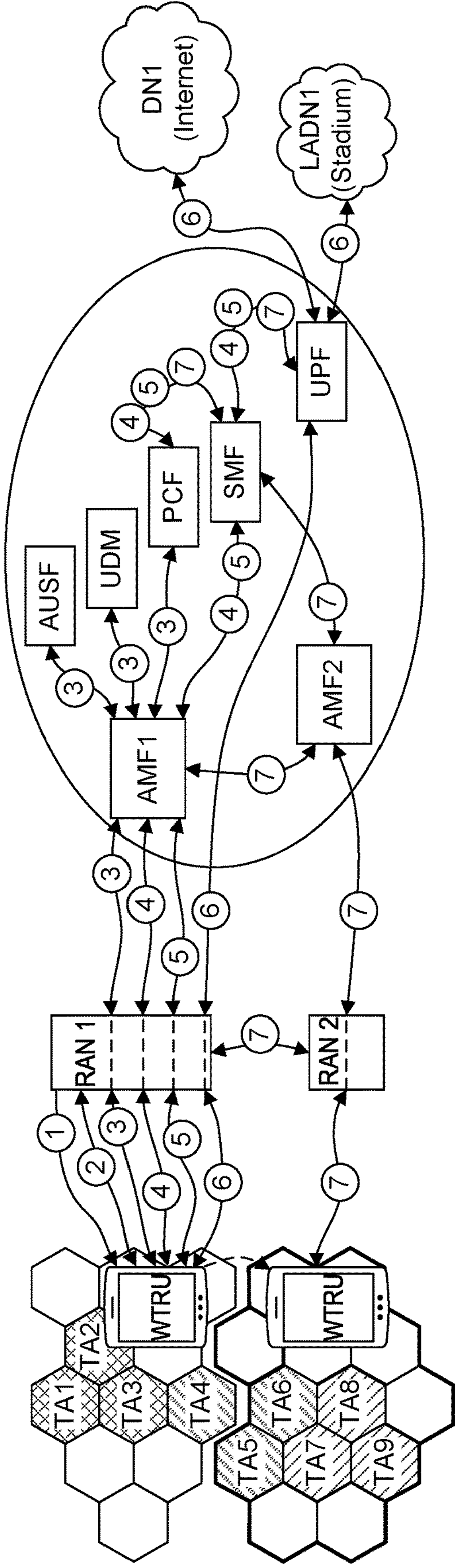
General Procedures in 5G System Architecture
FIG. 5

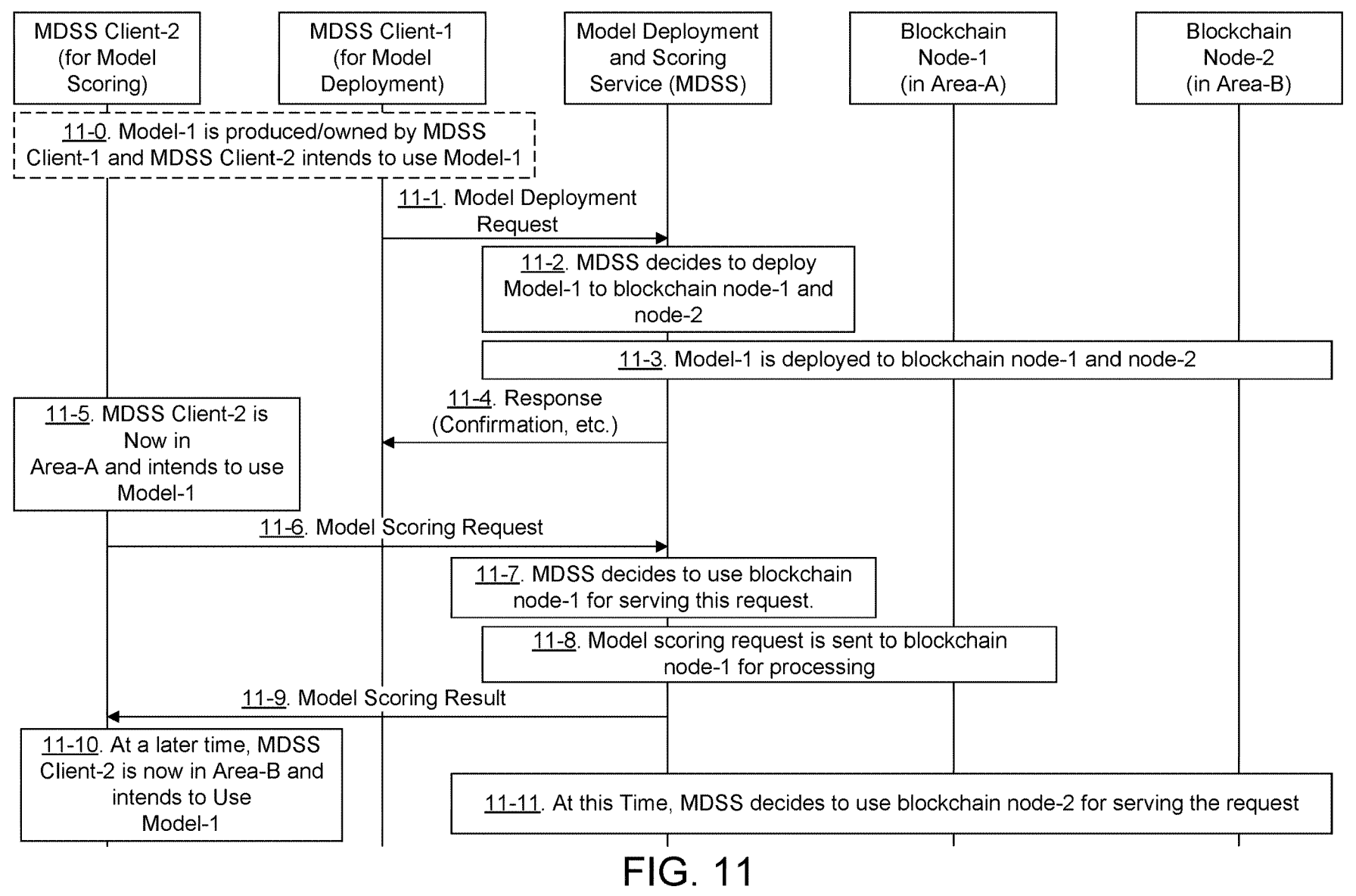

MDSS Client-2 (for Model Scoring)

MDSS Client-1 (for Model Deployment)

Model Deployment and Scoring Service (MDSS)

Blockchain Node-1 (in Area-A)

Blockchain Node-2 (in Area-B)

11-0. Model-1 is produced/owned by MDSS Client-1 and MDSS Client-2 intends to use Model-1

11-1. Model Deployment Request 11-2. MDSS decides to deploy Model-1 to blockchain node-1 and node-2

11-3. Model-1 is deployed to blockchain node-1 and node-2

11-4. Response (Confirmation, etc.)

11-5. MDSS Client-2 is Now in Area-A and intends to use Model-1

11-6. Model Scoring Request 11-7. MDSS decides to use blockchain node-1 for serving this request.

11-8. Model scoring request is sent to blockchain node-1 for processing 11-9. Model Scoring Result 11-10. At a later time, MDSS Client-2 is now in Area-B and intends to Use Model-1

11-11. At this Time, MDSS decides to use blockchain node-2 for serving the request

FIG. 11

METHODS, ARCHITECTURES, APPARATUSES AND SYSTEMS DIRECTED TO BLOCKCHAIN-ENABLED MODEL STORAGE, SHARING AND DEPLOYMENT FOR SUPPORTING DISTRIBUTED LEARNING

CROSS-REFERENCE TO RELATED APPLICATIONS

This application is a U.S. National Stage Application under 35 U.S.C. § 371 of International Patent Application No. PCT/US2022/020301, filed 15 Mar. 2022, which claims the benefit of U.S. Provisional Application No. 63/161,194 filed 15 Mar. 2021; which is incorporated herein by reference. This application is related to (i) International Application No. PCT/US2021/039967, filed 30 Jun. 2021, which claims priority to U.S. Provisional Patent Application No. 63/045,835, filed 30 Jun. 2020; and International Application No. PCT/US2021/039971, filed 30 Jun. 2021, which claims priority to U.S. Provisional Patent Application No. 63/045,857, filed 30 Jun. 2020; each of which is incorporated herein by reference.

BACKGROUND

This application is related to wired and/or wireless communications, including, for example, methods, architectures, apparatuses and systems directed to blockchain-enabled model storage, sharing and deployment for supporting federated learning.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 5 illustrates various procedures capable of being carried out in a 5GS;

FIG. 11 illustrates an example procedure of model deployment and scoring service (MDSS) enabled model deployment and scoring for supporting client mobility;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
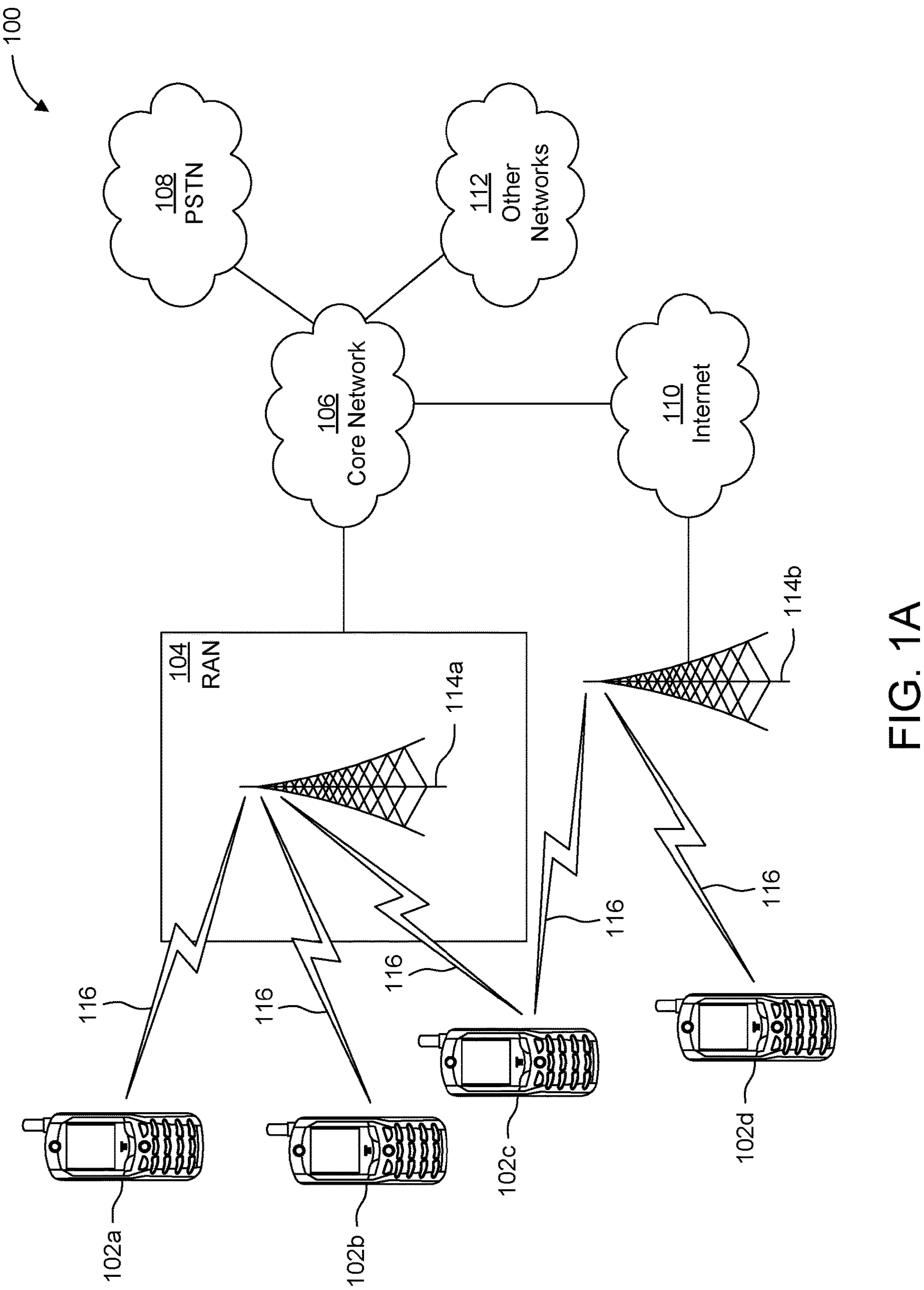
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
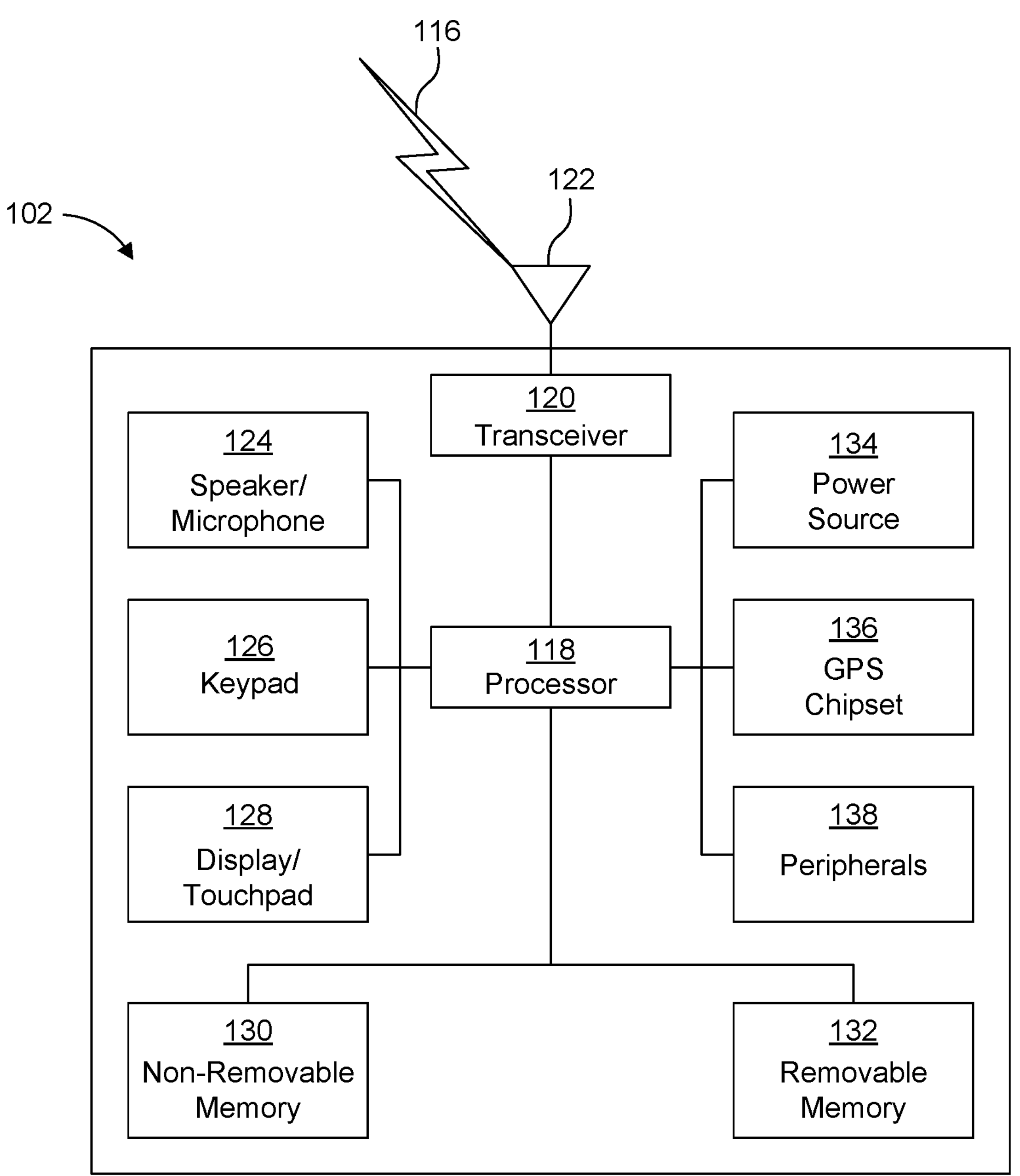
FIG. 1B is a system diagram illustrating an example wireless transmit/receive unit (WTRU) that may be used within the communications system illustrated in FIG. TA.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
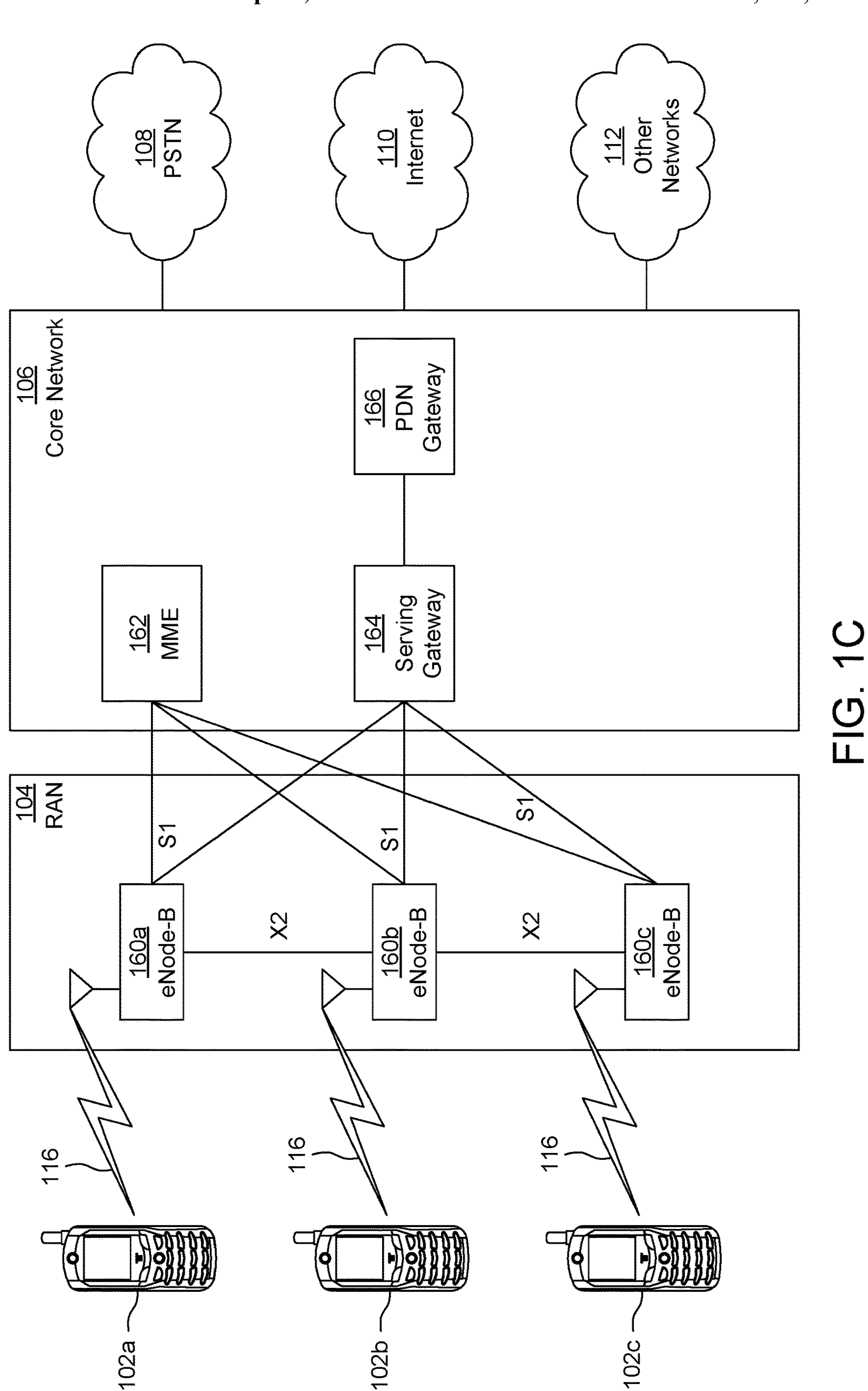
FIG. 1C is a system diagram illustrating an example radio access network (RAN) and an example core network (CN) that may be used within the communications system illustrated in FIG. TA.

FIG. 1C is a system diagram of the RAN 104 and the CN 106 according to another embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may also perform other functions, such as anchoring user planes during inter-eNode-B handovers, triggering paging and/or mobile termination when DL data is available for the WTRUs 102*a*, 102*b*, 102*c*, managing and storing contexts of the WTRUs 102*a*, 102*b*, 102*c*, and the like.

The SGW 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired or wireless networks that are owned and/or operated by other service providers.

Although the WTRU is described in FIGS. 1A-ID as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set mode may have an Access Point (AP) for the basic service set and one or more stations (STAs) associated with the AP. The AP may have an access or an interface to a Distribution System (DS) or another type of wired/wireless network that carries traffic in to and/or out of the basic service set. Traffic to STAs that originates from outside the basic service set may arrive through the AP and may be delivered to the STAs. Traffic originating from STAs to destinations outside the basic service set may be sent to the AP to be delivered to respective destinations. Traffic between STAs within the basic service set may be sent through the AP, for example, where the source STA may send traffic to the AP and the AP may deliver the traffic to the destination STA. The traffic between STAs within a basic service set may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an independent basic service set mode may not have an AP, and the STAs (e.g., all of the STAs) within or using the independent basic service set may communicate directly with each other. The independent basic service set mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the basic service set and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off One STA (e.g., only one station) may transmit at any given time in a given basic service set.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the basic service set. The bandwidth of the primary channel may be set and/or limited by a STA, from among all STAs in operating in a basic service set, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the basic service set support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
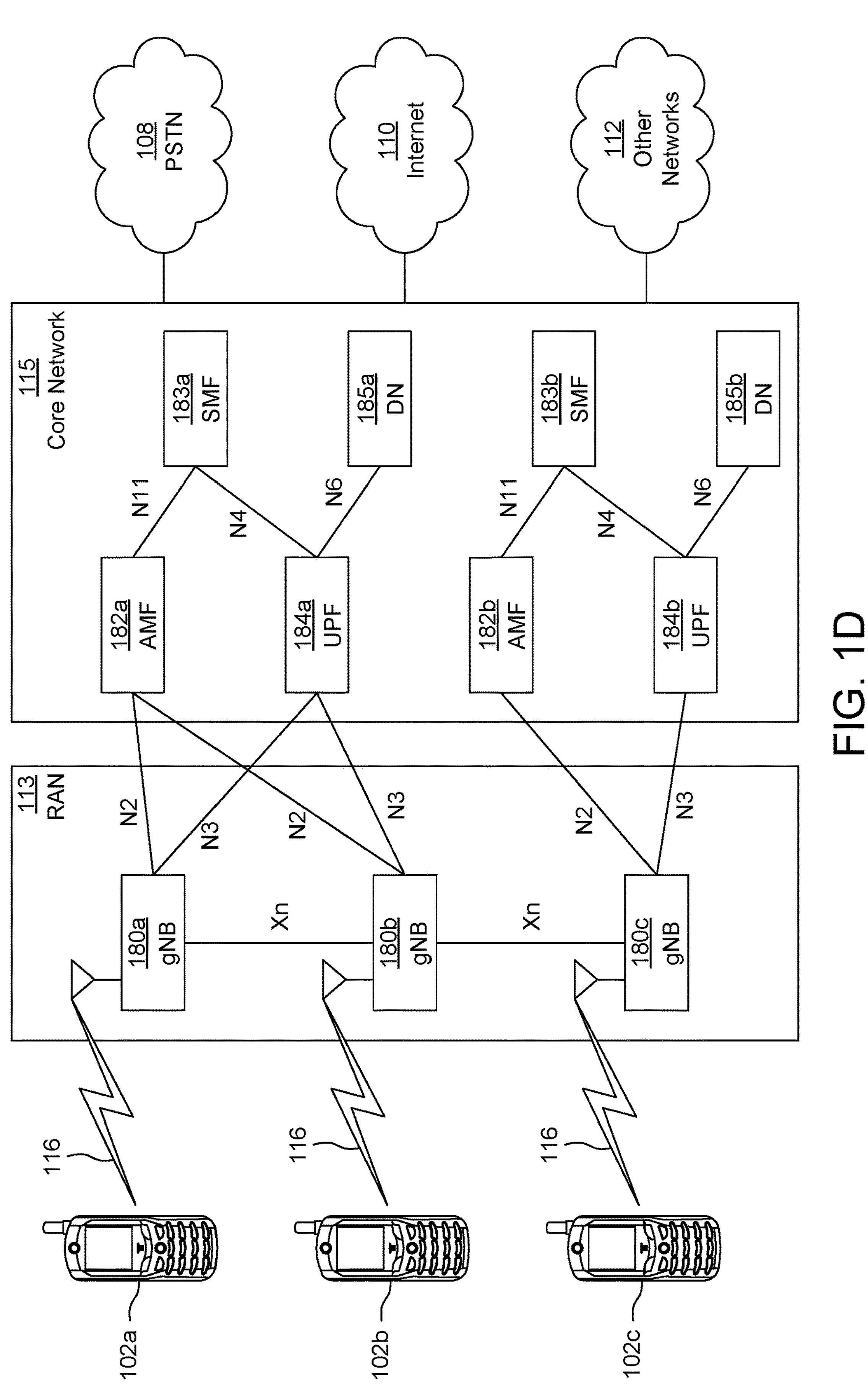
FIG. 1D is a system diagram illustrating a further example RAN and a further example CN that may be used within the communications system illustrated in FIG. TA.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different packet data unit (PDU) sessions with different requirements), selecting a particular SMF 183*a*, 183*b*, management of the registration area, termination of non-access-stratum (NAS) signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*,

102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-ID, and the corresponding description of FIGS. 1A-ID, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

Blockchain Technology

Blockchain technology jointly leverages and builds on top of various existing techniques, such as cryptography, hashing, Merkle tree, distributed ledgers, peer-to-peer (P2P) networking and consensus protocols. Blockchain technology innovatively combines such existing technologies to enable a system that may provide advanced features such as decentralization, immutability, transparency, and security.

A blockchain system is one in which blockchain technology is used. Applications supported by a blockchain system are referred to as blockchain applications. A blockchain system is underpinned by one or more underlying blockchain networks. Each blockchain network may include a plurality (e.g., many) participating blockchain nodes (BCN). Each BCN may host one or more distributed blockchains (a form of distributed ledgers), broadcast blocks using P2P networking, and perform consensus protocols with the other BCNs of the blockchain network to reach distributed trust and data consensus without relying on a centralized party.

A blockchain transaction may be any of a digital representation of a real-world transaction, a digital record of physical assets, a digital record of a physical event, a digital record of any action in an information system, a digital payment and a digital smart contract. A block groups multiple blockchain transactions together. A blockchain is a data structure and is an ordered, growing number of blocks that are linked using cryptography. A blockchain and a blockchain data structure may be referred to interchangeably.

Figure 2:
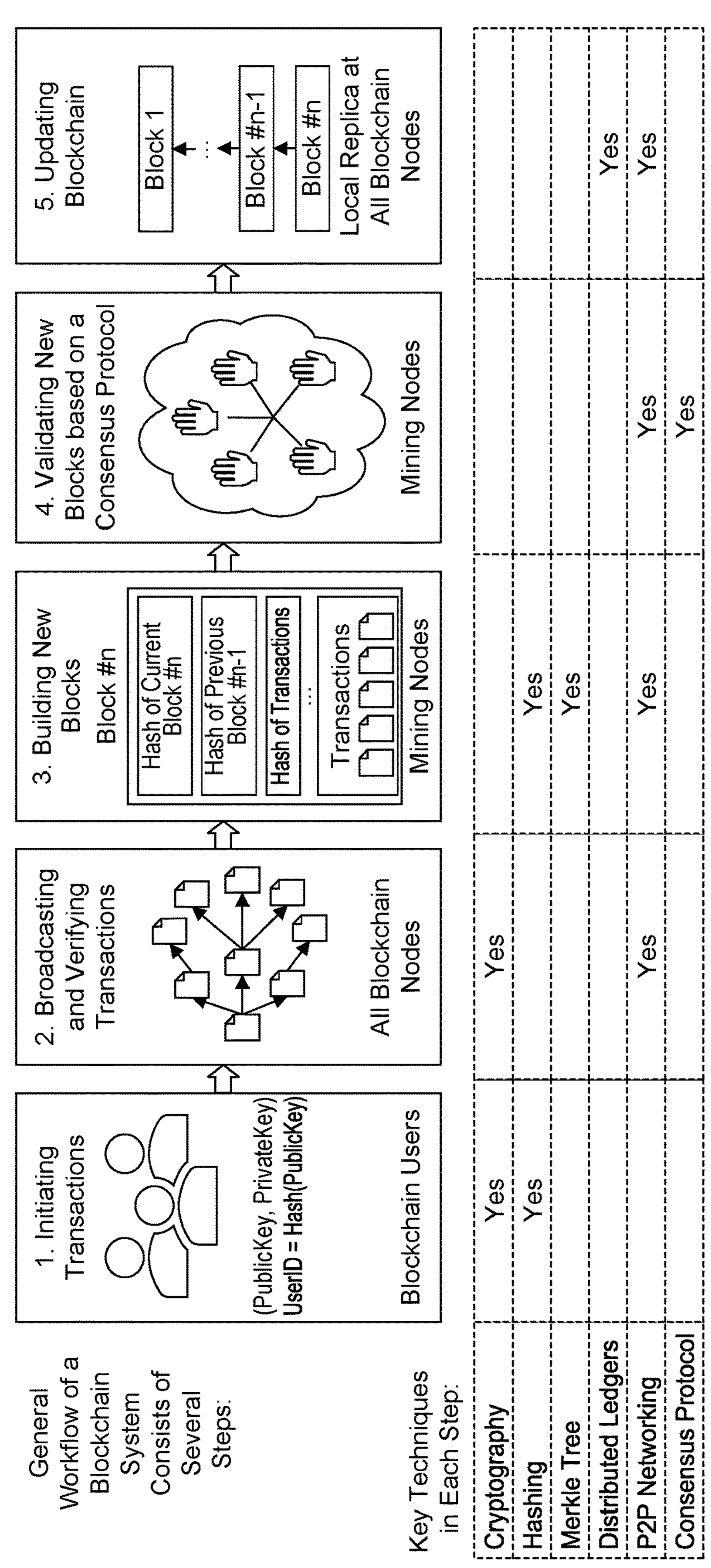
FIG. 2 illustrates an example workflow of a blockchain system.

FIG. 2 illustrates an example workflow of a blockchain system. The workflow may include initiating transactions (1), broadcasting and verifying transactions (2), building new blocks (3), validating new blocks based on a consensus protocol (4) and updating a blockchain (5).

Initiating transactions: Each participating user may generate new transactions independently. Each user may have a user identifier and/or account identifier. The user identifier and/or account identifier may be a hash of the user's public key. Each new transaction is signed using the user's private key. After a new transaction is generated, the user may send it to the blockchain network.

Broadcasting and Verifying Transactions: A new transaction may be received by some BCNs. The BCNs verify its integrity using the user's public key, which may be included in the transaction. After verification and if the new transaction is valid, it may be relayed and/or broadcasted within the blockchain network. Eventually, all BCNs receive and possess a copy of any newly generated and valid transactions.

Building New Blocks: Some BCNs (referred to as mining nodes and/or full nodes) group many newly generated and pending transactions together to generate a new block. The new block may include a block header and a block body. The block header may include a hash of the current block, a hash of the previously confirmed block, and a hash of all included transactions (e.g., Merkle tree). Dependent on the consensus protocol, the block header may include other and/or additional information. The block body may include the content of all included transactions. Each mining node may independently attempt to create a new block.

Validating New Blocks based on a Consensus Protocol. Under the Building New Blocks task, mining nodes may independently attempt to create a new block. They may run the same consensus protocol (e.g., Proof-of-Work in Bitcoin system) and may reach an agreement on who (i.e., a winner) is allowed to insert a block into the existing blockchain. The winner of the consensus protocol may send its newly generated block to the blockchain network. This new block may be broadcasted; allowing all mining nodes to receive and/or verify it.

Updating the blockchain. After the newly generated block is verified, it may be successfully appended to the existing blockchain, since it contains a hash of the previous block (i.e., the last block of the existing blockchain).

Figure 3:
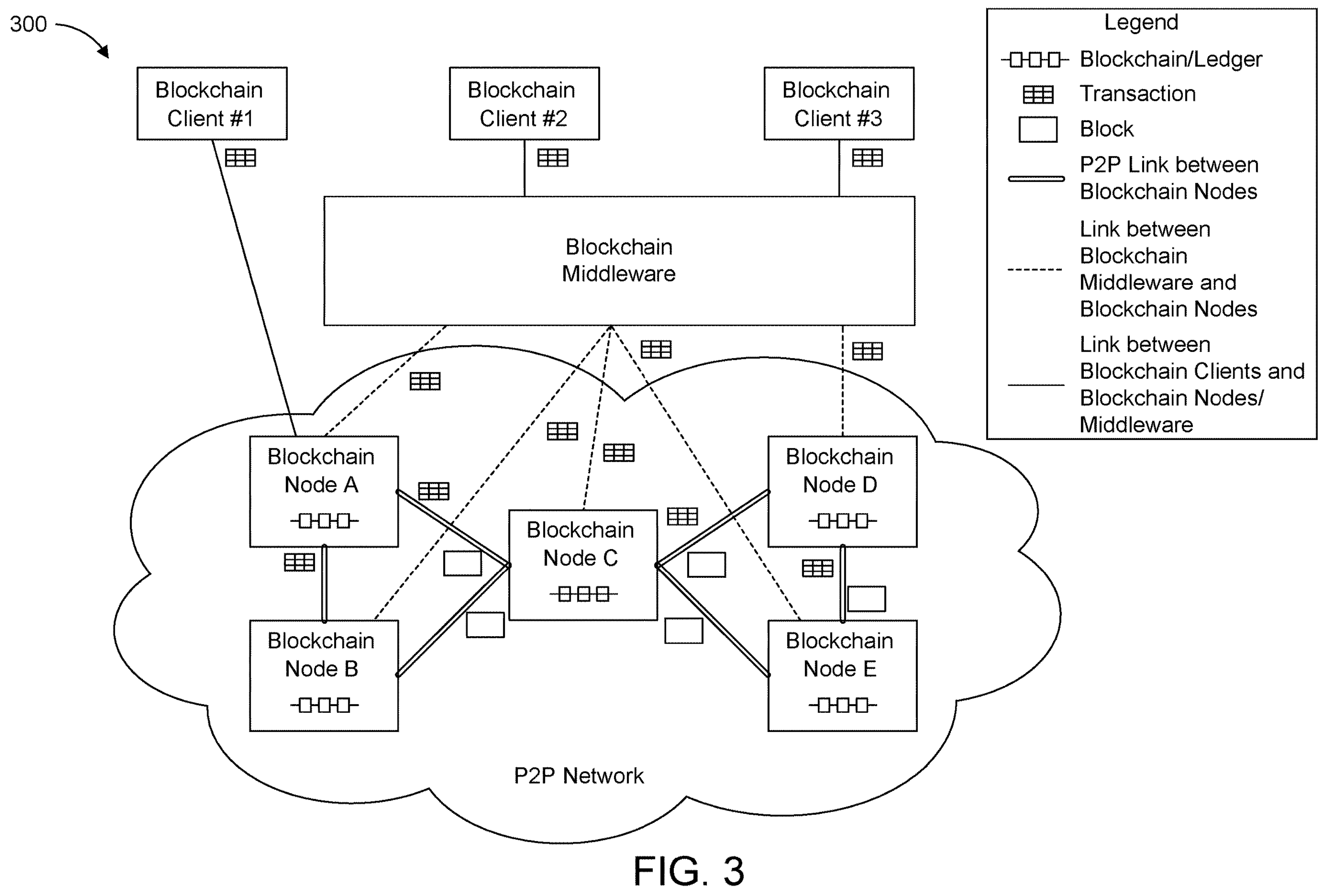
FIG. 3 illustrates an example architecture of a blockchain system.

FIG. 3 illustrates an example architecture of a blockchain system 300. The blockchain system 300 may include several types of logical entities, such as, for example, any of a management node, one or more BCNs, one or more BCCs and blockchain middleware (BCM).

Blockchain Middleware (BCM): The BCM may bridge the BCCs and the BCNs. The BCM may interact with the BCNs on behalf of one or more of the BCCs (notably, a BCC may directly interface with a BCN for some occasions). The BCM may manage and/or coordinate some or all of the BCNs. For example, a BCC may send a blockchain transaction to the BCM without indicating any BCN as a destination node. The BCM may select a BCN and/or forward the blockchain transaction to the selected (e.g., an appropriate) BCN. The BCM may be regarded as a proxy for the BCCs to interact with BCNs. The BCM may maintain the same blockchains/ledgers that may be hosted by one or more of the BCNs. Public blockchain systems may not have such a BCM. Private and/or permissioned blockchain systems usually have a BCM for blockchain governance, access control, and other management purposes.

BCNs (BCN): The BCNs may participate in blockchain workflow and may perform actions, such as illustrated in FIG. 2. As disclosed in connection with FIG. 3, the BCNs may be connected via P2P links and/or may form a mesh P2P network, over which transactions and blocks may be broadcasted by some or all of the BCNs and ultimately received by all of the BCNs (assuming such BCNs maintain connectivity). A BCN may connect to multiple other BCNs, e.g., neighboring BCNs. For example, as shown in FIG. 3, BCN A, BCN B and BCN C (as neighbors) may connect to one another and BCN C, BCN D and BCN E (as neighbors) may connect to one another. Since the BCNs form a mesh network, the blockchain system may continue to function after loss of connectivity of one or more of the BCNs (e.g., such BCNs go offline) if connectivity is maintained among the remaining BCNs. For example, if the BCN A goes offline, the blockchain system may continue to function because the remaining BCNs B-E maintain connectivity in the form of a mesh network. But if the loss of a BCN results in the undoing of the mesh network, that BCN is referred to as a critical BCN. (e.g., the BCN C is a critical BCN). A well-designed P2P routing protocol will avoid the existence of any critical BCN. A BCN may serve multiple BCCs. When a BCN may receive new transactions from its clients, it may broadcast them throughout the P2P network so that they may be received by all other BCNs. Similarly, when a BCN wins the consensus protocol, the new blockchain block generated by it may be broadcast towards all other BCNs. Each BCN hosts one or multiple progressing blockchains. The manner in which multiple BCNs are connected to each other may be dependent on P2P routing protocols (e.g., gossip-based routing) for the P2P network. The BCNs including P2P routing protocols may be managed and/or coordinated by a BCM. Standardization on blockchain operations when there are BCNs in offline mode has recently started. There might be two types of BCNs: 1) the BCNs that may host blockchains including sending/receiving transactions and receiving new blocks (but they do not participate in consensus protocols), and 2) endorsers, validators and/or miners that may host blockchains and/or may participate in consensus protocols including generating new blocks.

BCCs: A BCC may generate new transactions and may send them to corresponding BCNs directly and/or to a BCM to be forwarded to one or more BCNs. The BCC, when interacting with BCNs directly, may interface with one BCN, which however may be changed. Multiple BCCs may connect to the same BCN. A BCC may lose its connection to a BCN or the BCM. A result of losing connection to a BCN or the BCM is that the BCC may be offline to the entire blockchain system. A BCC may be a blockchain application on a device ("local BCC") or a blockchain application in the cloud ("remote BCC").

5G System Architecture

Figure 4:
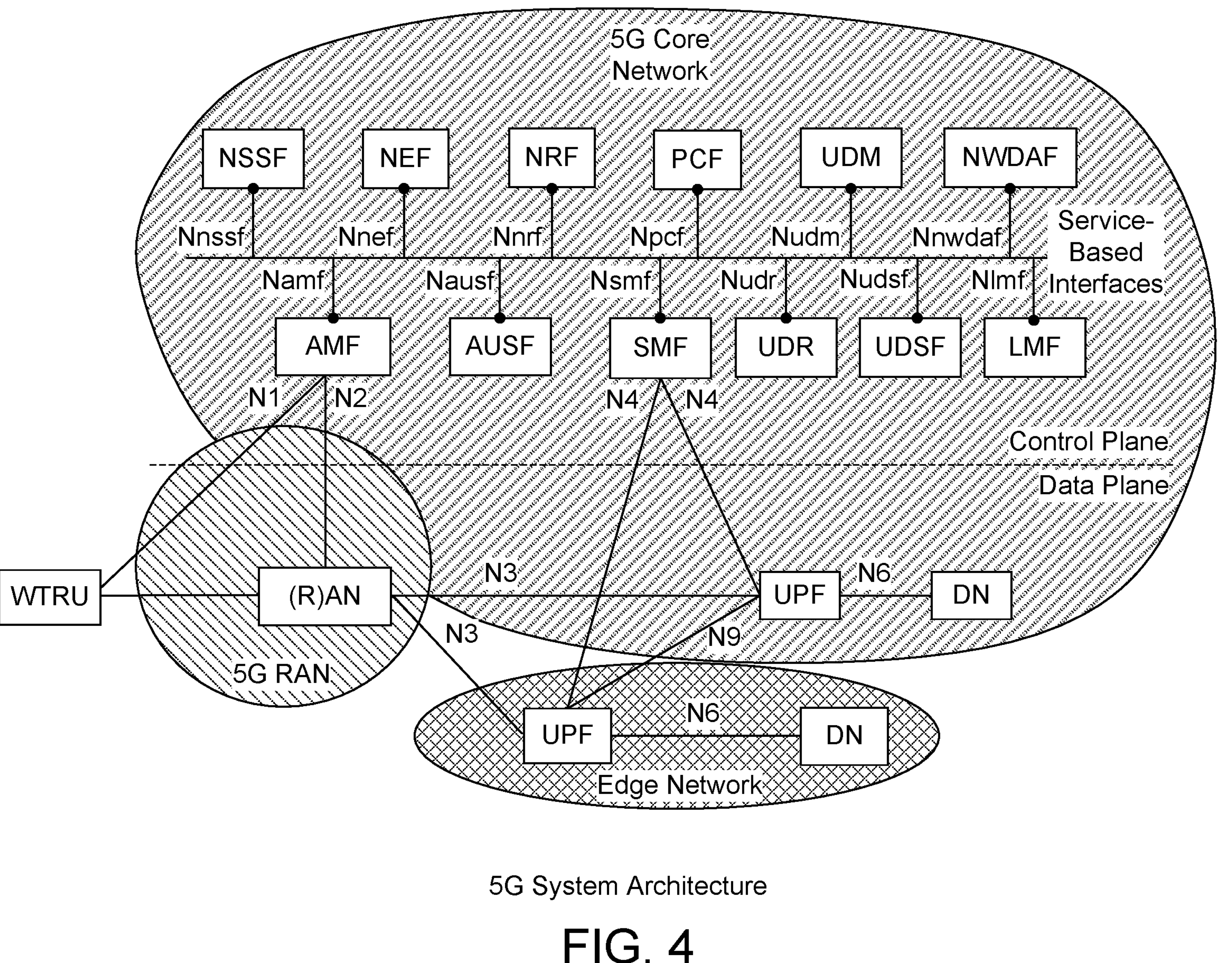
FIG. 4 is a block diagram illustrating a communications system configured as a 5G system (5GS)

FIG. 4 is a block diagram illustrating the communications system 100 (FIG. 1) configured as a (e.g., 3GPP defined) 5G system (5GS). The 5GS 100 may include a RAN 113 and CN 115. One of the design principles for 5G system architecture is service-centric or service-based.

The 5G CN 115 may include various network functions. The network functions may work together to fulfill and/or provide services to the RAN 113, a WTRU 102 and/or an application server and/or application service provider. The network functions may include a network repository function (NRF), an access and mobility management function (AMF), a session management function (SMF), an authentication server function (AUSF), a policy control function (PCF), a user plane function (UPF), a network exposure function (NEF), a unified data management (UDM), a unified data repository (UDR), a unstructured data storage function (UDSF), a network data analytics function (NWDAF) and a network slice selection function (NSSF).

A network function may access another network function. The network functions may access and/or interact with one another in any of a request/response mode and a subscription/notification mode. A network function may register with the NRF. Registering with the NRF may make the network function discoverable to the other network functions.

The AMF may manage access to, and mobility of, WTRUs 102 in the 5GS 100. The SMF may be responsible for establishing sessions between a WTRU 102 and the 5G CN 115. The AUSF may be in charge of the authentication of users (e.g., WTRUs). The PCF may create and/or provide one or more policy rules for and/or to other control plane network functions and WTRUs 102. The PCF may assign identifiers for the created policy rules, and other control plane network functions and WTRUs 102 may use the identifiers to refer to (e.g., look up or otherwise obtain) the corresponding policy rules.

The UPF may be a function for the user plane. The UPF may monitor, manage, control and redirect user plane traffic flows, such as between a WTRU and an application server. The NEF may expose control plane functions to entities (e.g., network applications) that are outside of the 5G system and/or not in the same trusted domain.

The 5G CN 115 may provide data storage and analytics services through various functions, such as any of the UDM, the UDR, the UDSF and the NWDAF. The 5GS 100 may support network slicing. Network slicing may be facilitated by the NSSF.

Although the network functions may be defined as separate logical entities, some or all of the network functions may be combined. One or more than one of the network functions may be invoked and/or used in connection with a particular procedure or operation. By way of example, the AMF, AUSF and SMF may be involved in WTRU mobility. One or more than one instance of a network function may be instantiated. The NRF may maintain the information of each network function instance. Although shown within a single cloud, one or more of the network functions may be deployed in an edge network, such as one that supports edge computing and/or that is in close proximity to and/or co-located with the RAN 113. It may be advantageous to deploy the UPF and/or the NEF in an edge network that supports edge computing, which may save certain communication costs since the policy control may be applied to events and/or data directly at the edge (e.g., where data and/or events are generated).

FIG. 5 illustrates various procedures in a 5GS. The various procedures are described with reference to the 5GS of FIG. 4 for convenience. The various procedures may be carried out using other architectures, as well.

As denoted at (1), a WTRU may discover and/or select a network (e.g., a PLMN, a RAN, a cell, etc.) based on received system information block (SIB) broadcast by one or more RAN nodes. As denoted at (2), the WTRU may establish a radio resource control (RRC) connection with a selected RAN (e.g., RANI). The WTRU may communicate with the 5G CN via the selected RAN. As denoted at (3), the WTRU may initiate registration towards an AMF. The selected RAN may determine and/or select, from one or more AMFs, a serving AMF for the WTRU. As also denoted at (3), the serving AMF may check with the AUSF for primary access authentication and authorization, request subscription data from the UDM, check with the PCF for access and mobility policies, and/or contact the SMF to activate any existing PDU session (e.g., if indicated by the WTRU).

A registration area (RA) may be defined within the 5GS. The RA may be formed from one or more tracking areas (TAs); each of which may cover one or more cells. An advantage of the RA is that it reduces signaling overhead by not requiring registration updates with the serving AMF while within the RA unless a periodic registration timer expires. If the WTRU moves from one RA (e.g., RA1) to another RA (e.g., RA2), then the WTRU may perform a new registration, such as, for example, with a registration type set to mobility registration update (as described herein and denoted at (7)). A larger RA may reduce registration overhead, but it may increase paging signaling overhead due to the serving AMF having to page the WTRU in a larger number of TAs (or cells).

After successful registration, the WTRU may enter RM-REGISTERED state and/or may access and/or interact with other control plane NFs via the serving AMF. In various embodiments, the serving AMF might be the only entry point for the WTRU to access and interact with the CN control plane. The procedures denoted at (3), (5) and (7), for example, may be related to connection management.

As denoted at (4), the WTRU may establish a PDU session for a DN with an SMF. The serving AMF may determine/select the serving SMF for the PDU session. As also denoted at (4), the SMF may check with the PCF for PDU session policies and/or may select a UPF as an anchor for the PDU session ("PDU session anchor"). The WTRU may access the DN and/or exchange packets with the DN via the PDU session anchor (PSA). The PCF may retrieve subscription data of the WTRU from a UDR in connection with the SMF checking with the PCF for session policies. The PCF may provide the subscription data of the WTRU to the SMF. The SMF may perform primary session authentication using the subscription data of the WTRU as retrieved from the UDM and may perform secondary authentication between the WTRU and a DN-AAA server, e.g., using an extensible authentication protocol (EAP), such as defined in IETF RFC3748 and IETF RFC5247. The procedure denoted at (4) and the procedure denoted at (5) may be jointly performed.

As denoted at (5), the WTRU may be in a CM-IDLE state (e.g., after connection with the serving AMF is released). As denoted at (5), the WTRU may initiate a service request procedure to reestablish a connection with the serving AMF and may enter a CM-CONNECTED state. The WTRU may be in a mobile initiated connections only (MICO) mode when it initiates the service request procedure to reestablish the connection with the serving AMF. If the WTRU is not in the MICO mode, then the serving AMF may page and/or trigger the WTRU to initiate a service request procedure, for example, to receive any downlink packets. A NAS connection may be established between the WTRU and the serving AMF in connection with the service request.

The service request may be carried out together with WTRU registration, in which case, the WTRU may enter CM-CONNECTED state. The WTRU need not notify the serving AMF regarding its mobility within the RA. If the WTRU remains within the RA but moves out of a RAN notification area (RNA), then the WTRU may perform a RAN update to trigger the RAN to update the context information of the WTRU and the corresponding RRC connection maintained by the RAN. The RNA may be smaller than the RA. For example, the RNA may include a subset of TAs forming the RA (e.g., TA1, TA2, and TA3, as shown).

As denoted at (6), the WTRU may carry out data transmission (data plane) with the DN via RAN 113 and the UPF as the PSA. The DN may have a data network name (DNN). Although not shown, the 5GS may include and/or be communicatively coupled with more than one DN, and the DN may have respective DNNs.

As denoted at (7), the WTRU may detect when it moves from RA1 to RA2. For example, the WTRU may detect such an event by checking a list of TAs for each RA configured by the serving AMF. As denoted at (7), the WTRU may perform a mobile registration update with a new serving AMF. As denoted at (7), an inter-RAN handover (e.g., Xn-based or N2-based inter-RAN handover) from the current RAN to a new RAN with a serving AMF change may be performed. A new serving AMF may contact the old serving AMF for transferring the context information of the WTRU. As also denoted at (7), the SMF may contact the PCF and/or the UPF to update existing PDU sessions with the UE.

As shown in FIG. 5, multiple TAs may be grouped together as a local area data network (LADN) service area to support LADN service. As an example, TA4, TA5, and TA6 may form a LADN service area. The WTRU may be allowed to access LADN1 if (e.g., if and only if) the WTRU remains within TA4, TA5, or TA6.

A set of TAs may be grouped as a service area. The 5GS may specify and/or enforce service area restrictions for a UE. For example, the 5GS may configure a WTRU for service area restriction for a service area formed from TA7, TA8, and TA9, where the WTRU may be allowed to access 5GS if (e.g., if and only if) the WTRU remains within TA7, TA8, or TA9.

The various procedures disclosed herein and denoted in FIG. 4 need not be carried out in the order shown or described, and not all of the procedures need to be performed. For example, the procedures denoted at (7) may be performed before the procedures denoted at (6), and the procedure denoted at (5) need not be performed.

Federated Learning

Traditional machine learning (ML) technology is usually centralized, i.e., data may be stored at a centralized location, such as cloud or a centralized data platform. The data is trained to obtain an ML model. There is a potential risk of data leakage in this process. Federated learning (FL) is essentially a distributed ML technology. A goal of FL is to implement a distributed ML model training process by multiple FL participants (or FL clients) while still ensuring data privacy, security, and legal compliance.

A conventional FL process may be carried out as follows:

Step 1: Cellphones participating in an FL task may download or otherwise obtain a model to be trained (e.g., an initial global model, a temporary global model, an interim global model, etc.) from an FL Server.

Step 2: Each cellphone may train the obtained model locally using its data to form a locally trained model ("local model")

Step 3: After the local model is trained, the cellphone may encrypt a local model update (e.g., gradients) and/or may upload the encrypted local model update (e.g., gradients) to the FL server.

Step 4: The FL server may perform model aggregation on local model updates collected from multiple cellphones to obtain a new and/or updated global model. The cellphones participating in the FL task may return to Step 1, whereupon they obtain the updated global model for a next round of training. Steps 1-4 may be executed for multiple rounds, e.g., to continuously improve the global model.

As is readily discerned from the above process, FL may make full use of the data and computing power of the FL participants. And multiple parties may collaborate to build a more robust ML model without sharing and/or moving (e.g., exposing) their data. This feature may be important for ML tasks in a strict data law and/or supervision environment. For example, the General Data Protection Regulation (GDPR) in Europe puts forward strict requirements on the storage, use, and transfer of users' private data. Federated learning may be used to solve issues such as data ownership, data privacy, and data access rights in this environment. From the perspective of implementation, a next-generation artificial intelligence (AI) system may pull from not only fields of AI and ML but also other fields, such as distributed/networked computer systems, software, security, and privacy, and algorithm design. For example, there is a growing interest and consensus that blockchain technology may be applied in the field of distributed ML (including FL) in view of the blockchain technology and FL share many similar system properties such as large-scale, distributed, and data security sensitive.

Figure 6:
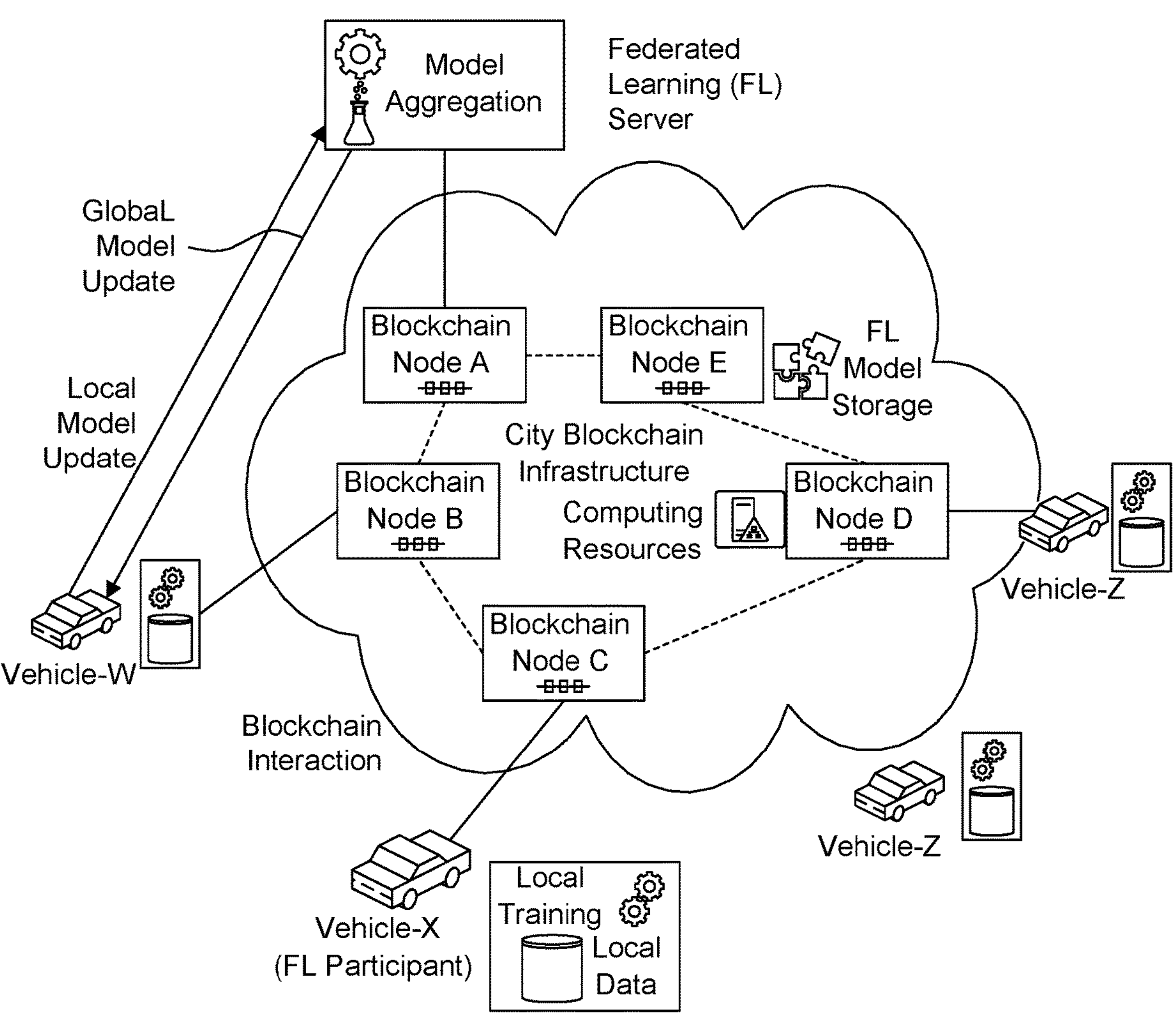
FIG. 6 illustrates examples of blockchain-enabled federated learning and training process management for a smart transportation application.

Representative Use Case—FL Model and Training Process Management in Smart Transportation FIG. 6 illustrates an example of blockchain-enabled FL for a smart transportation application. As shown, multiple vehicles may be traveling along a city road network. Driving performance and/or behavior data may be generated and/or stored locally at each of the vehicles for privacy purposes. Depending on different needs, various FL tasks may be initiated by task initiators (e.g., by a particular vehicle and/or person or by a transportation advisory organization and/or a private company or organization) to analyze the driving performance data in order to train a global model via FL. For example, a specific FL task may be created with an objective of predicting on which road sections drivers may have worse driving performance. The vehicles may join the FL task and may become FL participants. In each round of training, the FL participants may conduct local model training using their local driving performance data and/or may generate new local model updates (e.g., gradients). The FL participants may upload the local model updates to an FL server. The FL server may update the global model using (e.g., aggregating) the local model updates. The updated global model may be distributed to all of the FL participants. The FL participants may use the updated global model for a next round of training, and multiple rounds may be carried out, e.g., until the quality of the updated global model meets certain expected quality, such as model accuracy. Note that, in FIG. 6, the model update exchange process between an FL participant and FL server is only depicted between an FL server and Vehicle-W for simplicity.

In this FL application, blockchain may be leveraged. For example, the FL server and FL participants may exchange their local model updates and global models in each round, during which they may record the local and/or global model updates and performance data and/or logs into a blockchain system, e.g., for traceability and/or accountability purposes. The performance data and/or logs may indicate how long an FL participant takes to complete a single round of local training on average. Examples of potential benefits of applying blockchain in FL applications are provided below:

The FL participants (e.g., vehicles) might not be known to each other and therefore how to enable them to engage in an FL task and collaborate with each other may be an issue. By using blockchain technology, a plurality of untrusted FL participants may work together for an FL task. For example, smart contracts may be used to build trusted work and/or collaboration relationships among a plurality of FL participants. In addition, certain rewards mechanisms of the smart contracts may encourage the FL participants to actively cooperate and contribute during the FL training.

FL is essentially a distributed framework, which fits very well with the properties of blockchain systems. During each round of FL training, the work behavior data of each FL participant (e.g., an amount time taken to complete a single local training on average) may be stored in the blockchain for traceability and/or accountability purposes. In this way, a QoS of the FL training may be monitored and/or adjusted. Various unexpected events may happen in a large-scale distributed system (e.g., node failures, loss of connections, malicious attacks). Data loss resulting from the unexpected events may be reduced by recording/logging the FL training progress and storing the log data for the FL training process using a blockchain system (as a distributed ledger).

In addition, different FL tasks may produce various trained models. The various models may be stored in the blockchain system. For example, the trained models may be produced based on the efforts of multiple FL participants. Storing the trained models in a private location (e.g., hosted by a particular FL participant, or hosted in a private database or in a private cloud) might not be appropriate. The models may be stored in a more open and/or a public location for ease of access. Storing the models (or their model summaries) in the blockchain may allow more pervasive model distribution and more visibility, which in turn may enable more users to discover and access the models.

First Representative Aspect

A massive amount of data may be generated by FL participants and an FL server in each round of a FL training process. For example, the FL participants produce local model updates in each round. Similarly, different FL tasks may deliver final and/or trained models after completing the FL training. The data (e.g., local model updates, intermediate trained models, final trained models, etc.) may be recorded in the blockchain system for accountability and traceability purposes (e.g., to support rollback operations if an FL training process needs to be restarted from a certain point). A first representative aspect of at least some of the various solutions disclosed herein may be how to efficiently organize and carry out or otherwise conduct storing of the data in the blockchain system. For example, such various solutions may be applied in scenarios in which an FL participant may have different versions for a given local model update generated by the FL participant, e.g., a scenario in which, for a given model update, the FL participant may have a full-size version as well as a tailored version (but the solutions may be applied to other situations as well). The full version may have a complete gradient update (leading to a higher accuracy), but such a local model update may have a larger data size. In comparison, some existing research solutions propose reducing the size of model updates by conducting certain tailoring operations, e.g., only storing the most important updates, doing model distillation, etc., but carrying out the certain tailoring operations may downgrade the model accuracy.

Each model (either an interim model update or a final trained model) may have different versions. The different versions may be useful for different situations, scenarios, etc. For example, some of the scenarios may need to use a full model for a high-accuracy prediction even if such a full model is in a large size. For storage efficiency, the blockchain system may store tailored model updates at a more frequent interval due to having a smaller size. In comparison, to support the traceability of an FL task, a full model update without any tailoring operation may be recorded by the blockchain system in a larger interval, e.g., only one full model update of an FL participant may be recorded in every five training rounds.

Based on above, an efficient data storage service for supporting FL is needed in the blockchain system, however, heretofore no such service existed. With such a service (as disclosed herein), FL participants do not have to take care of how their models are stored and organized in the blockchains, e.g., whether different versions of models are stored in the same chain or in different chains, whether a full model update is stored in a less frequent interval than a tailored model update. In a more advanced scenario, the FL participants do not even need to take care of the tailoring operation of models and all the tailoring operations may be automatically done by the blockchain system based on the instructions by the FL participants.

Second Representative Aspect

A second representative aspect of at least some of the various solutions disclosed herein may be how to efficiently organize and carry out or otherwise conduct access to the data stored in a blockchain system. In a current blockchain system, a BCC may identify a targeted chain and understand the underlying data structure of data and/or transactions stored in the chain so that the BCC can access the needed information. In the context of FL applications, BCCs (e.g., BCCs that want to leverage the blockchain system) may need to access trained models generated by FL tasks or interim data (e.g., local model updates of FL participants in each round). The manner in which to those models are organized and stored in the blockchain system may highly affect the performance of subsequent model accessing. By way of example, a blockchain system may choose to only store a full version of model updates in each round. If a BCC needs a tailored model, the blockchain system may tailor the full version of the model, may generate a tailored model update therefrom, and may send the tailored model update to the BCC. In an alternative approach, the blockchain system may create different versions of model updates in advance (such as the BCN E in FIG. 6) and store all different types of versions in the blockchain system. This approach may require more storage space. The advantage of the approach may be that the subsequent model access requests may have minimum processing time since all types of versions of models may be immediately available in the blockchains for accessing. It may be seen that due to different implementation choices of data and/or model storing organization in the blockchain system, it makes very difficult for clients to conduct efficient model access if they have to understand the model storage details in the underlying blockchain systems. It may be advantageous if a model access service may be made available in the blockchain system in order to facilitate model access. With such a service, the client just needs to specify the type of models the client would like to access (e.g., a full model or a tailored model, accuracy requirements, etc.). The model access service may handle all the details by interacting with underlying blockchains and retrieve the needed model. Throughout the whole process, the clients might not have to know any storage details and data structures in the underlying blockchain. Heretofore no such a model access service existed.

Third Representative Aspect

Different FL tasks may deliver various trained models, which may be recorded by the blockchain system. Those models may be shared or re-used for other purposes. A third representative aspect of at least some of the various solutions disclosed herein may be how to support (e.g., facilitate) sharing of data and/or models (e.g., trained models delivered by different FL tasks) in the blockchain system. It may be advantageous if a model sharing and trading market is made available in the blockchain system. One reason for doing so may be that in order to enable convenient trading between model producers (e.g., various FL participants) and model consumers (e.g., consumers that may want to download the model for use in their own applications). The various solutions disclosed herein may address building the trading relationship as simple and/or efficient as possible. For example, models may be stored in the different chains and the consumer needs to check multiple chains for discovery (it may be advantageous if a model repository or a model directory is available as a high-layer facilitator on top of the underlying chains). When a consumer identifies an interested model, it may have to contact the model owner to negotiate the model trading. It may be advantageous if the blockchain system can automatically create smart contracts between a consumer and a model owner. This may be useful in the FL scenario since a trained model may be (e.g., often) owned by multiple FL participants. It may be advantageous if the model consumer just needs to sign a smart contract prepared by a service provided by the blockchain system and does not need to worry about any details (e.g., negotiate with the multiple FL participants who own the model). Heretofore, no such functionalities and/or services for supporting a model trading marketplace exist in the blockchain system.

Fourth Representative Aspect

A fourth representative aspect of at least some of the various solutions disclosed herein may be how to support FL model deployment and scoring in a blockchain system. In a traditional solution, an ML model may be deployed in a cloud and a model scoring API may be exposed so that clients may call the API to conduct model scoring (i.e., send their inputs to the model to obtain the model output, e.g., predications). In order to successfully implement such an AI or ML application, the AI or ML application may need to work out an accurate ML model based on the application need and may need to consider many other system-related aspects, such as, for example, where to deploy an ML model for clients to access. In traditional AI or ML applications, the ML model may be (e.g., often) deployed by the owner and hosted in the cloud for other clients to access. However, in a fully distributed scenario, more or other deployment options may be employed.

For example, assuming that blockchain technology has been employed in a scenario where different FL tasks may be conducted, ML models produced thereby or at least their summaries (or hash values) may be made available in the blockchain system for traceability and accountability purposes. In other words, a trained model may be produced in a fully distributed way in the sense that the model may be created based on the efforts of all the FL participants. However, if the blockchain system's role is so limited at model training process, meaning that it is not going to support other services such as model deployment (i.e., running a model) and model scoring, all of that processing may have to be conducted outside of the blockchain system.

A trained model may be large in data size (e.g., tens of gigabits), and accordingly, downloading a model from a blockchain system and deploying the model to a client-owned site or a cloud may take significant time cost. Running a model may consume significant computing resources, especially when running a very complicated AI model (e.g., a natural network-based model). This motivates the idea of how to leverage the blockchain system to assist model deployment and model scoring since the ML models may already be recorded in the blockchain system (e.g., hosted by every BCN) and do not require a model downloading process. Each BCN may have a good computing capability (e.g., for running blockchain consensus protocol, especially for the PoW-type consensus protocol) and/or certain surplus computing resources may be allocated for conducting model scoring if needed.

As above, it may be seen that when blockchain technology is integrated with an FL application, the blockchain system may help the application beyond the training process, and/or help with model deployment and model scoring processes. Embodiments disclosed herein address how to leverage the blockchain system for model deployment and model scoring. A motivation may be that the blockchain system may have a large network of BCNs, and each BCN may have certain computing capabilities (such as the BCN D in FIG. 6) for acting as a model scoring node. Such a large BCN network may have the great flexibility for serving the model scoring requests in a fully distributed way, e.g., model scoring request from geographical area A may be served by a BCN that may be located in area A, i.e., any of the BCN (as long as it has the available computing resources for running an ML model) may act as a model scoring site.

Overview

As would be appreciated by a person of skill in the art based on the teachings herein, encompassed within the embodiments described herein, without limitation, are procedures, methods, architectures, apparatuses, systems, devices, and computer program products directed to blockchain-enabled model storage, sharing and deployment for supporting distributed learning.

Various/new services (e.g., middleware services) (as facilitators) may be provided, e.g., in view of the aspects disclosed above. The middleware services may be implemented on the same physical entity and/or node or different physical entities and/or nodes.

A blockchain storage service (BSS) may be provided, e.g., in view of the first representative aspect. The BSS may be a common service for facilitating data (e.g., model) storing in a blockchain system for its clients (referred to herein as "BSS Clients"). The BSS might not have to convey to FL participants information regarding the underlying blockchain storage organization and structure. Instead, the BSS might only convey the most important information to the FL participants (which chain may be used for storing a specific type of information) but may hide all other storage details of the blockchain system. In this way, the FL participants (as BSS clients) just need minimum efforts to rely on the BSS for storing their data (such as model updates in each round) to the underlying blockchain system.

A blockchain access service (BAS) may be provided, e.g., in view of the second representative aspect. The BSS may be responsible for efficiently storing the data into a blockchain, whereas the BAS (with the knowledge of data organization and chain structure in the underlying blockchain system) may provide an efficient data access service. The BAS client (e.g., an FL task initiator) may specify high-level needs (e.g., what it may want to retrieve) without specifying the details related to underlying data organization and chain structure in the blockchain system (e.g., which chain or chains need to be accessed for retrieving the desired data and/or model). The BAS may handle most of the details, e.g., the BAS may interact with the blockchain system, identify the correct chains to access, retrieve the needed information, conduct other (e.g., necessary) processing if needed, and return the retrieved data to the client.

A model repository (MR) may be provided, e.g., in view of the third representative aspect. Heretofore, if a client does not have any knowledge regarding where models are stored in the blockchain system, e.g., stored on which chains, the client in all likelihood will be unable to find a desired chain or chains. The MR may enable the client to identify and/or discover the desired model to be retrieved. By way of example, the BAS may be responsible for facilitating access to stored models. Before a model access operation is carried out, the MR may enable the BAS (client) to identify and/or discover the desired model to be retrieved.

The MR may be on top of underlying blockchains. The functionalities of the MR may include enabling clients (e.g., BAS clients) to discover models and provide model trading assistance between a BAS client and FL participants (who produced the model) so that the client need not have to interact with the model owner (e.g., the FL participants) directly for paying a certain fee to those FL participants.

A model deployment and scoring service (MDSS) may be provided, e.g., in view of the fourth representative aspect. A trained model may be large in data size (e.g., tens of gigabits) and accordingly, downloading a model from a blockchain system and deploying the model to a client-owned site or a cloud may take significant time cost. Running a model may consume significant computing resources, especially when running a very complicated AI model (e.g., a natural network-based model). The BCNs in the blockchain system may have the potential benefits for hosting and running those models. The MDSS may assist model deployment and model scoring directly inside the blockchain system (e.g., hosted and/or run by selected BCNs) and does not require a model downloading process. For example, a model scoring API may be exposed by the MDSS, and MDSS clients may call the API to conduct model scoring using an ML model deployed in the system. The MDSS may select an appropriate BCN that may be running a specific model for conducting the model scoring. In this way, a fully distributed AI/ML model deployment may be realized by leveraging the blockchain system.

A number of solutions are disclosed herein in view of aspects disclosed above. For the solutions for each of the aspects, an individual and/or new service may be provided. The new services may be deployed or implemented by the same physical entity and/or node, etc. and and/or or different physical entities and/or nodes, etc.

Reference may be made to the following glossary in connection with the disclosures herein.

Federated Learning (FL): A distributed machine learning approach involving separate FL participants and a model aggregator, where: 1) training data may be distributed and kept at the FL participants; 2) for each of multiple rounds of FL training, the FL participants may perform local training, generate local and temporary model updates and/or send the local model updates to the model aggregator; 3) the model aggregator (e.g., an FL server) may receive the local model updates from the FL participants and/or aggregate them together to generate a global model update; 3) a global model update may be sent to the FL participants for performing a next round of local training; and 4) the process may repeat until the global model converges to one meeting an expected accuracy.

FL Task: A task defined or initiated by an FL task initiator to train an AI/ML model using FL. An FL task may be fulfilled by an FL training process.

FL Training Process: A process that may include multiple steps for FL participants to work collaboratively to complete an FL task and/or generate an AI/ML model. A complete FL training process may include multiple rounds of training.

FL Task Initiator: An entity may have an application need for pursuing an AI/ML model via an FL task to be conducted among a batch of FL participants, and each of one or more FL participants may hold local data for the AI/ML model training. Such an entity may initiate an FL task by specifying details of model training, e.g., what kinds of data may be needed for training, what type of model may be to be trained, etc.

FL Participant: An entity that participates in the FL Training Process to accomplish an FL task, such as generating a final global AI/ML model. A specific FL task may correspond to an FL training process. The FL training process may be carried out by multiple FL participants and the FL participants may use their local data for training and all the FL participants need to work collaboratively work produce a global model. In case that a centralized FL server exists for model aggregation, the FL server may be regarded as a special type of FL participant for creating global model updates.

AI/ML Model: An AI and/or ML model may output certain predication or estimations for given inputs (e.g., given a future time and location, a model may predict the traffic condition in that area). An AI/ML model may be referred to herein as a “model”.

Trained Model: An AI/ML model that results from completing the training process that may be (e.g., often) started with an initial and/or untrained model. After a training process by using the training data, a trained model may be generated meeting the expected accuracy.

Local Model Update: An interim trained model generated by one FL participant during each training round. In each round of FL training, each FL participant may generate a local model update based on its local data. The local model update may be uploaded to a model aggregator for model aggregation.

Model Aggregator: A logical entity that aggregates local model updates in each training round. In a traditional FL scenario, the model aggregator may be an FL Server. In a more advanced scenario where no FL server exists, the model aggregation may be done by a selected FL participant via voting for example.

Global Model Update: This may not be a final trained model, but an interim trained model generated by the model aggregator during each of one or more rounds of training. In each round of FL training, the model aggregator may aggregate local model updates collected from any (e.g., all) the FL participants and generate a new global model update from the local model updates. The new global model may be distributed to the FL participants for the next round of training.

Blockchain System: A blockchain system refers to a blockchain infrastructure that may provide blockchain-related functionalities. The blockchain system may provide the basic blockchain functionalities and/or may provide various value-added services, frameworks, etc. For example, a blockchain infrastructure may provide a blockchain framework in which various middleware and/or management services may be supported, which may ease the development complexities for the upper layer applications when interacting with the blockchain system.

BCNs: The underlying blockchain infrastructure may be realized by a blockchain network, which may include multiple BCNs. The BCNs may host various chains and/or may participate in various blockchain operations, such as conducting consensus protocols, etc.

Blockchain Storage Service (BSS): A new service that may operate as a common service for facilitating data and/or model storing in the blockchain system for BSS clients.

BSS Client: A logical entity for leveraging BSS to store FL-related model and/or data. For example, an FL participant may be a BSS client if it wants to leverage BSS to store its local model update into the blockchain system.

Blockchain Access Service (BAS): A new service that may operate as a common service for facilitating data and/or model access for BAS clients (i.e., facilitates efficient access to and/or download of the models and/or data, which may have been stored in the blockchain system via the BSS). For a given (trained) model, it may be accessed or downloaded by certain interested parties via the BAS. For example, a BAS client may want to download a weather prediction model from the blockchain system to its local computer via the BAS.

BAS Client: A logical entity for leveraging the BAS to access FL-related model and/or data. For example, an FL task initiator may be a BAS client if it wants to leverage the BAS to access local model updates recorded by the blockchain system.

Model Repository (MR): A new repository that may operate as a model discovery and trading marketplace. The MR may be a facilitator built on top of underlying blockchains in the sense that the clients of the MR might not have to check each chain to discover models. Instead, they may leverage the MR to conduct model discovery.

Model Deployment and Scoring Service (MDSS): A new service that may operate as a common service for facilitating deployment and scoring of FL models directly inside the blockchain system. Different from accessing or retrieving a model, another type of user intends to use the model. i.e., to conduct model scoring (note that the process of using the models yielded by FL tasks to make predictions is called scoring). For example, an MDSS client may send some inputs (e.g., future time and location pairs) to a model and expect predictions of the traffic conditions for those time and location pairs. Pursuant to embodiments disclosed herein, a trained model does not have to be downloaded for use and it may be directly deployed inside the blockchain system. In other words, a trained AI/ML model may be directly deployed (e.g., run by a BCN) such that it may accept the model scoring requests (i.e., applying the trained model to the inputs to provide e.g., predictions, estimation, classification, etc.).

MDSS Client: A logical entity for leveraging the MDSS for deploying and scoring of FL models. For example, a given entity or application may be a MDSS client if it wants to leverage MDSS to deploy an AI/ML model in a blockchain system.

Reference may be made to following in connection with the disclosures herein.

Blockchain technology may be used as a generic term to represent much broader distributed ledger technology; in other words, blockchain technology and distributed ledger technology may be used synonymously or interchangeably.

As such, the disclosures herein may be applicable to any specific blockchain technology and/or distributed ledger technology.

Although embodiments disclosed herein are described in connection with the FL paradigm, it may be just one distributed ML approach. The embodiments and/or solutions disclosed herein may be appliable to other scenarios where another type of ML learning approach (i.e., other than federated learning) may be adopted. For example, for a given trained model produced via federated learning, embodiments disclosed herein provide different solutions to address several technical aspects, e.g., how to enable model storage, model access, model sharing, model deployment and scoring. The embodiments and/or solutions may be used in other scenarios, e.g., trained models produced via other types of existing and/or future AI and/or ML approaches, such as, e.g., generative adversarial network, transfer learning, reinforcement learning, etc.

In describing embodiments and/or solutions disclosed herein, this disclosure may use the traditional FL as an example (i.e., FL in which a centralized FL server exists for model aggregation). The embodiments and/or solutions disclosed herein may be applied to any advanced or future FL setup, e.g., a centralized FL server does not exist, and model aggregation may be done in a fully distributed way (e.g., in each round, a specific FL participant may be selected as a model aggregator based on election).

In describing embodiments and/or solutions disclosed herein, this disclosure may use mobile vehicles, cellphones as the example of FL participants. The embodiments and/or solutions disclosed herein may be applied to any terminals or entities, such as but not limited to laptops, Internet-of-Things devices, equipment, future cellphones, drones, road-side units, laptops, TV set-top boxes, gateways, access points, satellites, sensor nodes, robots, machines, routers, base stations, radio access network central units, radio access network distribution units, radio access network radio units, network functions in 5GS and/or 6GS, intelligence reflective surfaces, etc.

In describing embodiments and/or solutions disclosed herein, this disclosure may use AI/ML models as a special type of data. The embodiments and/or solutions disclosed herein may be applied to other types of data, as well or in the alternative.

In describing embodiments and/or solutions disclosed herein, this disclosure may use "local model update" and/or "global model update" as an example. The embodiments and/or solutions may be applied to the final trained model as well. The final trained model may be regarded as the global model update of the last training round or the final global model update.

Among the procedures, methods, architectures, apparatuses, systems, devices, and computer program products is a method that may include any of: receiving information indicating a blockchain storage request, including information associated with a distributed learning task; obtaining information identifying one or more blockchains based on a blockchain storage solution, wherein the blockchain storage solution is based on the information indicating a blockchain storage request; determining blockchain-related instructions based on (and/or from) the blockchain storage solution, wherein the blockchain-related instructions comprise at least some of the information identifying one or more blockchains; and transmitting the blockchain-related instructions to a plurality of participant nodes. In various embodiments, the method may be implemented in an apparatus that may be, may include and/or may be configured with circuitry, including a transmitter, a receiver, a processor and memory.

In various embodiments, the method may include determining the blockchain storage solution based on the information indicating a blockchain storage request. In various embodiments, obtaining information identifying one or more blockchains may include obtaining, based on a blockchain storage solution, information identifying the one or more blockchains at one or more blockchain nodes. In various embodiments, obtaining information identifying one or more blockchains may include identifying an availability, in a blockchain system, of one or more blockchains based on the blockchain storage solution. In various embodiments, obtaining information identifying one or more blockchains may include creating one or more new blockchains based on availability of one or more blockchains in a blockchain system.

Among the procedures, methods, architectures, apparatuses, systems, devices, and computer program products is an apparatus that may be configured to receive information indicating a blockchain storage request, including information associated with a distributed learning task; obtain information identifying one or more blockchains based on a blockchain storage solution, wherein the blockchain storage solution is based on the information indicating a blockchain storage request; determine blockchain-related instructions based on (and/or from) the blockchain storage solution, wherein the blockchain-related instructions comprise at least some of the information identifying one or more blockchains; and/or transmit the blockchain-related instructions to a plurality of participant nodes. In various embodiments, the apparatus may be, may include and/or may be configured with circuitry, including a transmitter, a receiver, a processor and memory.

In various embodiments, the apparatus may be configured to determine the blockchain storage solution based on the information indicating a blockchain storage request. In various embodiments, the apparatus may be configured to obtain, based on a blockchain storage solution, information identifying the one or more blockchains at one or more blockchain nodes. In various embodiments, the apparatus may be configured to identify, based on the blockchain storage solution, an availability of one or more blockchains in a blockchain system. In various embodiments, the apparatus may be configured to create one or more new blockchains based on availability of one or more blockchains in a blockchain system.

In various embodiments of any of the method and apparatus, the blockchains may be disposed at one or more blockchain nodes. In various embodiments of any of the method and apparatus, the information identifying one or more blockchains may include information identifying the one or more blockchain nodes. In various embodiments of any of the method and apparatus, the blockchain-related instructions may be configured to implement or cause implementation of the blockchain storage solution.

In various embodiments of any of the method and apparatus, the information indicating a blockchain storage request may indicate the blockchain storage request is for the distributed learning task. In various embodiments of any of the method and apparatus, the information indicating a blockchain storage request may include the information associated with the distributed learning task. In various embodiments of any of the method and apparatus, the information indicating a blockchain storage request may be and/or include a message configured according to a protocol.

In various embodiments of any of the method and apparatus, the apparatus may be a transmit/receive unit and/or may be, may include and/or may be configured as any one of a user equipment, a station, a base station, and an access point. In various embodiments of any of the method and apparatus, the apparatus may be, may include and/or may be configured with or as at least one participant node of the plurality of participant nodes. In various embodiments of any of the method and apparatus, each of the plurality of participant nodes may be, may include and/or may be configured as or with any one of a user equipment, a station, a base station, and an access point.

In various embodiments of any of the method and apparatus, the information indicating a blockchain storage request may include an identifier of the distributed learning task. In various embodiments of any of the method and apparatus, the information indicating a blockchain storage request may include information identifying the distributed learning task. In various embodiments of any of the method and apparatus, the information indicating a blockchain storage request may include an identifier associated to the federated learning task.

In various embodiments of any of the method and apparatus, the information indicating a blockchain storage request may include information identifying the plurality of participant nodes. In various embodiments of any of the method and apparatus, the information identifying the plurality of participant nodes may include a list of information identifying the plurality of participant nodes. In various embodiments of any of the method and apparatus, the information indicating a blockchain storage request may include any of information associated with storing local model updates corresponding to each of the plurality of participant nodes; and information associated with storing a global model update based on an aggregation of the local model update information.

In various embodiments of any of the method and apparatus, the blockchain storage solution may include a first blockchain for storing a full version of the local model updates corresponding to one or more of the plurality of participant nodes. In various embodiments of any of the method and apparatus, the blockchain storage solution may include a second blockchain for storing a tailored version of the local model updates corresponding to one or more of the plurality of participant nodes. In various embodiments of any of the method and apparatus, the blockchain storage solution may include a blockchain for storing (i) a full version of the local model updates corresponding to at least one of the plurality of participant nodes, and (ii) a tailored version of the local model updates corresponding to at least one of the plurality of participant nodes.

In various embodiments of any of the method and apparatus, the blockchain storage request may be initiated from an application executing at the apparatus. In various embodiments of any of the method and apparatus, the information indicating a blockchain storage request is received from an application executing at the apparatus. In various embodiments of any of the method and apparatus, blockchain storage request may be received from another apparatus comprising a transmitter.

Among the procedures, methods, architectures, apparatuses, systems, devices, and computer program products is a method that may include any of: receiving, from any of a participant node and a blockchain node, information indicating a first blockchain transaction for storing a full version of a local model update generated by the participant node during a round i has been recorded in a blockchain; generating a tailored version of local model update included in blockchain transaction; creating a second blockchain transaction for storing the tailored version; and sending, to the blockchain node, the second blockchain transaction for recordation in the blockchain. In various embodiments, the method may be implemented in an apparatus that may be, may include and/or may be configured with circuitry, including a transmitter, a receiver, a processor and memory.

Among the procedures, methods, architectures, apparatuses, systems, devices, and computer program products is an apparatus configured to perform at least the foregoing method. In various embodiments, the apparatus may be, may include and/or may be configured with circuitry, including a transmitter, a receiver, a processor and memory.

In various embodiments of any of the method and the apparatus, the apparatus may be a transmit/receive unit and/or may be, may include and/or may be configured as any one of a user equipment, a station, a base station, and an access point.

Among the procedures, methods, architectures, apparatuses, systems, devices, and computer program products is a method that may include any of: receiving, from a first entity, a request to access first information related to a distributed learning task; identifying where the first information is located in a blockchain system based on second information included and/or indicated in the request; retrieving the first information from the blockchain system via a blockchain node; and sending the first information to the first entity. In various embodiments, the method may be implemented in an apparatus that may be, may include and/or may be configured with circuitry, including a transmitter, a receiver, a processor and memory.

Among the procedures, methods, architectures, apparatuses, systems, devices, and computer program products is an apparatus configured to perform at least the foregoing method. In various embodiments, the apparatus may be, may include and/or may be configured with circuitry, including a transmitter, a receiver, a processor and memory.

In various embodiments of any of the method and the apparatus, the apparatus may be a transmit/receive unit and/or may be, may include and/or may be configured as any one of a user equipment, a station, a base station, and an access point.

Among the procedures, methods, architectures, apparatuses, systems, devices, and computer program products is a method that may include any of: receive, from a first entity, a request to obtain a trained model that satisfies one or more criteria, including a first fee amount for use of the trained model; determining that the trained model or an alternative trained model that satisfies at least some of the criteria is available from a blockchain system based on first information collected from the blockchain system; collecting, from the blockchain system, second information associated with the trained model or the alternative trained model, including a smart contract defining at least a second fee amount for use of the trained model or alternative trained model; accepting the first fee amount for payment; triggering the smart contract, including paying the second fee amount; and providing, to the first entity, information for obtaining the trained model or alternative trained model. In various embodiments, the method may be implemented in an apparatus that may be, may include and/or may be configured with circuitry, including a transmitter, a receiver, a processor and memory.

Among the procedures, methods, architectures, apparatuses, systems, devices, and computer program products is an apparatus configured to perform at least the foregoing method. In various embodiments, the apparatus may be, may include and/or may be configured with circuitry, including a transmitter, a receiver, a processor and memory.

In various embodiments of any of the method and the apparatus, the smart contract that specifies how to allocate trading income. In various embodiments of any of the method and the apparatus, a blockchain access service may be informed that the second fee has been paid by the first entity.

In various embodiments of any of the method and the apparatus, the apparatus may be a transmit/receive unit and/or may be, may include and/or may be configured as any one of a user equipment, a station, a base station, and an access point.

Representative solutions directed to disclosures herein, including the first representative aspect are provided. In an FL task, multiple FL participants may be involved. In various embodiments, the FL participants may be untrusted (lack a trust relationship with one another) given at least some of the FL participants may not be from the same organizations and may join an FL task on an ad hoc basis. Application of blockchain technology may enable traceability and accountability of the FL training process among the FL participants, for instance, to allow for corrective measures to be taken if FL participants (e.g., malicious nodes) upload bad local model updates (e.g., purposely upload many bad local model updates). Some technical requirements to be considered when multiple FL participants may be working on a specific FL task are as follows:

Requirement 1: From an FL task initiator perspective, a first requirement to consider is the type or types of information it would like to store in the blockchain. For example, the FL task initiator may want to store the local model updates of all the FL participants in order to enable accountability. The FL task initiator may want to store the global model updates in each round, as well as the final delivered and/or trained model.

Requirement 2: After the FL task initiator specifies the type or types of information to store in the blockchain, a second requirement to consider may be how to deliver this message to the FL participants so that the FL participants may get to know and follow that information. The FL task initiator may not know the FL participants at all, and the FL participants may be dynamically changed or reselected. As such, it may bring an additional burden to the FL task initiator if it has to contact each of the involved FL participants for conveying what information may be needed to be recorded in the blockchain system.

Requirement 3: A third requirement to consider may be how and/or which entity/node is to prepare the information to be written into the blockchain. For example, an FL participant, may have different versions for a given local model update generated by the FL participant. The full version may have a complete gradient update (leading to a higher accuracy), but such a local model update may be large in size (in terms of an amount of storage). Some existing research solutions propose reducing the size of the model updates by conducting certain tailoring operations, e.g., only storing the most important updates, doing model distillation, etc.; but carrying out these tailoring operations may downgrade the model accuracy. If both the full version and tailored version of a given model need to be written into the blockchain, part of the third requirement may be consideration of which entities/nodes are to prepare the tailored version of the model. A straightforward approach may be to rely on the FL participants to do all the work, but this adds extra workload for the FL participants.

Requirement 4: Assuming a full version model and a corresponding tailored version of the model may be already produced and ready to be written into the blockchain. A fourth requirement to consider may be how should the data (the full version model and the corresponding tailored version of the model) be stored in the blockchain. For example, part of the fourth requirement may be consideration of whether to store the full version model and the corresponding tailored version of the model in the same chain or in different chains. It adds an extra burden to FL participants and/or FL task initiators, if the FL participants and/or FL task initiators have to handle such details, which requires a deep interaction and understanding of the underlying blockchain system.

Overall, it may be seen that for each model (either an interim local and/or global model update or a final trained model), it could have different versions, and those different versions may be useful for different situations or scenarios. For example, some of the scenarios may request a high-accuracy model even if such a model may be large. But for storage efficiency, a full model update without any tailoring operation may be recorded by the blockchain system in a larger interval, e.g., only one full model update of an FL participant may be recorded in every five training rounds.

A Blockchain Storage Service (BSS) may be provided. The BSS may support other value-added services to an FL application. The BSS may have unique properties, which may be to address the above technical requirements and/or which may include any of the following:

Property 1: A BSS client (e.g., an FL task initiator) may specify its requirements on the types of information (e.g., the local and global model updates in each round) it would like to store in the blockchain. In particular, various requirements may be specified, such as whether full versions should be stored, whether tailored versions should be stored, etc.

Property 2: Given the collected requirements, the BSS may decide the underlying blockchain storage structure details. For example, the BSS may decide which and how many blockchains to use, which information to store or should be stored in the same chain, which information to store/should be stored in different chains, etc.

Property 3: After obtaining the storage requirements from a BSS client (e.g., an FL task initiator), the BSS may figure out which FL participants may be involved, and then may contact each of FL participants (on behalf of the BSS client), in order to convey the type or types of information that is/are to be stored in the blockchain system.

Property 4: Some information may need certain processing. For example, a tailored version of the model may be produced by applying the desired tailoring operations on a full version of the model. The BSS may specify which tailoring operations should be done and/or which entity/node or entities/nodes should conduct the tailoring operations.

The BSS might not have to convey to the FL participants information regarding the underlying blockchain storage organization and structure. The BSS may convey the most important information to the FL participants and may hide the blockchain storage details. For example, the BSS may just inform the FL participants of a blockchain ID chain-1 (i.e., an identifier of a chain for storing information-X), which the FL participants may use to generate blockchain transactions for storing information-X.

Representative FL Data Storing Configuration

Figure 7:
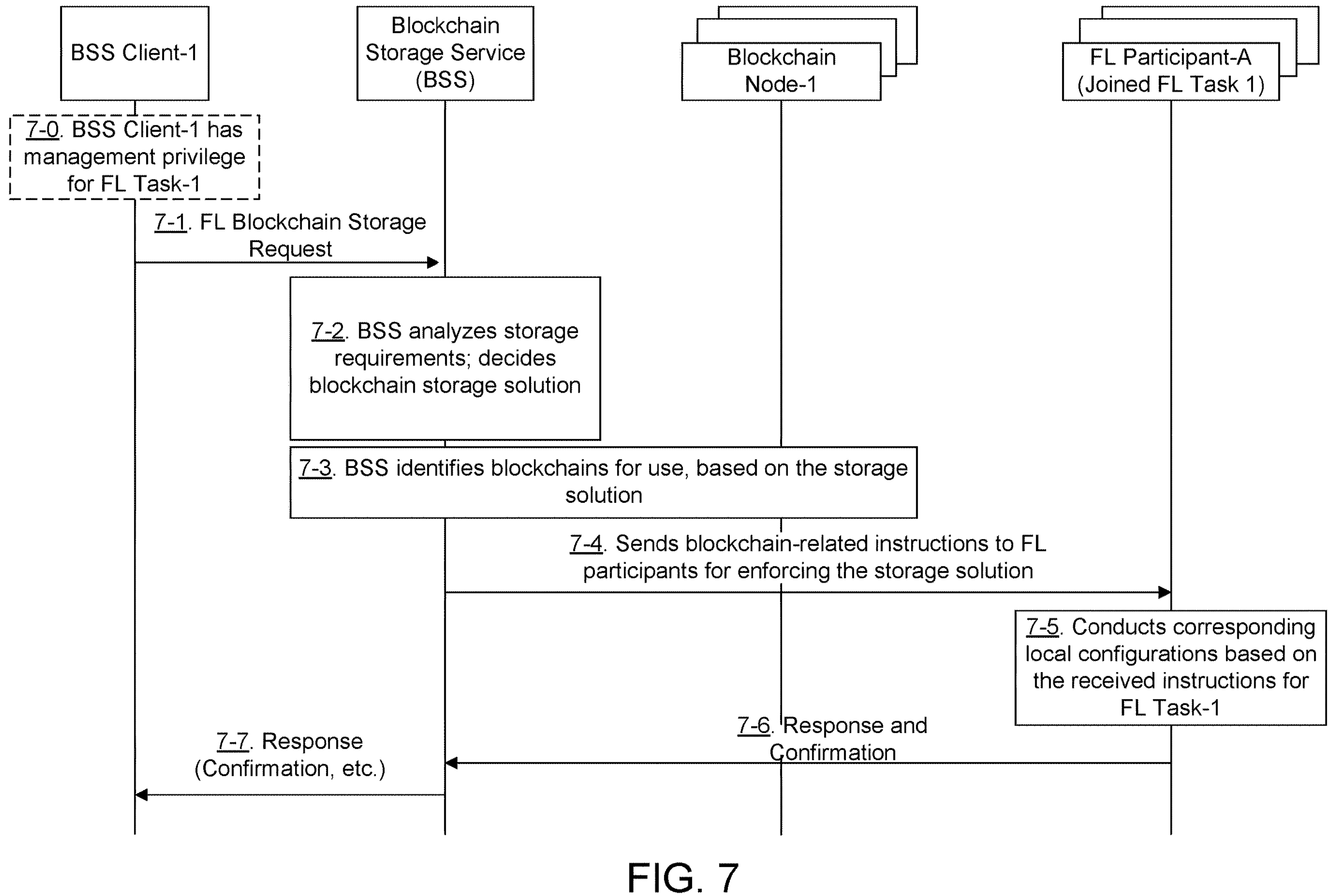
FIG. 7 illustrates an example procedure for a FL data storing configuration.

FIG. 7 illustrates an example procedure of FL data storing configuration with BSS.

The procedure may be suitable for supporting model and/or data (e.g., FL model updates) storing process, e.g., to store local and/or global model updates into the blockchain, with the help of the BSS.

Precondition (7-0). A BSS client ("BSS Client-1") may have a management privilege for an FL task ("FL Task-1"). The BSS Client-1 may be a logical role. For example, the BSS Client-1 may be an FL initiator of the FL Task-1.

Step 7-1. The BSS Client-1 may send a blockchain storage request for the FL Task-1. In the request, the BSS Client-1 may specify (indicate and/or include) various information, e.g., requirements regarding the type or types of information about the FL Task-1 that should be (or are to be) stored in the blockchain, other storage needs (e.g., other high-level storage needs). For example, the request may include and/or indicate any of a FL task ID, involved FL participants, information (e.g., parameters) related to local model updates, information (e.g., parameters) related to global model updates, training progress and performance data and any other related information (such as follows)

The FL task ID is an identifier of the FL Task-1. The FL task ID may be included and/or indicated in the request to indicate that the request concerns the corresponding FL task, FL Task-1.

The Involved FL participants may be e.g., a list of (e.g., identifiers associated with) the FL participants involved in the FL Task-1. The involved FL participants may be included and/or indicated in the request to indicate the FL participants that may be involved in the FL Task-1. It may be possible that the BSS Client-1 may not know the involved FL participants. If that may be the case, the BSS may obtain the involved FL participants information from the blockchain system in accordance with Step 3 below.

The information (e.g., parameters) related to local model updates may include any of information indicating whether to store local model updates, information indicating whether to store a full version of a local model update, information indicating a storing frequency for a full version of a local model update, information indicating whether to store a reduced version or a tailored version of a local model update, information indicating a storing frequency for a tailored model, information indicating which model tailoring operation(s) may be adopted, and information indicating the entity/node or entities/nodes is or are to conduct the model tailoring operation(s).

The information indicating whether to store local model updates may be included and/or indicated in the request to indicate whether a local model update of each FL participant is to be and/or should be recorded in the blockchain. The information indicating whether to store a full version of a local model update may be included and/or indicated in the request to indicate whether the full or original version of the local model update is to be and/or should be recorded in the blockchain.

The information indicating a storing frequency for a full version of a local model update may be included and/or indicated in the request to indicate how frequently a full version of the local model update for a given FL participant should be recorded in this blockchain. A full version of a local model update may be large in size and storing the full version frequently (e.g., every training round) may be costly in terms of transmission and/or storage resources. The information indicating a storing frequency for the full version of a new local model update of a new training round may indicate to store the full version in the blockchain when a difference between the current full version and a previously stored full version of an old local model update exceeds a preconfigured threshold.

The information indicating whether to store a reduced version or a tailored version of a local model update may be included and/or indicated in the request to indicate whether the reduced and/or tailored version of the local model update for each FL participant should be recorded in the blockchain. The information indicating a storing frequency for a tailored model may be included and/or indicated in the request to indicate how frequently a tailored local model update should be recorded in this blockchain. The tailored version of the model may be in smaller in size than a full version of a local model update and it may be affordable to record those updates for each of the training rounds.

The information indicating which model tailoring operation may be adopted may be included and/or indicated in the request to indicate how to use a full model update to generate a tailored model update. The approaches may include e.g., only storing the most important updates, doing model distillation, etc.

The information indicating who is to conduct the model tailoring operation may be included and/or indicated in the request to indicate who may be going to conduct the desired model tailoring operation. In a straightforward case, the FL participant may do the tailoring operation, but it may add a certain workload to the FL participants. Alternatively, the FL participants may deliver the full version of local model updates, and the BSS may handle the remaining parts to generate the tailored version and record it in the blockchain system.

For global model update (e.g., the one produced by the FL server after local model update aggregation) in each round, similar information and/or parameters may be provided, e.g., any of the information (e.g., parameters) related to global model updates and training progress and performance data and any other related information.

The information (e.g., parameters) related to global model updates may include any of information indicating whether to store global model update, information indicating whether to store the full version of the global model update, information indicating storing frequency for full model, information indicating whether to store the tailored version of the global model update, information indicating storing frequency for tailored model, information indicating the model tailoring operation(s) that may be adopted, and information indicating the entity/node or entities/nodes is or are to conduct the model tailoring operation(s).

The information indicating whether to store global model update may be included and/or indicated in the request to indicate whether the global model update should be recorded in the blockchain. The information indicating whether to store the full version of the global model update may be included and/or indicated in the request to indicate whether the full or original version of the global model update should be recorded in the blockchain. The information indicating storing frequency for full model may be included and/or indicated in the request to indicate how frequently the full version of the global model update should be recorded in this blockchain.

The information indicating whether to store the tailored version of the global model update may be included and/or indicated in the request to indicate whether the tailored version of the global model update should be recorded in the blockchain. The information indicating storing frequency for tailored model may be included and/or indicated in the request to indicate how frequently the tailored global model update should be recorded in the blockchain.

The information indicating which model tailoring operation may be adopted may be included and/or indicated in the request to indicate how to use a full model to generate a tailored model. The information indicating the entity/node or entities/nodes that is or are to conduct the model tailoring operation e.g., the FL server may conduct this operation, or need to rely on the BSS to do so.

The training progress and performance data and any other related information may include, e.g., a time cost a given FL participant took for completing local training during round i; a computing resource that has been allocated for the local training during round i; etc.

Step 2. The BSS first may need to and may verify whether FL Task-1 may be a valid task. e.g., by checking with some other entities such as an FL task repository or the FL Task Initiator of FL Task-1 if the BSS Client-1 may not be the initiator. The BSS may need to make sure and ensure that the BSS Client-1 may have the corresponding privileges. If BSS Client-1 may be the FL Task Initiator, this verification may not be needed. The BSS may analyze the storage requirements received in Step 1, and the BSS may need to and may decide a detailed blockchain storage organization and structure solution. For example, the solution may specify any of the following details:

- One chain may be needed for storing the full version of local model updates. However, for a given FL participant, the blockchain might only need to store a full version of the local model update for every 5 rounds (which depends on the received "storing frequency for full model" parameter).
- One chain may be needed for storing the tailored version of local model updates. For a given FL participant, the blockchain may store a tailored version of the local model update for every round, or every two rounds (which depends on the received "storing frequency for tailored model" parameter).
- One chain may be needed for storing a full version of the global model update during each training round.
- One chain may be needed for storing a tailored version of global model updates during each training round.

In the above example, four different chains may be needed to store different versions of models. Such a chain organization may facilitate future model access in the blockchain system. For example, if a user only intends to retrieve all the global mode updates for the FL Task-1, it might only need to access a particular chain. The BSS may determine other types of storage solutions as well, which may fully depend on application needs. For example, the BSS may store all types of information (the full or tailored version of local and/or global model update) in a single chain, i.e., mix all the data together.

Step 7-3. The BSS may identify whether there may be available blockchains for use, based on the decided storage solution in Step 2. If there may be no available blockchain for use in the blockchain system, the BSS may have one or more new chains created accordingly. For example, in the above example, the BSS may require four chains to store four different types of information for the FL Task-1. After identifying those chains (and/or having one or more of such chains created), the BSS may obtain the chain identifiers (i.e., a chain_ID for each chain) of the chains.

The BSS may collect other useful information from the blockchain. For example, if the BSS Client-1 did not indicate the related FL participants of the FL Task-1. The BSS may need to check and may check whether such information may be obtained from the blockchain system. For example, there could be another management chain available in the blockchain system for the FL Task-1, which may be created when the FL Task-1 was created. The BSS may access this chain to get basic information about the FL Task-1, such as the involved FL participants.

The BSS may convey certain information to BCNs in the underlying blockchain system. For example, if the underlying blockchain system may be a permissioned blockchain, only the permitted parties may be allowed to operate. The BSS may indicate which entity/node or entities/nodes may be the FL participants (if the underlying BCNs do not know this information) and make sure those FL participants have the access privileges to generate and store transactions in the blockchain. For example, the BSS may get the list of current FL participants from the FL server or any other entity or entities that maintain the list of current FL participants. The BSS may send the list of current FL participants to one (or more) of the BCNs ("BCN-1"). The BCN-1 may use this list for access control purposes (e.g., only FL participants included in this list may be allowed to send a blockchain transaction and store information to the blockchain). Alternatively, the BSS may collect certain information regarding the BCNs, e.g., any constraints for the FL participants when generating blockchain transactions. For a given FL participant, the constraint may be which one or more of the BCNs it may need to interact with when sending blockchain transactions, etc.

Step 7-4. The BSS may send blockchain-related instructions to each of FL participants (e.g., the FL Participant-A) for enforcing/implementing the decided storage solution, along with other useful information that FL participants may need to know, such as those discussed in Step 3.

For a given piece of data to be collected from an FL participant, any of the following information (e.g., parameters) may be included:

- FL task ID. This information may be included and/or indicated in the message and/or instructions to indicate this request may concern the FL Task-1. The FL task ID corresponding to the FL Task-1 may be included to differentiate from other FL tasks given that an FL participant may join multiple different FL tasks.
- information indicating the piece of data to be collected (e.g., a piece of data may refer to a local model update if the message is sent to an FL participant or may refer to a global model update if the message in this step is sent to an FL server or a model aggregator).
- information indicating to store a full version or a tailored version or both.
- information indicating the tailoring operation(s) to be applied on this data. If the tailoring operation is to be done by the FL participant, then this parameter may be indicated and/or included. If the tailoring operation is to be done by the BSS, then this parameter may not be indicated and/or included.
- information indicating where (a location) to download tailored operation code. This parameter may only be indicated and/or included when the tailoring operation is to be done by the FL participant.
- detailed instructions for recording the full version of the local model update in the blockchain system. The chain identifier of the chain to be used for storing the full version of the local model update may be indicated. For example, chain-1 may be used to store the full version of the local model update. The blockchain transaction format of chain-1 may be indicated, so that the FL participants may be able to create formal blockchain transactions to include its full version of the local model update and submit it to the blockchain system, which records it in the chain-1. Any of the following information may be included in the transaction format instructions (the regular blockchain transaction headers are not listed here for simplicity):

- the FL Task ID.
- a sequence number of the corresponding training round.
- an identifier of FL Participant, e.g., an FL participant ID.
- a digest or hash value of local data used for training (e.g., if the local data used for this round has been changed compared to previous training rounds).
- an address and/or location of local data used for training if it is not directly hosted by the FL participant.
- a digest of the used global model update, i.e., the current local model update was produced based on which previously received global model update that was sent from the FL server or model aggregator. For example, the local training of round i may be started with a received global model update produced by the FL server during round i-1.
- an address and/or location of the used global model update. For example, this may be the address of the FL server.
- the full version or the tailored version of the local and/or global model update, or hash values of the full version or the tailored version of the local and/or global model update.
- information indicating the number of local and/or global updates included. For example, one transaction may include only one local model update for a given training round. Alternatively, and/or additionally, the information indicating the number of included local and/or global updates may indicate the number of multiple local model updates for multiple rounds. Alternatively, and/or additionally, the information indicating the number of included local and/or global updates may indicate the number of multiple local model updates of different FL participants for a particular training round.
- the address of the recipient that may receive, know, and/or be notified of this transaction, e.g., a specific BSS, or an FL server.
- training progress and performance data and any other related information, e.g., a time cost a given FL participant took for completing local training during round i, a computing resource that has been allocated for the local training during round i, etc.

detailed instructions for recording the tailored model update in the blockchain system. The detailed instructions for recording the tailored model update may be similar to the instructions for a full model update. For example, a chain-2 may be used to store the tailored version of the local model update and a blockchain transaction format for chain-2 may be indicated to the FL participant. In case that the tailoring operation is to be done by the BSS instead of by the FL participant itself (in this case, the FL participant does not have to know which chain or chains are to be used for storing the tailored model updates), any of the following approaches may be adopted:

- The FL participant may directly send a full version of the local model update to the BSS. The BSS side may first conduct the desired tailoring operation to create a tailored version of the local model update. The BSS may create a formal blockchain transaction and submit it to the blockchain system, which records it in a targeted chain.
- Alternatively, the FL participant may just submit the blockchain transactions to the blockchain system, which include the full version of local model updates (e.g., those transactions may be stored on chain-1). After such information may be made available on chain-1, the BSS may be able to obtain the full version of local model updates. The BSS may access the full version of the model from chain-1, create a tailored version and cause it the tailored version to be stored in chain-2, for example.

BCN access information: This may include all the information regarding how the FL participant should interact with the selected blockchain system, including:

- a particular BCN ID that the FL participant interacts with. For example, the FL participant-A may use the BCN-1 for interacting with the corresponding blockchain system.
- an access address of the selected BCN.
- a duty-cycle of the BCN or any other constraints, etc.

The above details are described based on an example of a local model update on an FL participant. The solution may be used for a global model update on an FL server or a model aggregator (in a fully distributed FL scenario where an FL server does not exist) as well.

Step 7-5. The FL Participant-A may conduct corresponding local configurations based on the received instructions in Step 4. For example, the FL participant-A may send a hello message to the BCN-1 to establish an association, connection and/or session with the BCN-1 (if it has not been able to connect to BCN-1) in order to send any storage requests in the future. The BCN-1 may send back a response if it already authorized the FL participant-A to send blockchain transactions and/or any other information and/or instructions related to how to interact with the BCN-1.

Step 7-6. The FL Participant-A may send a response and confirmation to the BSS.

Step 7-7. The BSS may send a response and confirmation to the BSS Client-1.

The BSS may be hosted by a specific blockchain management node. The blockchain management node may interact with various BCNs. Alternatively, the BSS may be implemented in a fully distributed way. For example, each BCN may host a BSS function module for providing the BSS service. In that case, the interaction between the BSS and a BCN becomes an internal interface.

Representative FL Data Storing Process

A new procedure to support the FL model update storing process, e.g., to store local or global model updates into a blockchain, with the help of a BSS is provided.

Figure 8:
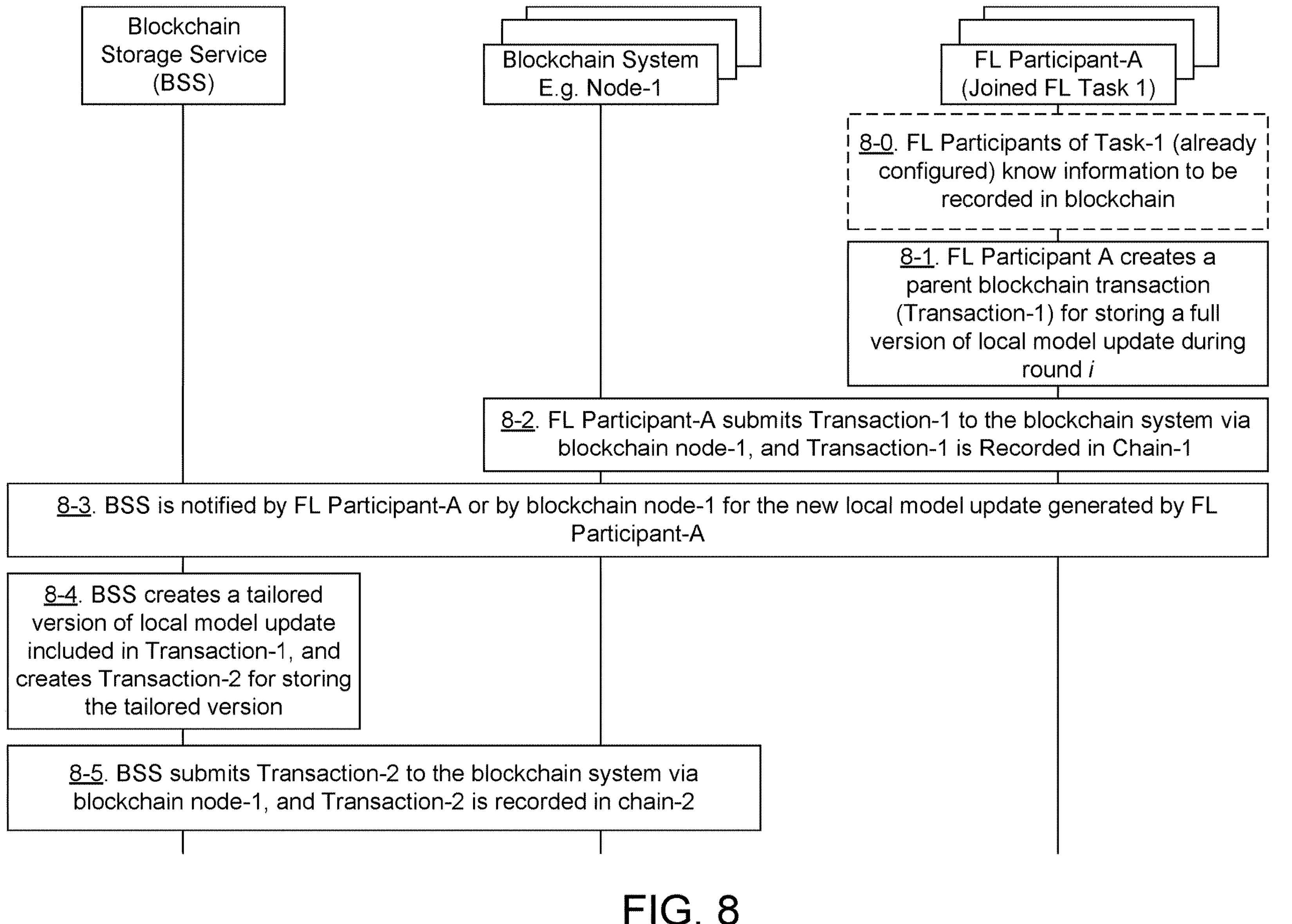
FIG. 8 illustrates an example procedure for executing FL data storing.

FIG. 8 illustrates an example procedure of executing FL data storing process with the BSS.

Pre-condition 8-0. The FL participants of the FL task-1 may have already been configured and may know the information to be written into the blockchain via the procedure shown in FIG. 8.

Step 8-1. The FL Participant-A (as one of the FL participants of FL Task-1) may complete the local model updates for the current round i. Based on the configuration, the FL Participant-A may know that the full version of the local model update may be stored in chain-1 in the blockchain system. The FL Participant-A may create a parent blockchain transaction (Transaction-1) for storing a full version of the local model update for this round, based on a transaction format of chain-1.

Step 8-2. The FL Participant-A may submit the Transaction-1 to the blockchain system via the BCN-1. After a certain consensus process, the Transaction-1 may be recorded in chain-1.

The BCN-1 may reject the Transaction-1 if the FL Participant-A is not in the list of current FL participants for the FL Task-1 and/or if the way that the FL Participant-A generates the Transaction-1 does not follow the configuration that the BSS may have enforced/implemented in FIG. 7. For example, if the FL Participant-A may send transactions too frequently and exceeds the "storing frequency for full model", the BCN-1 may reject some received transactions. Alternatively, the BSS may have instructed the BCN-1 to randomly reject transactions from a specific or any FL participant as a part of Step 3 of FIG. 7. As a result, a transaction received from an FL Participant (e.g., FL Participant-A) may be discarded by the BCN-1 based on a probability configured by the BSS. The random dropping of a transaction may help mitigate the danger of recording malicious local model updates. In general, the BSS may configure some blockchain access control rules to the BCN-1 as a part of Step 3 of FIG. 7, which may be used by the BCN-1 in Step 2 herein to authorize any received transactions from FL participants. For example, the BCN-1 may decide whether to accept access request from a given FL participant or an FL server based on any of the following access control criteria: (i) whether the FL participant currently may have privileges of accessing a specific (e.g., permissioned) blockchain system. (i) whether the FL participant interacts with its designated BCN; (ii) whether the FL participant accesses the BCN within the right time window, e.g., not in a sleep cycle of the BCN; (iii) whether the FL participant uses the correct secure protocol and message when interacting with the BCN; (iv) etc.

Other FL participants may concurrently submit their local model updates to the blockchain system too. For each training round, there may be multiple blockchain transactions being submitted by multiple FL participants and each transaction may include a local model update. The transactions containing local model updates need to be and may be verified and may be added to a block. The BSS may instruct the blockchain system that transactions containing local model updates from the same training round are to be stored in the same block (if they are to be recorded on the same chain). The BSS may inform the BCNs of such instructions in Step 3 of FIG. 7. Alternatively, the BSS may instruct the blockchain system to group transactions containing local model updates from different training rounds and store the grouped transactions in the same block.

Step 8-3. Depending on the configuration, the BSS may be notified by the FL Participant-A or by the BCN-1 that a new local model update generated by the FL Participant-A may be available.

Step 8-4. The BSS may obtain the new local model update. According to the configuration, the BSS may know that the BSS needs to conduct a model tailoring operation. Accordingly, the BSS may create a tailored version of the local model update included in the Transaction-1. The BSS may know that the tailored version of the local model update may be stored in chain-2 in the blockchain system. The BSS may create a child blockchain transaction (Transaction-2) for storing the tailored version of the local model update for this round, based on the transaction format of chain-2.

Step 8-5. The BSS may submit the Transaction-2 to the blockchain system via the BCN-1. The Transaction-2 may be recorded in the chain-2 after a consensus process. For example, in addition to the normal information, any of the following information may be included:

- the FL Task-ID.
- an associated or parent transaction ID. The associated or parent transaction ID may be included to indicate this transaction may be associated with other transactions. For example, the Transaction-2 may be created by the BSS, which may be based on its parent Transaction-1. The ID of Transaction-1 may be included in this parameter in order to relate/bind the two transactions.
- a sequence number of the corresponding training round.
- an address of a recipient that may receive, know, and/or be notified of this transaction, e.g., a specific BSS or an FL server.
- training progress and performance data and any other related information.

In addition, storage of such transactions in the underlying blockchain system is dependent on a specific storage solution. For example, all transactions storing the local and/or global model updates during round i (either produced by the FL participants for the full version or produced by the BSS for the tailored version) may be stored in the same block and may be recorded on the same chain.

The above details are described based on an example of a local model update on an FL participant. The solution may be used for storing a global model update on an FL server or model aggregator, as well.

In a scenario (e.g., a generalized scenario), the solutions may be applied to any of the following scenarios:

An FL participant may record its local model update in a chain specifically for its own usage. The FL participant may participate in multiple FL tasks, and it may record the local model updates from the multiple FL tasks in the same chain.

The data and/or model storing process might not have to be executed in each round. For example, an FL participant may store its local model updates every x rounds. The local model updates in all the x-th rounds may be put into the same blockchain transaction and may be submitted to the blockchain system. In this way, interactions between the FL application and the blockchain system may be minimized.

Storing model (e.g., local or global model updates or the final trained models) in the blockchain system may refer to two possible cases. In the first case ("Case 1"), the data may be directly written into a blockchain transaction and stored on a chain (as illustrated above). In the second case ("Case 2"), only data summary (i.e., certain hash functions may further need to be applied on those local and/or global model updates in order to generate the data summary) may be stored on-chain and the real and/or original data may be stored in off-chain locations. The solutions (e.g., all of the solutions disclosed herein) may be applicable to both of those two cases.

Representative solutions directed to disclosures herein, including the second representative aspect are provided. A BAS may be provided, e.g., in accordance with the second representative aspect. The BAS may be mainly responsible for facilitating model access. The relationship between a BAS and a BSS may be that the BSS may be responsible for efficiently storing the data into the blockchain, while the BAS may have knowledge of data organization and chain structure in the underlying blockchain system and may provide an efficient data access service.

Some of the functionality of the BAS may be described as follows. A BAS client just needs to (e.g., may) specify high-level needs (e.g., what the BAS client wants to retrieve) without specifying the details related to data organization and chain structure in the blockchain system (e.g., which chain should be accessed for retrieving the desired data and/or model). The BAS may handle most of the details, such as: 1) interacting with the blockchain system; 2) identifying the correct chains to access; 3) retrieving the needed information; 4) conducting other (e.g., necessary) processing if needed; and 5) returning the retrieved data to the client. There could be many different use cases related to data and/or model accessing via the BAS, including the procedure below, which may illustrate how a BAS may facilitate blockchain data access. The procedure may be applied in different cases.

Figure 9:
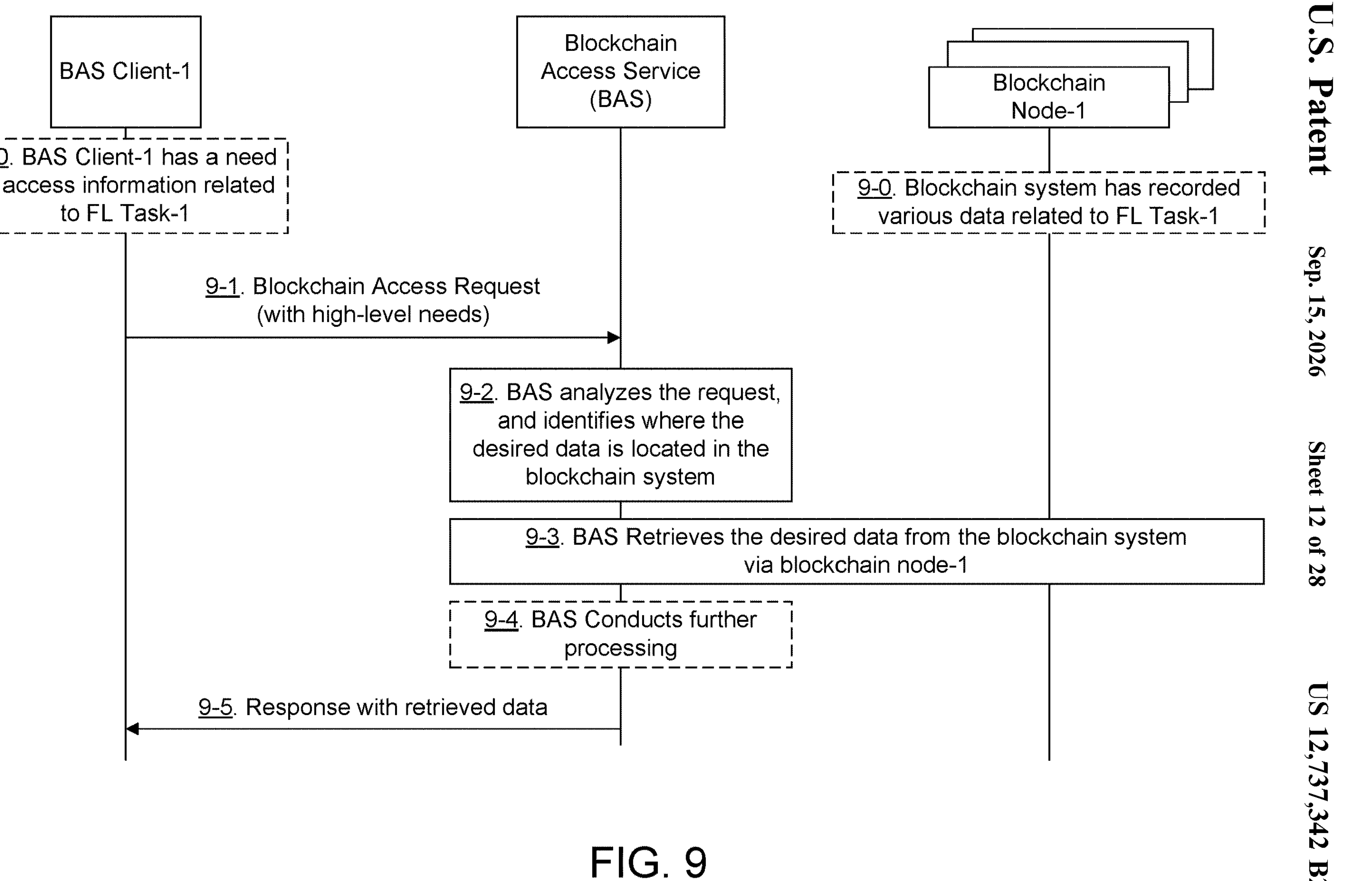
FIG. 9 illustrates an example procedure of a blockchain data access operation for FL applications.

FIG. 9 illustrates an example procedure of a blockchain data access operation for FL applications.

Precondition 9-0. The blockchain system may have recorded various models and/or data related to a FL Task-1. For example, the local model updates of each FL participant in the FL Task-1 may have been recorded. The global model updates and the final trained model produced for the FL Task-1 may have been recorded. The working progress and performance data of the FL participants (e.g., how much time it took for a particular FL participant for conducting local training in each round) may have been recorded. A BAS client ("BAS Client-1") may be a client of a BAS and it may have a certain need to access desired information related to the FL Task-1. The BAS Client-1 might not have any knowledge regarding how the data related to the FL Task-1 is stored in the blockchain system, e.g., in which chains, in which format, etc.

Step 9-1. The BAS Client-1 may send a blockchain access request to the BAS. The BAS Client-1 may specify high-level needs regarding the information to be accessed. For example, given a specific FL Task-1, the BAS Client-1 may specify high-level needs regarding the information to be accessed. Three individual use cases listed below are examples of the information related to the specific FL Task 1 that may be accessed.

Case 1: The BAS Client-1 may intend to retrieve a particular local model update produced by an FL participant p during the $10^{th}$ training round.

Case 2: The BAS Client-1 may intend to retrieve an average time cost of local training of the FL participant p.

Case 3: The BAS Client-1 may intend to retrieve a trained model produced by the FL Task-1. The desired model should have the highest model accuracy with a constraint that the model size needs to be lower than 10 Mb.

Step 9-2. The BAS may analyze the request and identify where the data may be located in the blockchain system. The BAS may have the global knowledge of how the data related to the FL Task-1 may be stored in the blockchain system since it may exchange information with a BSS.

For example:

- for Case 1, the BAS may identify that the local model update produced by the particular FL participant p may be stored in chain-1.
- for Case 2, the BAS may identify that the local training progress and performance data of the FL participant p may be stored in chain-2.
- for Case 3, the BAS may identify that a full version of the trained model produced by FL Task-1 may be stored in chain-3 and that a tailored version of the trained model was not recorded by the blockchain system. The BAS may know, based on information exchanged with the BSS, specific tailoring operations that may be conducted on the full version of the trained model and how to conduct those operations.

Step 9-3. The BAS may retrieve the desired data from the blockchain system, i.e., via the BCN-1. For example:

- for Case 1, the BAS may retrieve the local model update produced by the particular FL participant p from chain-1.
- for Case 2, the BAS may retrieve the local training progress and performance data of the FL participant p from chain-2.
- for Case 3, the BAS may retrieve the full version of the trained model produced by the FL Task-1 from chain-3.

Step 9-4. The BAS may conduct further processing if needed and/or requested. For example:

- for Case 1, the BAS need not conduct further processing for the retrieved data. The BAS may perform formatting processing if the BAS Client-1 requested or otherwise informed the BAS to provide the returned result in a different format (e.g., the retrieved data from the blockchain system may be stored as blockchain transactions, and the BAS Client-1 requested or otherwise informed the BAS to provide the result in a simple JSON file).
- for Case 2, the BAS may calculate an average local training cost (among all the training rounds) for the FL participant p based on the local training progress and performance data of the multiple training rounds retrieved from chain-2.
- for Case 3, the BAS may conduct various tailoring operations based on the full version of the trained model retrieved from chain-3. After that, the BAS may compare the tailored model outputs from the various tailoring operations to determine, from among tailored models that are smaller than a given size (e.g., 10 Mb), the tailored model that has the highest model accuracy (e.g., based on certain test data provided by the BSS and/or provided by the BAS Client-1).

Step 9-5. The BAS may send to BAS Client-1 a response along with the result/requested information, e.g., retrieved data and/or information derived from the retrieved data post retrieval (e.g., a metric determined based on local training progress and performance data, a tailored model generated based on a retrieved full version of the trained model).

The BAS may be hosted by a specific blockchain management node. That blockchain management node may interact with various BCNs. Alternatively, the BAS may be implemented in a fully distributed way. For example, each BCN may host a BAS function module for providing the BAS service. In that case, the interaction between the BAS and a BCN becomes an internal interface.

Representative solutions directed to disclosures herein, including the third representative aspect are provided. A MR or a model directory may be provided, e.g., in accordance with the third representative aspect. The MR may enable a client to identify and/or discover a model to be retrieved. By way of example, before issuing model access operations, a BAS client may interface with the MR to identify and/or discover a model to be retrieved. As another example, a client may interface with the MR to identify and/or discover different versions of various models that may be stored in different chains. As another example, a client may interface with the MR to identify and/or discover a trained model produced by multiple FL participants. The trained model of a particular FL task may be the effort of multiple FL participants, and if the client wants to download the trained model, it may have to pay a certain amount of fee to the model owner, i.e., the multiple FL participants. In various embodiments, a client may interface with the MR to identify and/or discover FL participants involved in producing the trained model, which information may be used to obtain rights to a given trained model.

The MR may run on top of or as a part of underlying blockchains. Some functionalities of MR may include: (i) enabling MR clients (e.g., BAS clients) to discover desired models, e.g., for use by making model access request to the BAS; and/or provide a model trading assistance between the MR clients (e.g., BAS clients) and the FL participants so that the client might not have to interact with the model owner (e.g., the FL participants) directly for paying a certain fee to those FL participants.

Figure 10:
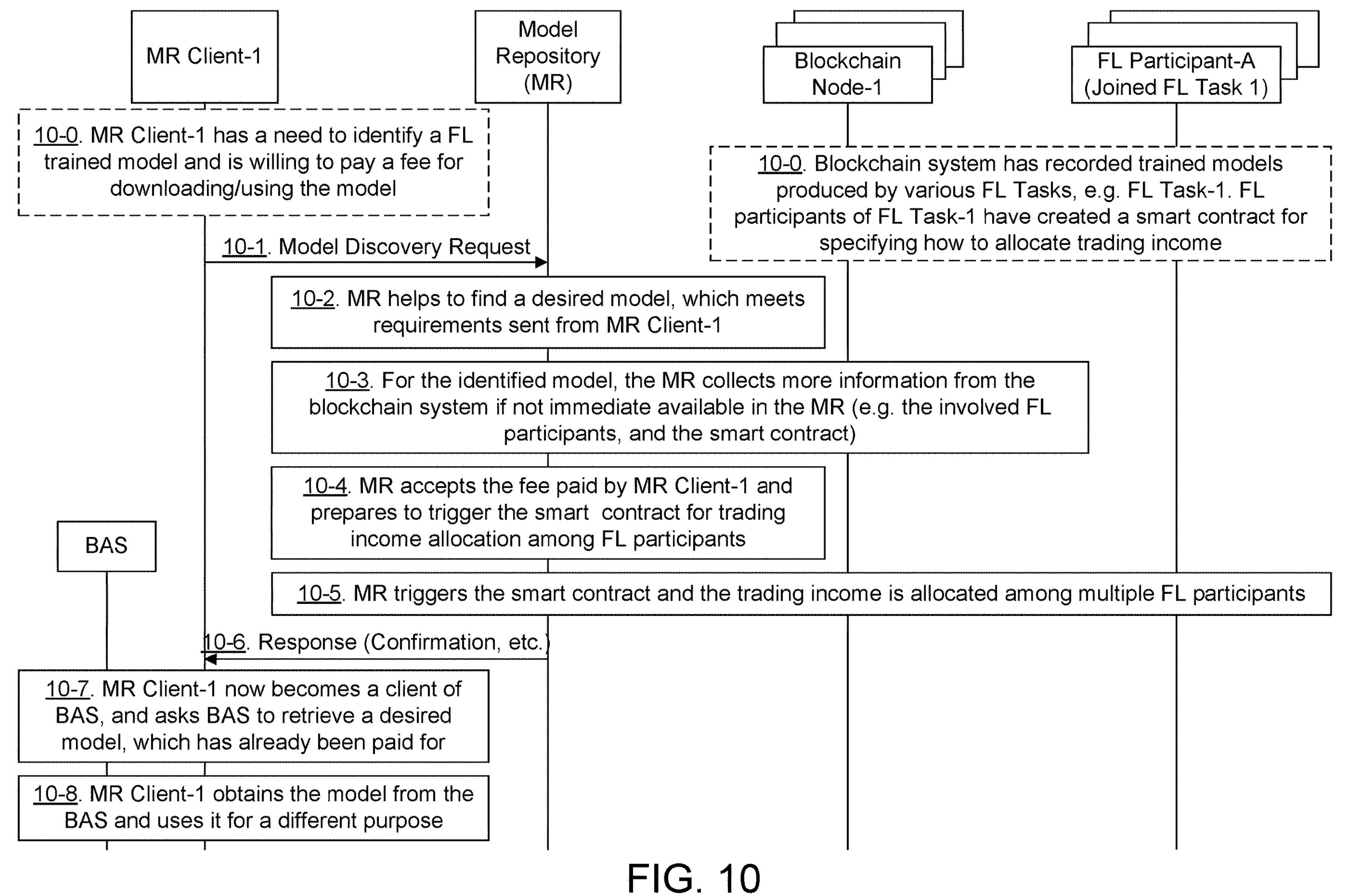
FIG. 10 illustrates an example procedure of model discovery and model trading via a model repository.

FIG. 10 illustrates an example procedure of model discovery and model trading via a MR.

Precondition 10-0. The blockchain system may have recorded trained models produced by various FL tasks (e.g., a FL Task-1). Those trained models may have been published to the MR for model trading (and certain model information may be available as information items in the MR, which may be introduced later). The FL participants (or the FL initiator) of the FL Task-1 as the model and/or data owner may have created a smart contract with the MR for specifying how to allocate the trading income. A MR client ("MR Client-1") may have a need to identify a certain FL trained model and is willing to pay a certain fee for downloading and/or using the model.

Step 10-1. The MR Client-1 may send a model discovery request to the MR. The model discovery request may indicate and/or include any of the following information:

- a model type, which may indicate a type of model to be discovered, e.g., a driver behavior prediction model.
- an allowed model size, which indicate a maximum size of the model.
- one or more available inputs, which may indicate one or more types of inputs that the MR Client-1 may provide for the model (e.g., an input could be a given road section and time) when conducting predictions on those inputs.
- one or more expected type of outputs, which may indicate the type of desired output of a desired trained model, e.g., the probability of having an accident on a given road section and time.
- a maximum fee to be paid, which may indicate a maximum amount of fee that the MR Client-1 authorizes for downloading and using the model. The MR Client-1 might not have to have any knowledge related to how the models may be stored in the underlying blockchain system and who it needs to pay. The MR may handle these items.

Among the preconditions (precondition 10-0) is that the trained models had already been published to the MR, e.g., by the model owner. Information (e.g., parameters) similar to those listed above (such as, e.g., model type, model size, versions, expected inputs, expected outputs, the desired fee to be paid, etc.) may have been included in a model publication request sent from the model owner to the MR.

Step 10-2. After receiving the model discovery request from the MR Client-1, the MR may check its internal repository to identify a model in accordance with the information (e.g., that meets requirements) sent from the MR Client-1. When the models were published into the repository during their model publication and/or registration process (as mentioned in the precondition step), for a particular model, any of the following information may be made available as the information items for describing each model stored in the MR:

- a model ID: A trained model may have a global identifier, which may be associated with the corresponding FL task ID. The model ID may indicate the model was produced via a specific FL task.
- a model type and usage: This may indicate a usage of the model, e.g., to predict driver behavior on a given road section during a given time.
- one or more inputs: This may indicate the types of inputs that may be needed when applying the model.
- one or more outputs: This may indicate the types of outputs, i.e., predictions that may be yielded by the model.
- a storing location: This may indicate where the model may be stored, i.e., in which chain (or in which off-chain database). There may be multiple versions of the model that may be stored in different chains (e.g., the full version of the trained model may be stored in chain-1 while a tailored model may be stored in chain-2). All that information may be stored in the MR for its usage. Some or all of such information might not be exposed to the MR clients.
- a usage fee: This may indicate the price of the model. Therefore, if an MR client would like to use or download the model, it needs to pay this amount of cost.
- a smart contract ID for sharing the income received from the model trading: This may indicate which smart contract should be used for splitting the trading income (paid by the MR Client) among the model owners, e.g., different FL participants.

Based on the above information as well as the requirements received from MR Client-1, the MR may identify the desired model.

Step 10-3. This step may be an optional step. For the identified model, if needed, the MR may need to and may collect more information from the blockchain system if certain needed information may not be immediately available in the MR. For example, the MR may want to know the next level of details regarding how the model was produced, e.g., based on which FL participants, based on what data, etc.

Step 10-4. The MR may accept the fee paid by MR Client-1. This process may be done via a smart contract between the MR Client-1 and MR. The MR may prepare to trigger the smart contract to automatically allocate the income among FL participants. Alternatively, the MR may help to create a smart contract directly between the MR Client-1 and the FL participants, and after the MR Client-1 downloads the model successfully, the payment may be automatically allocated to the FL participants.

Step 10-5. The MR may trigger the smart contract execution with the owners of the model. Following execution of the smart contract, the trading income collected from the MR Client-1 may be allocated among multiple FL participants (i.e., the owners of the model).

Step 10-6. The MR may send back a response, along with information regarding the identified model, in accordance with the information (e.g., that meets the requirements) sent from the MR Client-1.

Step 10-7. The model may be ready for MR Client-1 to access. The MR Client-1 now may become a client of BAS. The MR Client-1 (as a BAS client) may contact the BAS to retrieve the desired model indicated in Step 6 (by using the model access procedure as in the previous section). The BAS may be co-located with MR.

Alternatively, another integrated solution may be implemented in which the model discovery via MR and the model access via BAS may be done at the same time. In other words, after the MR identifies a model and the model is paid for (in Step 5), the MR may immediately work with the BAS to retrieve the model from the underlying chain. The retrieved model may be directly piggybacked to the MR Client-1 in Step 6.

Step 10-8. After the MR Client-1 obtains and downloads the model via BAS, it may use it for different purposes.

Representative solutions directed to disclosures herein, including the fourth representative aspect are provided. A MDSS may be provided, e.g., in accordance with the fourth representative aspect. The MDSS may assist model deployment and model scoring directly inside the blockchain system (e.g., hosted and/or run by selected BCNs) and does not require a model downloading process. For example, a model scoring API may be exposed by MDSS and MDSS clients may call the API to conduct model scoring using an ML model deployed in the system. The MDSS may select an appropriate BCN that may be running a specific model for conducting the model scoring. In this way, a fully distributed AI/ML model deployment may be realized by leveraging the blockchain system.

There are a lot of different ways and/or scenarios for leveraging MDSS. Three example scenarios are disclosed below.

Representative MDSS—Enabled Model Deployment and Scoring for Supporting Client Mobility When a model may be deployed in a blockchain network, it may better cater for client's location when serving their model storing requests. In other words, different working instances of the model hosted on different BCNs may be selected depending on the client's current location.

FIG. 11 illustrates an example procedure of MDSS-enabled model deployment and scoring for supporting client mobility Precondition 11-0. A model ("Model-1") may be a trained model, which may be produced through an FL or other AI and/or ML training process and may be owned by a first MDSS Client ("MDSS Client-1"). The MDSS Client-1 may be an initiator of a specific FL task, an FL participant, an FL server, or an FL model aggregator. The Model-1 may have already been discovered by a second MDSS client ("MDSS Client-2"). The MDSS Client-2 may intend to use the Model-1 (e.g., via MR). However, the Model-1 may be large in size, and the MDSS Client-2 does not want to download the Model-1 and deploy and/or run it.

Steps 1-4 in the following belong to the model deployment process, and steps 5-11 belong to the model scoring process. The model deployment process and the model scoring process may occur at different times.

Step 11-1. The MDSS Client-1 may send a model deployment request to the MDSS. The MDSS Client-1 may specify its needs regarding how it may want the Model-1 to be deployed, including but not limited to the following:

- The MDSS Client-1 may want the Model-1 to be deployed in Area-A and Area-B to provide high-quality service for those two areas. The later steps 2-11 may be based on this specific example case.
- The MDSS Client-1 may require that an average time cost of model scoring for the Model-1 should be less than 2 seconds. By using this, the MDSS may decide which BCNs may be used as the candidate node for hosting the Model-1. For example, BCNs with more computing resources may be desired.
- Any other high-level or business-specific requirements.

The MDSS Client-1 may specify the information/requirements without having any knowledge regarding the underlying blockchain system, e.g., how many BCNs may be running the Model-1, and where they may be located. The details (e.g., all the details) may be handled by the MDSS.

Step 11-2. After receiving the request from the MDSS Client-1, the MDSS may identify that a first BCN ("BCN-1") may be in Area-A and a second BCN ("BCN-2") may be located in Area-B. The MDSS may decide to deploy the Model-1 to the BCN-1 and the BCN-2.

Step 11-3. The MDSS may send a request to the BCN-1 and the BCN-2 and/or may ask them to deploy the Model-1. If the BCN-1 and the BCN-2 agree to do so, the BCN-1 and the BCN-2 may retrieve the Model-1 from chains hosted by them, allocate resources (computing and/or storage, etc.) and run the Model-1 in order to be ready to accept inputs for model scoring. The BCN-1 and the BCN-2 may send respective responses to the MDSS to indicate successful model deployment.

Step 11-4. The MDSS may send back a response that the Model-1 has already been successfully deployed at desired locations, e.g., in Area-A and Area-B.

Step 11-5. The MDSS Client-2 may be now in Area-A and may intend to use the Model-1.

Step 11-6. The MDSS Client-2 may send a model scoring request to the MDSS, along with certain input data to be evaluated, as well as other useful context information, including e.g., any of:

- a current location of the MDSS Client-2.
- an expected processing time, which may indicate how long the MDSS Client-2 would like to wait.
- a preferred processing location. e.g., the MDSS Client-1 would like the model scoring to be processed directly in Area-A.
- a minimum acceptable model accuracy: This may indicate a minimum accuracy that may be needed for conducting the model scoring for these inputs. For example, the MDSS Client-1 may require that the accuracy of the model scoring result should be at least 60%.

Step 11-7. Given the current location of the MDSS Client-2, the MDSS may decide to use the BCN-1 in Area-A for serving this request.

Step 11-8. The model scoring request may be then sent to the BCN-1 for processing. For example, any of the following information may be included:

- the client who requires this model scoring operation.
- the model to be used for model scoring.
- the data inputs from the client.
- the expected processing time, which may indicate how long the model scoring request should be completed.
- the information that needs to be recorded in the blockchain during the model scoring process.

The BCN-1 may take the input data as included in Step 6 to run Model-1 locally. The BCN-1 may generate a model scoring result and may send it to the MDSS. The BCN-1 may record the model scoring result in a chain, as well as other information, such as how much time it took for conducting a model scoring process.

Step 11-9. The MDSS may return the model scoring result to the MDSS Client-2.

Step 11-10. At a later time, the MDSS Client-2 may move to Area-B and/or may intend to use the Model-1 again.

Step 11-11. Given the new location of the MDSS Client-2, the MDSS may decide to use BCN-2 for serving this request. The process may be as same as Steps 7-10.

Representative MDSS-Enabled Model Deployment for Supporting Differentiated Scoring A given trained model may have different versions. A full version of the model may be a large data size, requiring more computing resources and time cost for conducting model scoring, but the full version of the model may produce a high-accuracy result. In comparison, a tailored version of the model may be in smaller in size, require fewer computing resources and time cost for conducting model scoring, produce a less accurate result. Depending on different application needs, sometimes a model with high accuracy may be desired. In other cases, it may be possible that a less accurate prediction result may be acceptable.

Figure 12:
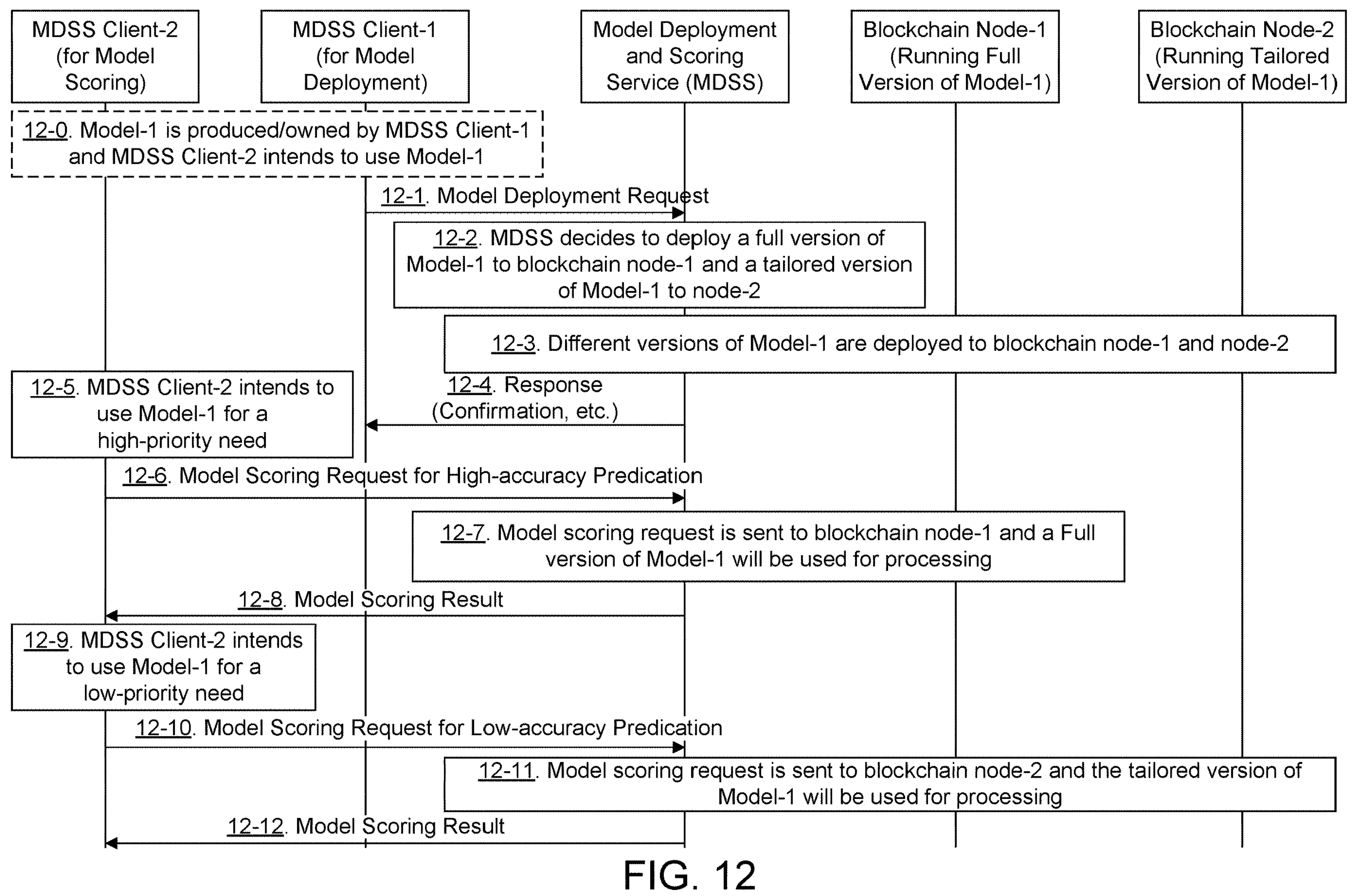
FIG. 12 illustrates an example procedure of MDSS enabled model deployment for supporting differentiated scoring.

FIG. 12 illustrates an example procedure of MDSS-enabled model deployment for supporting differentiated scoring.

Precondition 12-0. A Model-1 may be a trained model, which may be produced through an FL or other AI and/or ML training process and may be owned by a MDSS Client-1. The MDSS Client-1 may be an initiator of a specific FL task, an FL participant, an FL server, or an FL model aggregator. The Model-1 may have already been discovered by a MDSS Client-2, which may intend to use the Model-1. In addition, the Model-1 may have two different versions, one may be a full version and the other may be a tailored version, and both two versions may have already been recorded in the blockchain system.

Steps 1-4 in the following belong to a model deployment process, and steps 5-12 belong to a model scoring process. The model deployment process and the model scoring process may occur at different times.

Step 12-1. The MDSS Client-1 may send a model deployment request to the MDSS. The MDSS Client-1 may specify its needs regarding how it may want the Model-1 to be deployed. The MDSS Client-1 may indicate that both the full version and the tailored version of the Model-1 need to be deployed.

Step 12-2. After receiving the request from the MDSS Client-1, the MDSS may decide to deploy the full version of Model-1 to a BCN-1 and the tailored version of Model-1 to a BCN-2. The reason to do so may be that the BCN-1 may have more computing and storage resources than BCN-2.

Step 12-3. The MDSS may send a request to the BCN-1 and the BCN-2 and may ask them to deploy the different versions of Model-1. If the BCN-1 and the BCN-2 agree to do so, the BCN-1 and the BCN-2 may allocate certain resources (computing and/or storage, etc.) and run the respective versions of Model-1. One or more response messages from one or both of the BCN-1 and the BCN-2 may be sent to the MDSS indicating that the respective versions of Model-1 were successfully deployed.

Step 12-4. The MDSS may send to the MDSS Client-1 a response indicating that the two versions of Model-1 are successfully deployed.

Step 12-5. The MDSS Client-2 now may have an application need for using Model-1.

The application need may require a high accuracy result.

Step 12-6. The MDSS Client-2 may send a model scoring request to the MDSS, along with certain input data to be evaluated and the requirements (e.g., a high-accuracy result is required). Similar parameters in Step 6 of FIG. 11 may be carried in this step.

Step 12-7. Given the requirements of the MDSS Client-2, the MDSS may decide that the full version of Model-1 deployed on the BCN-1 should be or is to be used for serving this request. The MDSS may forward the request to the BCN-1, which may conduct the model scoring and return the scoring result to the MDSS. The request sent to the BCN-1 may include and/or indicate information (e.g., parameters) similar to the information (e.g., parameters) indicated in Step 8 of FIG. 11.

Step 12-8. The MDSS may return the model scoring result to the MDSS Client-2, which may have high accuracy.

Step 12-9. At a later time, the MDSS Client-2 now may have another application need for using the Model-1. This time, this application need is for a less accurate model.

Step 12-10. The MDSS Client-2 may send another model scoring request to the MDSS, along with certain data to be evaluated and the requirements (e.g., a low-accuracy result may be sufficient).

Step 12-11. The MDSS may decide that the tailored version of Model-1 deployed on the BCN-2 should be or is to be used for serving this request. The MDSS may forward the request to the BCN-2, which may conduct the model scoring and return a result.

Step 12-12. The MDSS may return the model scoring result to the MDSS Client-2, which may have lower accuracy.

Representative MDSS-Enabled Collaborative Model Scoring

It may be assumed that a trained model has only one version for the convenience of presentation. A given trained model may be deployed to multiple BCNs. Therefore, it may be possible that a given model scoring task may be collaboratively performed by different BCNs. This may be particularly true when the data to be evaluated and/or analyzed may be large in size. The disclosures herein consider the case where the input data to be analyzed may not be directly sent from an MDSS client, instead, the input data to be analyzed may have been recorded in the blockchain system already. For example, an MDSS client may want to use a driver performance prediction model to analyze, say 1000G driver behavior data stored in the blockchain, in order to predict on which road sections drivers may be more likely to have accidents. However, if the driver performance prediction model has only been deployed to one BCN, this node may face a significant workload for conducting model scoring for those 1000G data.

Figure 13:
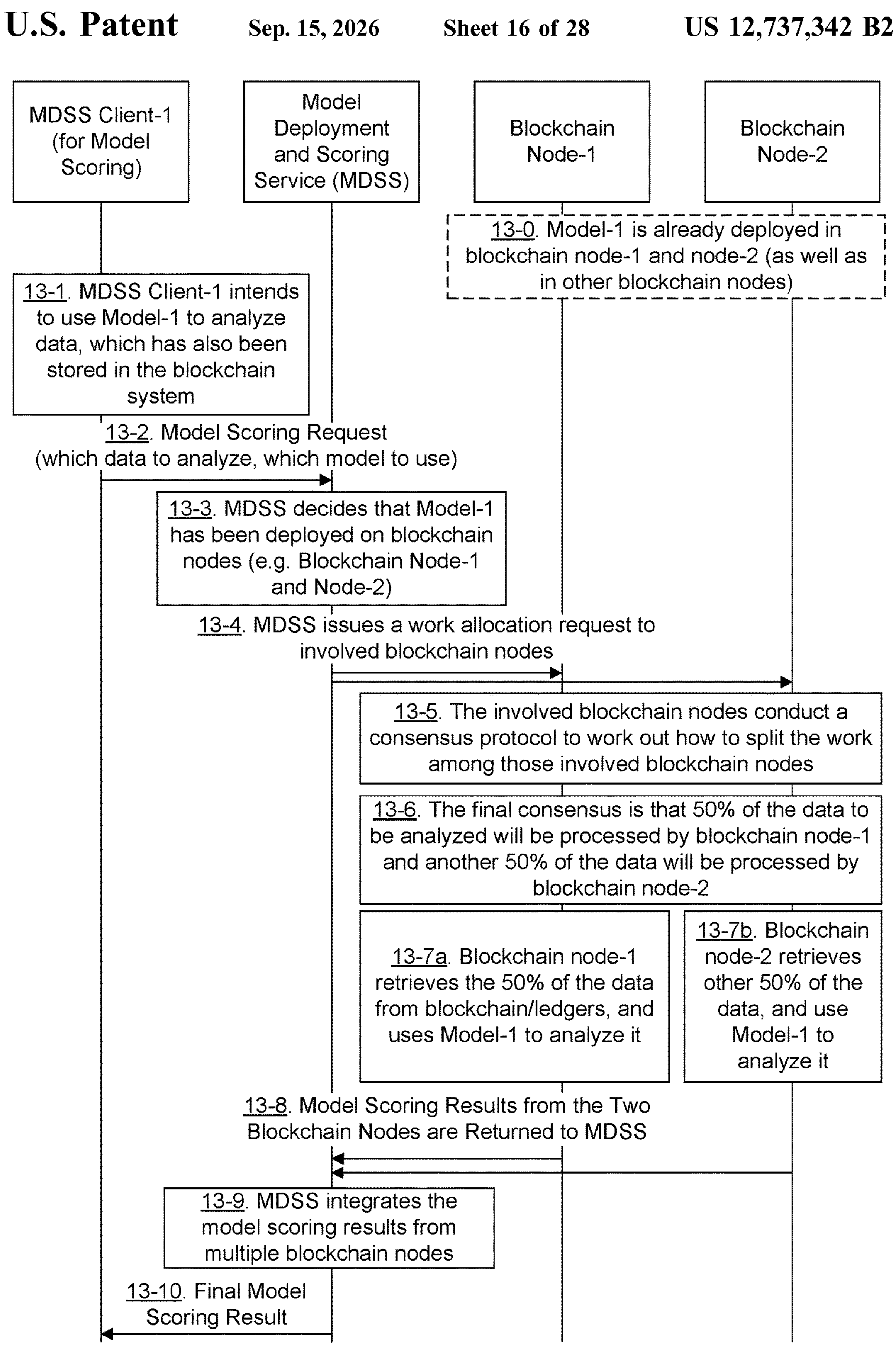
FIG. 13 illustrates an example procedure of MDSS enabled collaborative model scoring.

FIG. 13 illustrates an example procedure of MDSS-enabled collaborative model scoring.

Precondition 13-0. A Model-1 may have already been deployed in a BCN-1 and a BCN-2, as well as other BCNs. Those BCNs may conduct model scoring using the Model-1.

Step 13-1. The MDSS Client-1 may intend to use the Model-1 to analyze certain data, which may have been stored in the blockchain system. For example, 1000G driver behavior data were stored in the blockchain and need to be analyzed by the Model-1.

Step 13-2. The MDSS Client-1 may send a model scoring request, along with any of the following information:

- which input data to analyze, e.g., the 1000G driver behavior data.
- which model to use, i.e., Model-1, e.g., a driver performance prediction model
- a sampling ratio. For example, given there may be 1000G driver behavior data, but the MDSS Client-1 may want the MDSS to randomly evaluate 5% of the data.
- an expected processing time, which may indicate how long the MDSS Client-1 would like to wait.
- a preferred processing location. This may indicate whether the MDSS Client-1 would like the model scoring to be processed in a certain area. The MDSS may find a qualified BCN in that area for conducting model scoring.
- a minimum acceptable model accuracy. This may indicate a minimum accuracy that may be needed for conducting the model scoring for the inputs. For example, the MDSS Client-1 may require that the prediction accuracy of the model scoring result should be at least 60%.

Step 13-3. The MDSS may determine the BCNs on which the Model-1 has been deployed.

Step 13-4. For the involved BCNs hosting the deployed Model-1, the MDSS may issue a work allocation request respectively, along with the work details as described in Step 2 (i.e., the data to analyze and the model to use). Other information may be carried as well:

- the client who requires this model scoring operation.
- the model to be used for model scoring.
- the data inputs to be analyzed.
- the expected processing time, which may indicate how long the model scoring request should be completed.
- the information to be recorded in the blockchain during the model scoring process.

Step 13-5. The involved BCNs may conduct a consensus protocol to work out how to split the work among those involved BCNs. For example, the consensus protocol may consider the currently available resources on each involved BCN, and the more resources a given node has, the more training load may be allocated.

Step 13-6. Assuming that after running a consensus protocol among the involved BCNs, the final consensus may be that 50% of the data to be analyzed may be processed by the BCN-1 while another 50% of the data may be processed by the BCN-2.

Step 13-7a. The BCN-1 may decide which chains stores the data to be analyzed, may retrieve 50% of the total data to be analyzed from those chains, and may use the Model-1 to analyze it (i.e., conduct model scoring).

Step 13-7b. The BCN-2 may retrieve the other 50% of the data and may use Model-1 to analyze it.

Step 13-8. The model scoring results from the two BCNs may be returned to the MDSS.

Step 13-9. The MDSS may integrate the model scoring results from multiple BCNs (i.e., Node-1 and Node-2). For example, the BCN-1 produces the model scoring results of the first 50% of the data, and the BCN-2 produces the model scoring results of another 50% of the data. The MDSS may combine those results to form a final model scoring result. The MDSS may conduct certain aggregation operation on the model scoring results, e.g., calculating the overall statistics on the scoring result, e.g., 30% of data was classified as Class-A based on Model-1, and the remaining 70% of data was classified as Class-B based on Model-1. As a result, only those simple statistics results may be returned to the MDSS Client-1.

Step 13-10. The MDSS may return the final integrated model scoring result to the MDSS Client-1.

The above procedure is described based on a specific example, i.e., to analyze 1000 G driving behavior data, and accordingly, the potential solution was that two BCNs were selected and each of them takes 50% of the total workload. The procedure may be applied to many other different scenarios in which the collaborations between different BCNs may be in other ways and/or forms.

Representative Middle Layer for Enabling Model Storage, Access, and Deployment in FL Applications A number of new services may be provided for supporting model storage, model access, and model deployment and model scoring in FL applications. Those new services include a BSS, a BAS, a MR, and a MDSS. The new services may be part of a new middle layer between the upper-layer FL applications and underlying blockchain systems.

Figure 14:
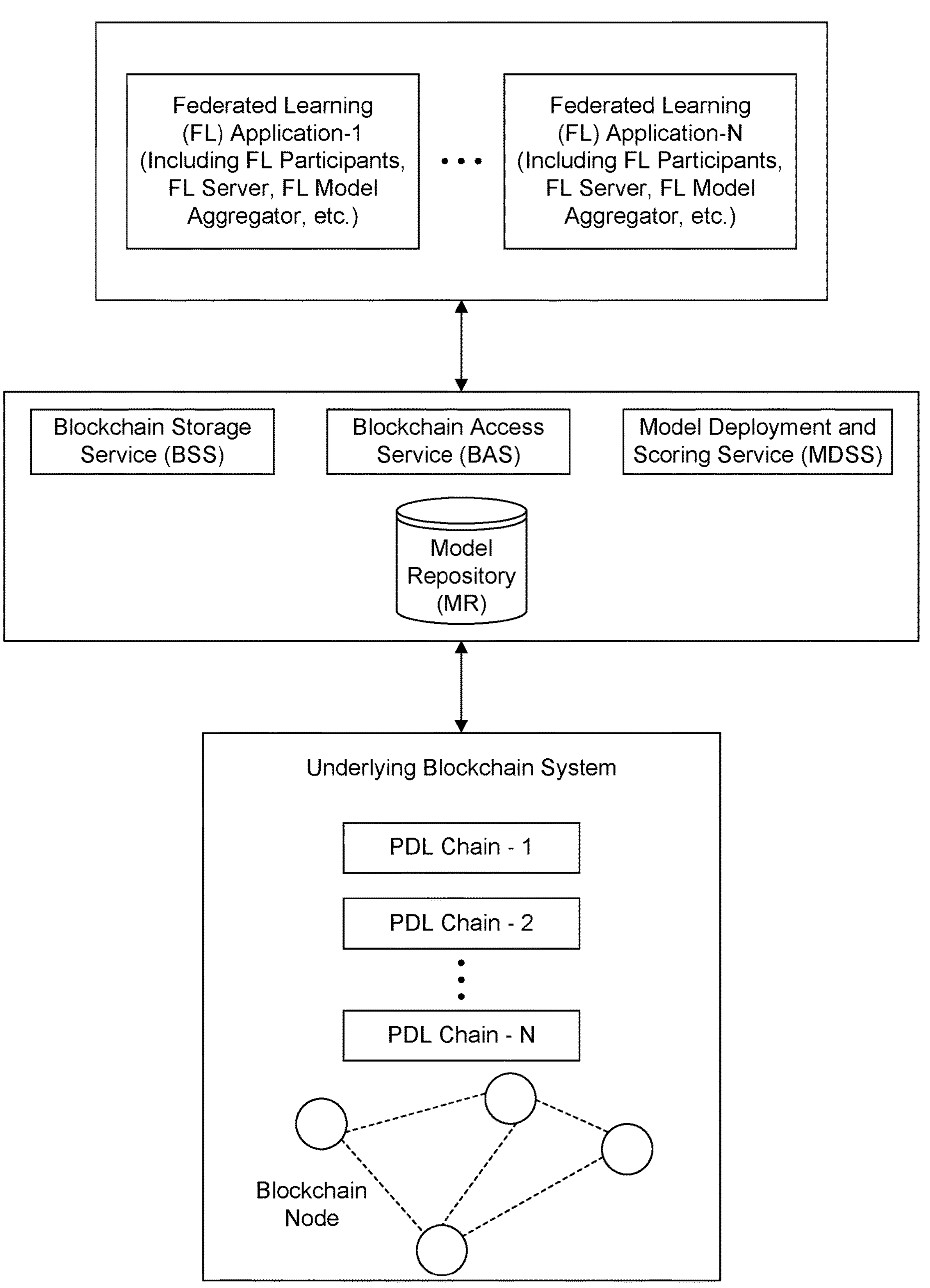
FIG. 14 illustrates an example middle layer enabling model storage, access and model deployment in FL applications.

FIG. 14 illustrates example middle layer enabling model storage, access and model deployment in FL applications. For FL applications, when they want to leverage blockchain system for model storage, access, and model deployment, they may interact with the services in this middle layer, and the details regarding how to interoperate with the underlying blockchain system may be handled by the middleware layer. The services may be implemented by a single physical entity or implemented on different entities. FL applications may host certain client-side functionalities of BSS, BAS, MDSS. The FL application may interact with a BSS, a BAS, an MDSS and/or a MR using a client-server architecture. For example, any of a BSS client, a BAS client an MDSS client, and an MR client may be hosted on the same WTRU that hosts FL participant. The client-side function may provide help to the FL participant (as a BSS client, a BAS client an MDSS client and/or an MR client) for communicating with a BSS, a BAS, an MDSS and/or a MR, respectively.

Figure 15:
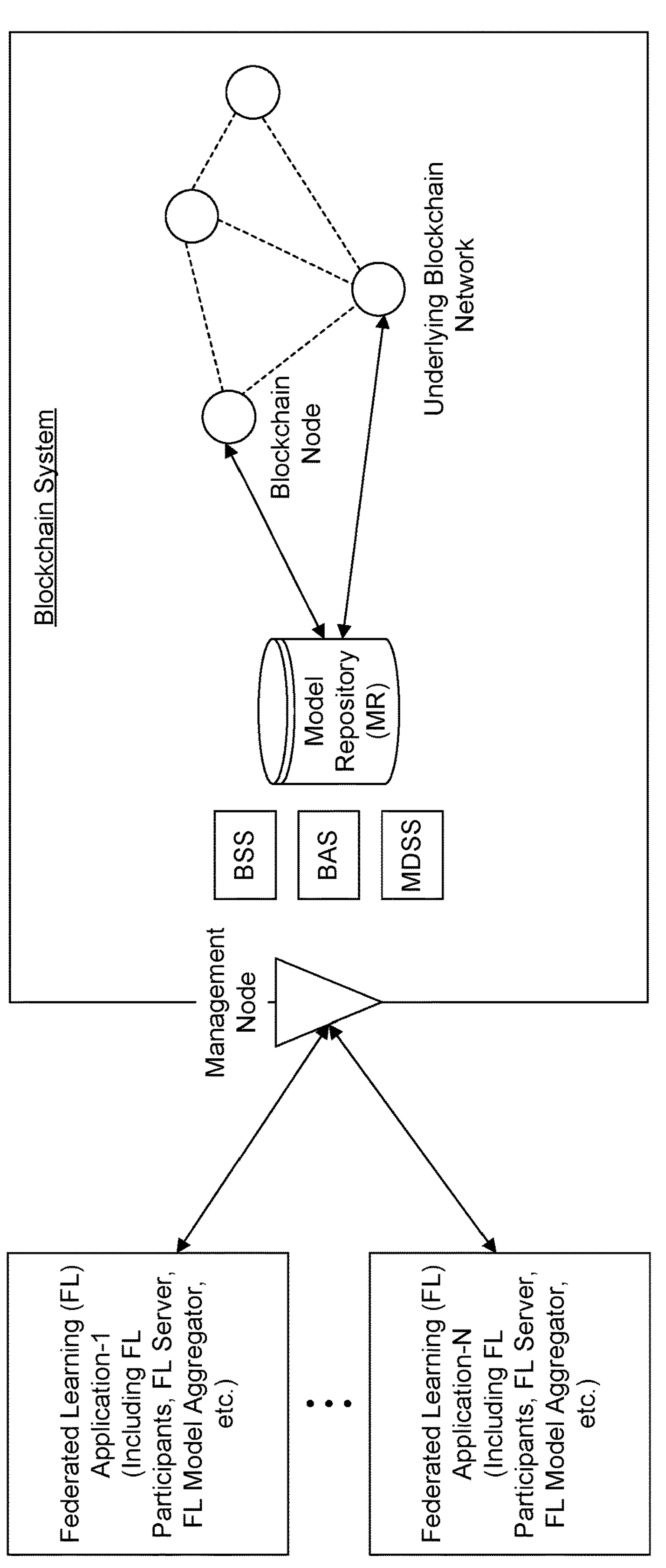
FIG. 15 illustrates an example interoperating architecture for enabling model storage, access and model deployment in FL applications.

FIG. 15 illustrates an example interoperating architecture for enabling model storage, access and model deployment in FL applications. Similarly, as FIG. 14, for FL applications, when they want to interoperate with blockchain system for model storage, access, and model deployment, they may communicate with a certain blockchain management node having BSS, BAS, MR, and/or MDSS capability. Such a blockchain management node may be inside the blockchain system or outside the blockchain system. The blockchain management node may be a proxy node or an interworking function node, which may be disposed between and interconnect the blockchain system and the FL system. Similarly, the FL applications may host certain client-side functionalities of the BSS, BAS, MDSS, and/or MR. The FL application may interact with the BSS, BAS, MDSS and/or MR using a client-server architecture. For example, any of a BSS client, a BAS client, an MDSS client and an MR client may be hosted on the same WTRU that hosts FL participant. The client-side function may provide help to the FL participant (as a BSS client, a BAS client, an MDSS client and/or an MR client) for communicating with the BSS, BAS, MDSS and/or MR hosted by the management node, respectively.

Alternatively, the services may directly be deployed on each of the BCNs as well. In such a case, compared to FIG. 15, there may not be a blockchain management node in the system.

Figure 16:
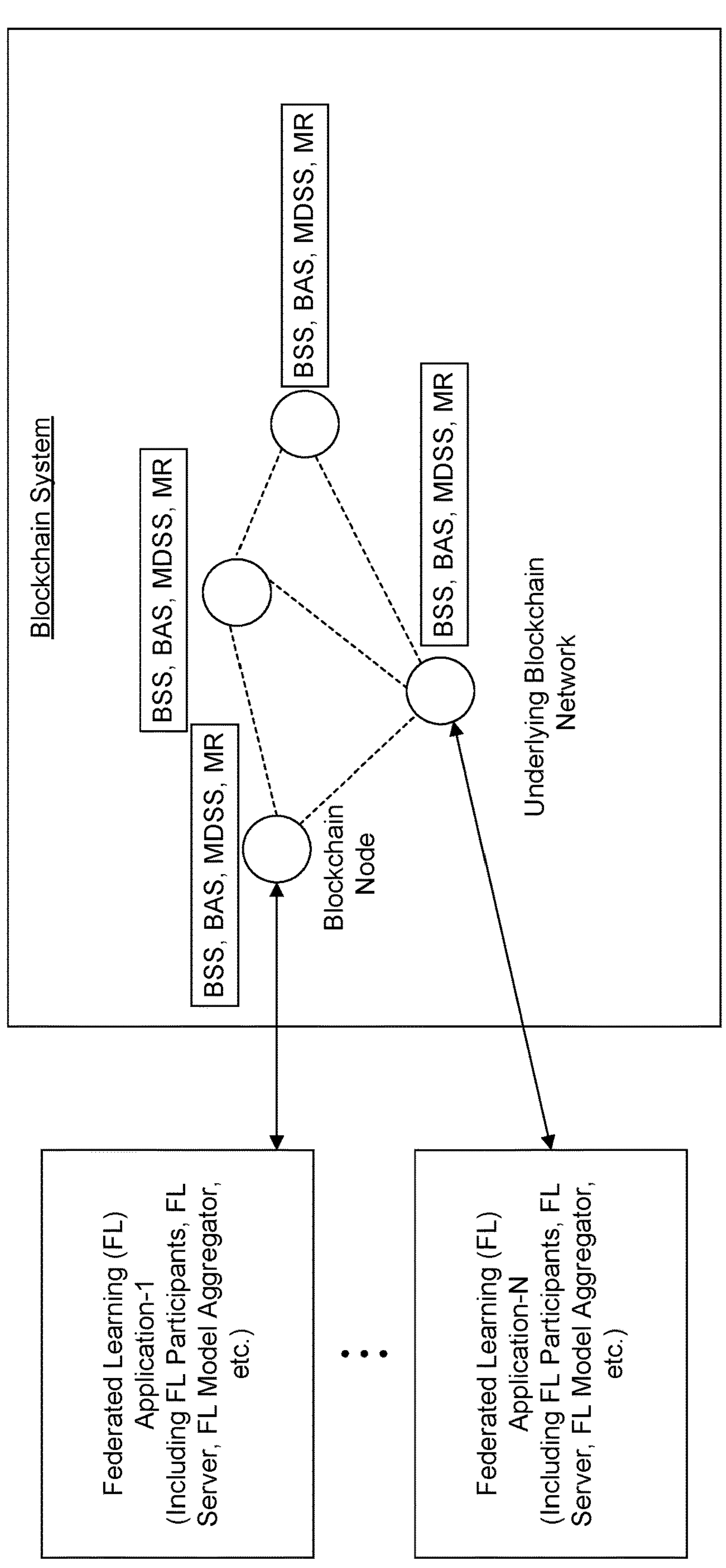
FIG. 16 illustrates an example interoperating architecture for enabling model storage, access and model deployment in FL applications.

FIG. 16 illustrates an example interoperating architecture for enabling model storage, access and model deployment in FL applications. FIG. 16 illustrates a fully distributed implementation choice for the services. The FL applications may host certain client-side functionalities of a BSS, a BAS, an MDSS and an MR. The FL application may interact with the BSS, BAS, MDSS and/or MR using a client-server architecture. For example, any of a BSS client, a BAS client, an MDSS client and an MR client may be hosted on the same WTRU that hosts FL participant. The client-side function may provide help to the FL participant (as a BSS client, a BAS client an MDSS client, and/or an MR client) for communicating with the BSS, BAS, MDSS and/or MR hosted by BCNs, respectively.

Representative O-RAN Embodiments

O-RAN architecture enables AI and/or ML functionality for Radio Access Networks (RAN) through two logical nodes, namely, a non-real time RAN intelligence controller (RIC), and a near-real time RAN intelligence controller (NRT-RIC). It may be possible to apply FL for 0-RAN, for example, via any of the following scenarios:

Scenario 1: A Service Management and Orchestration (SMO) acts as the FL server, while O-RAN units (i.e., O-RU, O-DU, and/or O-CU) may be FL participants. The SMO may create an FL task (e.g., to predict RAN performance), select some O-RAN units as FL participants, and install the FL task to participating O-RAN units. An O-RU (or an O-DU and/or O-CU) as an FL participant may receive an initial global model from SMO, may train it based on its locally collected RAN-related data, may generate a local mode update, may send the local model update to the SMO. The SMO may aggregate local model updates as received from participating O-RAN units, may generate a global model update, and may send the global model update to participating O-RAN units. Participating O-RAN units may continue the above process to train the model using the new global model update and its local RAN-related data. A final global model may be generated at the SMO.

Scenario 2: The RIC acts as the FL server, while the O-RAN units (i.e., O-RU, O-DU, and/or O-CU) may be FL participants. RIC may create an FL task (e.g., to predict RAN performance), select some O-RAN units as FL participants, and install the FL task to participating O-RAN units. An O-RU (or an O-DU and/or O-CU) as an FL participant may receive an initial global model from RIC, may train it based on its locally collected RAN-related data, may generate a local mode update, may send the local model update to RIC. The RIC may aggregate local model updates received from participating O-RAN units, may generate a global model update, and may send the global model update to participating O-RAN units. Participating O-RAN units continue the above process to train the model using the new global model update and its local RAN-related data. A final global model may be generated at RIC.

Scenario 3: An SMO acts as an FL management node and RIC acts as the FL server. O-RAN units (i.e., O-RU, O-DU, and and/or or O-CU) may be FL participants. The SMO may create an FL task (e.g., to predict RAN performance), select some O-RAN units as FL participants, and send the FL task and list of selected O-RAN units to RIC. Alternatively, the SMO may send the FL task directly to each selected O-RAN unit. The RIC may install the FL task to each selected participating O-RAN unit. An O-RU (or an O-DU and/or O-CU) as an FL participant may receive an initial global model from the RIC (or the SMO), may train it based on its locally collected RAN-related data, may generate a local mode update, and may send the local model update to RIC. The RIC may aggregate local model updates received from participating O-RAN units, may generate a global model update, and may send the global model update to participating O-RAN units. The participating O-RAN units may continue the above process to train the model using the new global model update and its local RAN-related data. When the FL training process may be completed, a final global model may be generated at RIC. The RIC may send the final global model to the SMO.

Scenario 4: An NRT-RIC acts as the FL server, and O-RAN units (i.e., O-RU, O-DU, and/or O-CU) may be FL participants. The NRT-RIC may create an FL task (e.g., to predict RAN performance), select some O-RAN units as FL participants, and install the FL task to participating O-RAN units. An O-RU (or an O-DU and/or O-CU) may receive an initial global model from the NRT-RIC, may train it based on its locally collected RAN-related data, may generate a local mode update, may send the local model update to the NRT-RIC. The NRT-RIC may aggregate local model updates received from participating O-RAN units, may generate a global model update, and may send the global model update to participating O-RAN units. The participating O-RAN units may continue to the above process to train the model using the new global model update and its local RAN-related data. A final global model may be generated at the NRT-RIC.

Scenario 5: An O-CU acts as the FL server, and O-DUs may be FL participants. The O-CU may create an FL task (e.g., to predict RAN performance), select some O-DUs as FL participants, and install the FL task to participating O-DUs. This process may be done by the SMO (or the RIC) on behalf of the O-CU. An O-DU as an FL participant may receive an initial global model from the O-CU (or the SMO or the RIC), may train it based on its locally collected RAN-related data, may generate a local mode update, may send the local model update to the O-CU. The O-CU may aggregate local model updates received from participating O-DUs, may generate a global model update, and may send the global model update to participating O-DUs. The participating O-DUs may continue the above process to train the model using the new global model update and its local RAN-related data. A final global model may be generated at the O-CU, which may forward the final global model to the SMO (or the RIC).

The services (BSS, BAS, MR, and MDSS) may be deployed and integrated with O-RAN for O-RAN entities to leverage these services to enhance its RIC functionality, the FL scenarios as described above. FIG. 16 illustrates an example integration of O-RAN and the services.

A blockchain system could be deployed in RAN, edge networks, and/or core networks, which may be interfaced and interact with all O-RAN entities and core network. When a blockchain system is deployed in RAN, an O-Cloud may provide storage and computing resources to the blockchain system and thus BCNs may be physically hosted by O-Cloud. Other O-RAN entities and CN entities may interact with the O-Cloud in order to interact with BCNs.

Each O-RAN entity and core network may host FL-related entities such as FL participant, FL server, and FL model aggregator. As an example, each O-RU, O-DU and/or O-CU may host an FL participant, and a SMO, a RIC and/or an NRT-RIC may host an FL server.

The services (BSS, BAS, MR, MDSS) may be integrated as a part of a SMO, a RIC, an NRT-RIC, and/or a CN. Alternatively, a SMO, RIC a NRT-RIC and/or a CN may interface to the services (BSS, BAS, MR, MDSS), which may be deployed as standalone entities.

Figure 17:
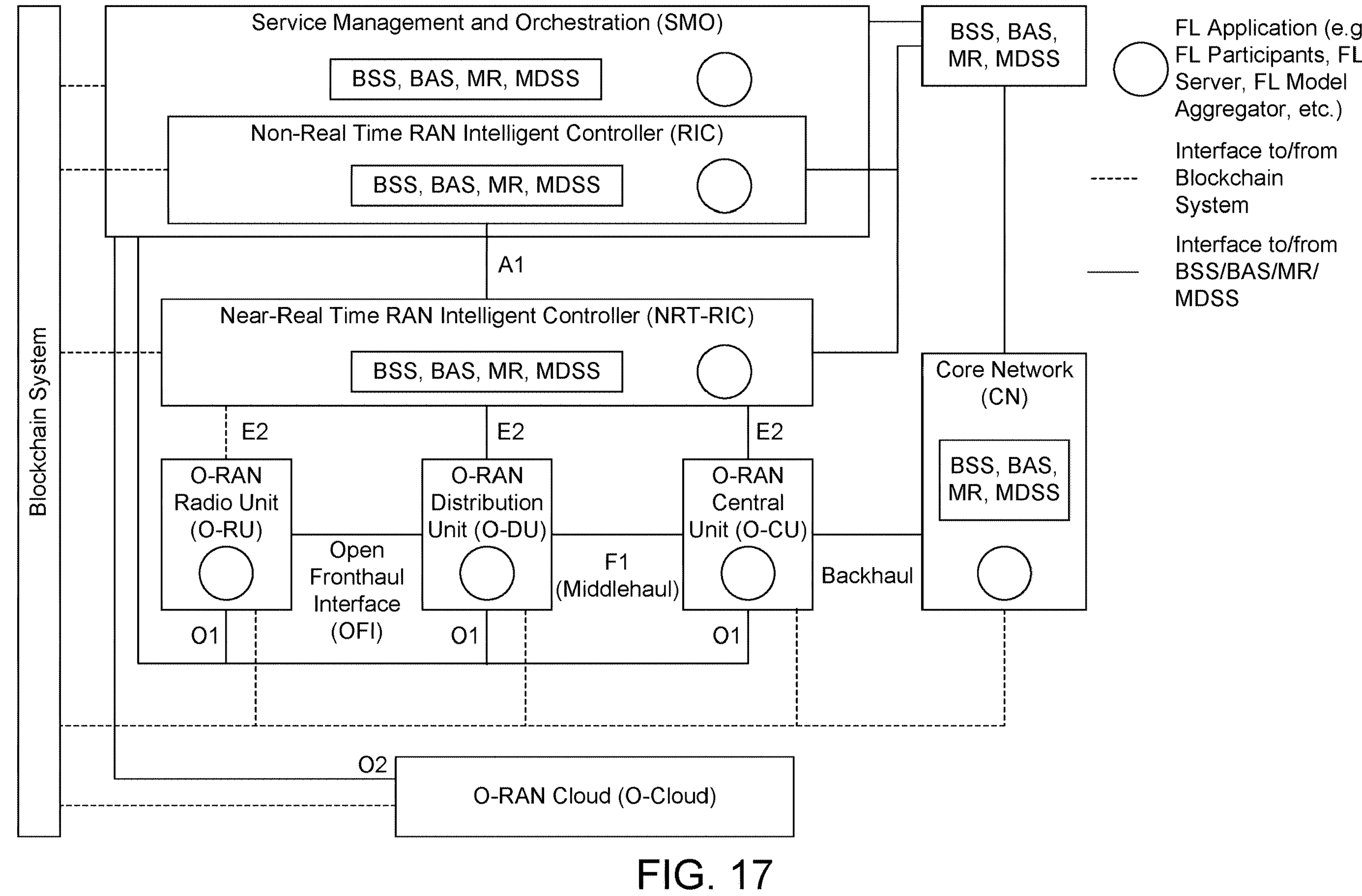
FIG. 17 illustrates an example O-RAN embodiment.

FIG. 17 illustrates an example O-RAN embodiment for the services (BSS, BAS, MR, MDSS).

Representative ETSI PDL Embodiments

ETSI Industry Specification Group (ISG) Permissioned Distributed Ledger (PDL) has defined a PDL framework for supporting various PDL-related applications.

Figure 18:
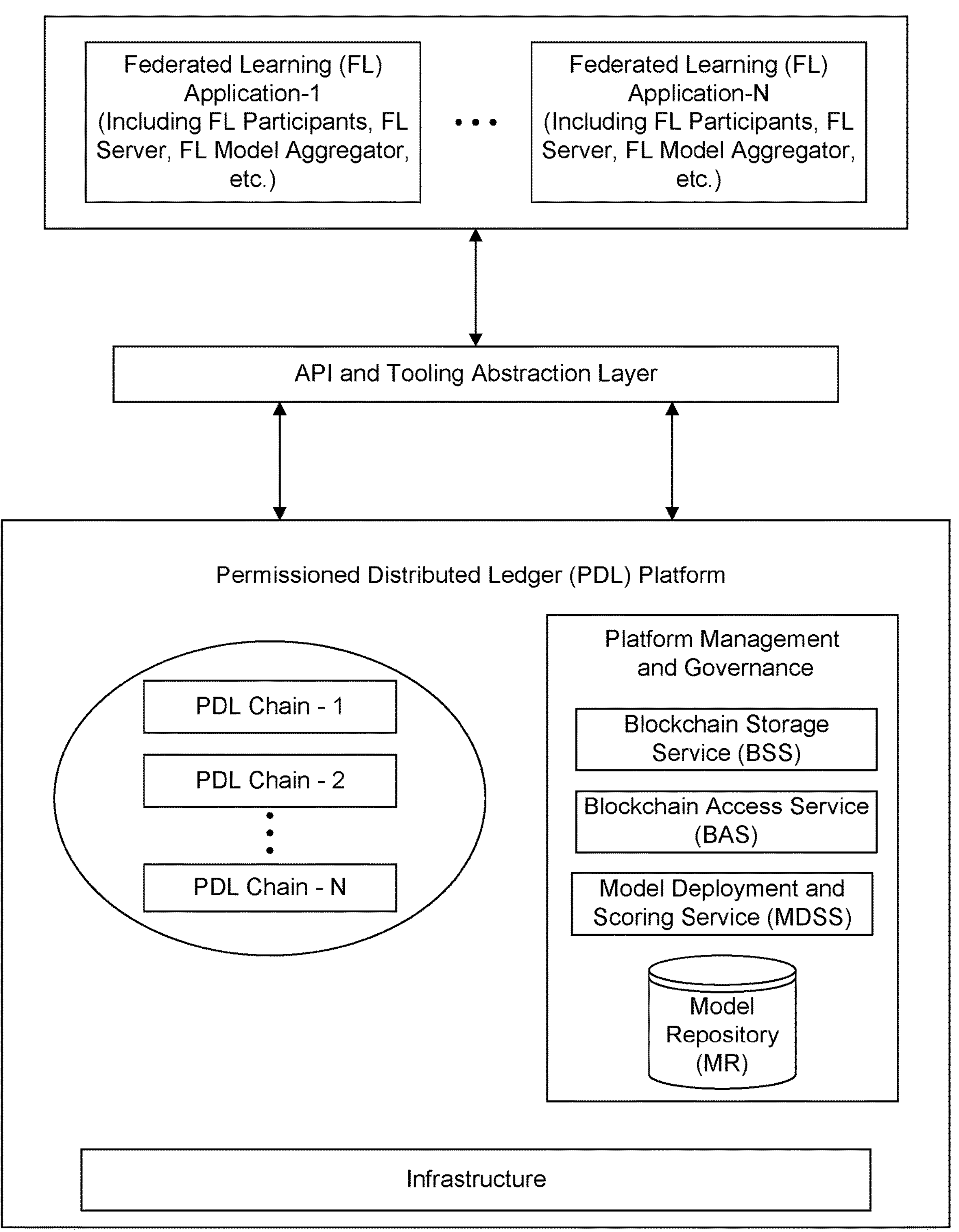
FIG. 18 illustrates an example ETSI PDL embodiment.

FIG. 18 illustrates an example ETSI PDL embodiment for the services (BSS, BAS, MR, MDSS). The BSS, BAS, MR, and MDSS may be regarded as new services of the PDL platform management and governance module. Alternatively, the BSS, BAS, MR, and MDSS may be implemented as a part of API and a tooling abstraction layer in FIG. 18. As another alternative, the BSS, BAS, MR, and MDSS may be implemented as a part of the common function in the ETSI PDL framework.

Figure 19:
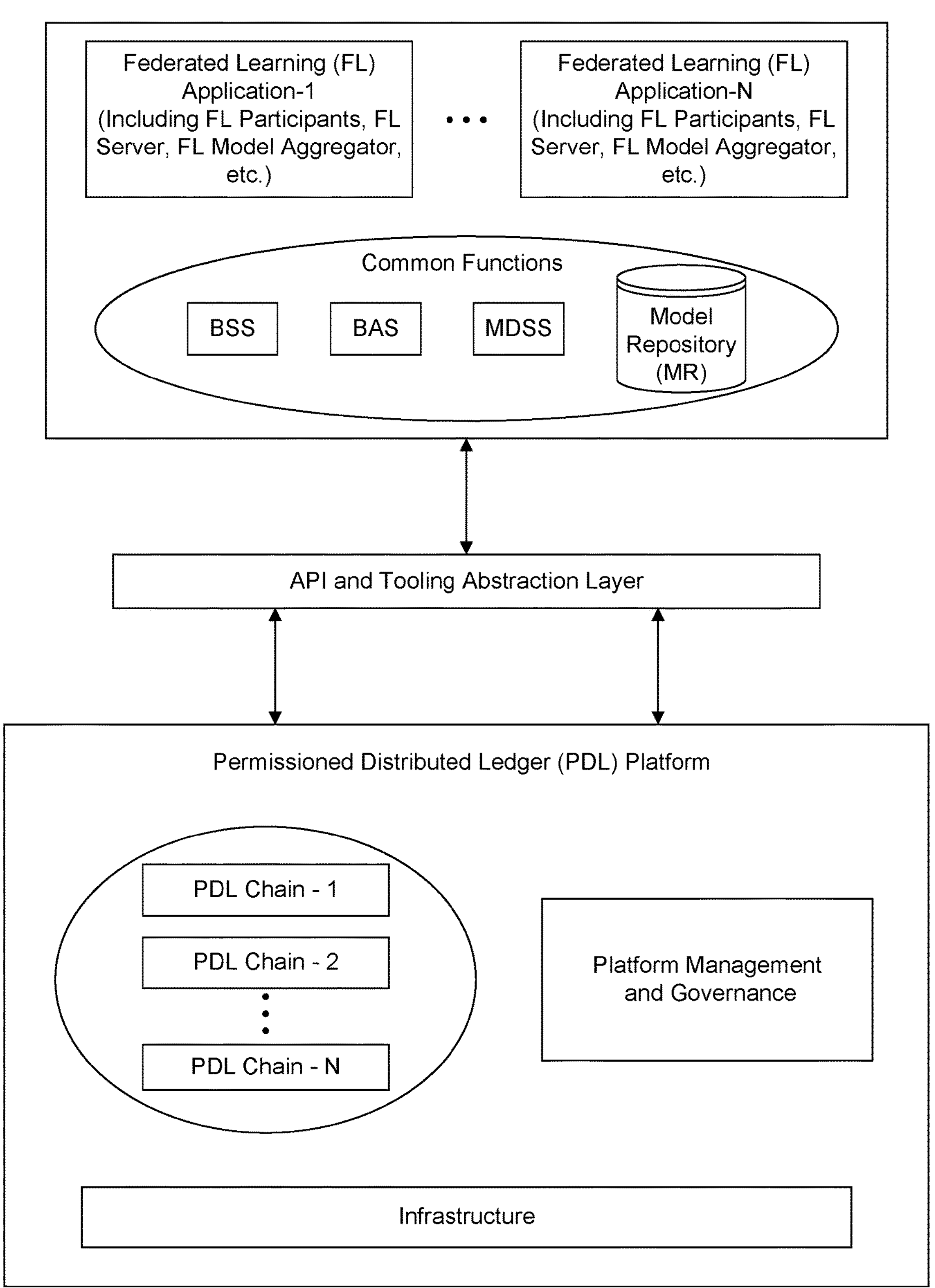
FIG. 19 illustrates an example ETSI PDL embodiment.

FIG. 19 illustrates an example ETSI PDL embodiment for the services (BSS, BAS, MR, MDSS).

Representative 3GPP Embodiments

Figure 20:
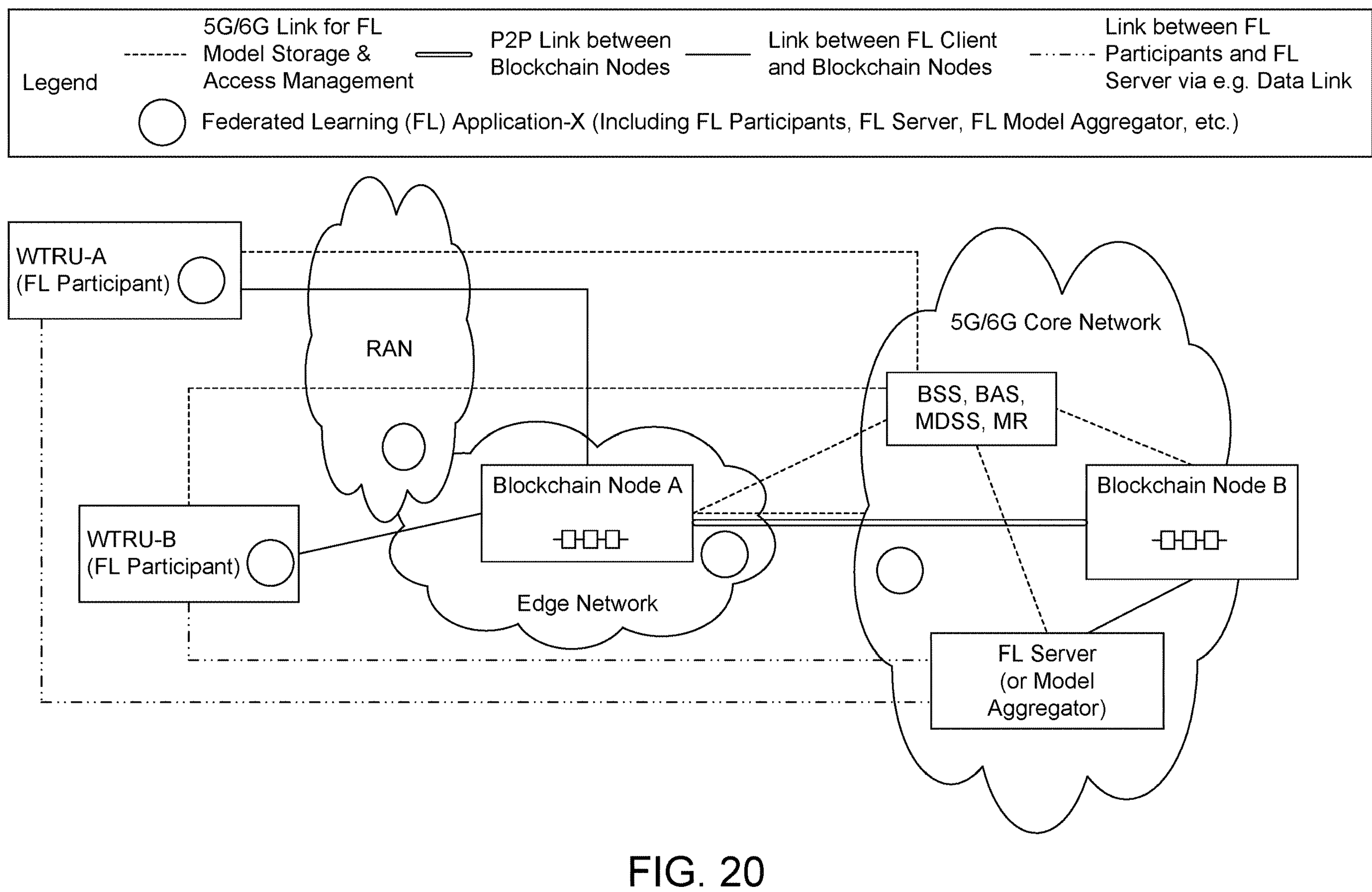
FIG. 20 illustrates an example 3GPP embodiment.

The BCNs may be deployed in the 3GPP infrastructure as well. Therefore, the services may be deployed inside the 3GPP system, which is illustrated in FIG. 20. FIG. 20 illustrates an example 3GPP embodiment for the services (e.g., BSS, BAS, MR, MDSS).

In FIG. 20, the BCNs may be deployed in both edge network and core network. The WTRUs may be FL participants, which may interact with their FL server or model aggregator (i.e., to conduct the FL training process between FL participant and FL Server). Network functions in the core network may be the FL participants and/or the FL server. Network functions in edge networks may be the FL participants and/or the FL server. The FL server may be deployed in the core network via e.g., control link or may be deployed in a data network via e.g., data link. Similarly, the WTRUs may use data links to interact with BCNs (e.g., for recording their local and global model updates in the blockchain system). The BSS, BAS, MR, and MDSS may be regarded as new network functions in the core network, and they may interact with FL participants, and BCNs via control links to conduct various procedures.

A new network function for AI/ML Model Storing, Access, and Deployment (MSAD) in accordance with the disclosures herein may be provided in the 5G system. Accordingly, the BSS, BAS, MDSS, and MR may be the services provided by this MSAD. As a result, all the procedures as in the previous sections may be embodied as the interactions with the MSAD in the 3GPP system. For example, the BSS client, BAS client, MDSS client, and MR client may be embodied as a WTRU in the 3GPP system, such that a WTRU may act as an FL task initiator, an FL participant, and/or an FL model aggregator, etc. The messaging between a BSS client, a BAS client an MDSS client and/or an MR client and the corresponding BSS, BAS MDSS and/or MR may be embodied as the messaging between the WTRU and the MSAD in the 3GPP system.

Regarding the model deployment and collaborative model scoring process in the 3GPP system, the procedure in FIG. 13 may be applied to many other different scenarios in which the collaborations between different BCNs may be in other ways and/or forms.

A given model scoring task and/or request received by MSAD in the 3GPP system may have any of the following alternatives for conducting model scoring among multiple BCNs that run different models (the following alternatives are not just limited to 3GPP system, and they are the supported scenarios of the generic BSS, BAS, MDSS and/or MR services):

- Multiple BCNs host the same model, and each of them may conduct a model scoring process for a part of input data. For example, two BCNs may be running the same model and each of them may evaluate 50% of the input data for model scoring.
- Multiple BCNs host different types of models, and each of them may conduct a model scoring process. The MSAD may choose the one having the highest model scoring result. The result with the highest accuracy may be selected as the final model scoring result.
- Multiple BCNs host and run the same model, where each of them hosts a partial component of the model. For example, a complicated natural network-based AI/ML may have thousands of layers. Some of the BCNs may only host the model with the first 50% layers, and other BCNs host another and/or latter 50% of the total layers. The collaboration between multiple BCNs for model scoring may be realized as a process that, e.g., given the data to be scored, the data may first be evaluated by the BCN with the first 50% of the total layer of the model, then the intermediate result may be sent to the BCN having the second 50% of the total layer of the model. The two BCNs may work together to achieve a complete model scoring.
- Multiple BCNs host different types of models for different purposes. For example, the original data to be analyzed may not be ready to use and certain feature extraction operations may need to be first conducted by using a Model-1 (which may be hosted by a BCN-1 for example). After that, the extracted features produced by Model-1 may need to be sent to another Model-2 to conduct model scoring using Model-2 (hosted by another BCN-2), and Model-2 may produce a final model scoring result.

Representative Middle Layer for Federated Data Management (FDM)

The solutions disclosed herein may be used to support general blockchain-enabled data management for any type of applications (not just limited to FL application as otherwise disclosed herein). For example, a new set of services may be defined as blockchain-enabled Federated Data Management Service (FDMS). The FDMS may provide a number of data management-related operations in the blockchain system and/or data management-related services supported by blockchain system, such as data sharing, data collection, data querying, data discovery, data storage, data marketplace (or any other data management-related operations). The FDMS may be a new middle layer between the upper-layer data management applications and underlying blockchain systems.

Figure 21:
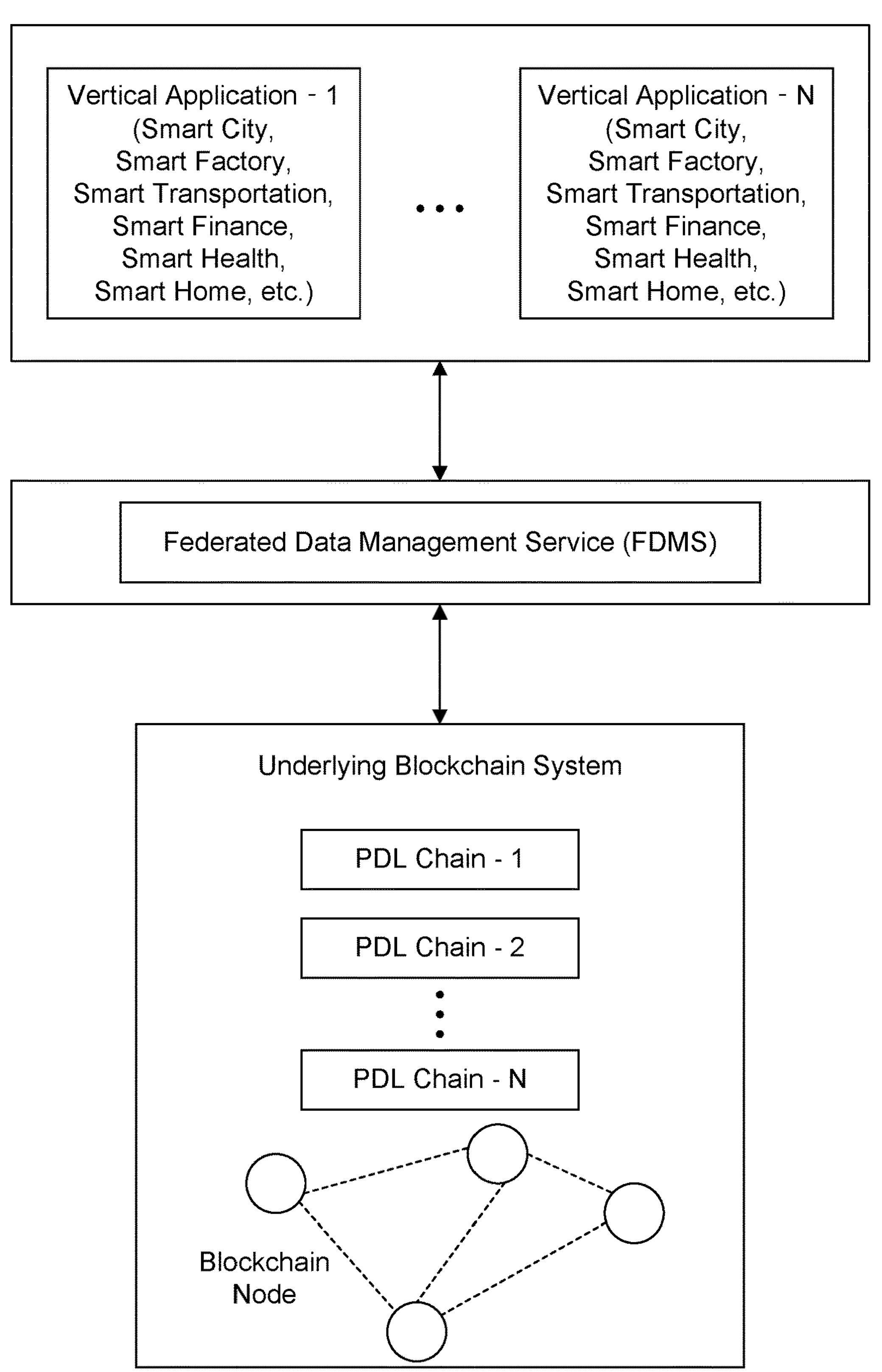
FIG. 21 illustrates a blockchain-enabled federated data management service (FDMS) for enabling federated data management for any type of application.

FIG. 21 illustrates a blockchain-enabled federated data management service (FDMS) for enabling federated data management for any type of application.

For any upper-layer applications, when they want to leverage blockchain system for data sharing, data collection, data querying, data storage, data discovery, data marketplace, etc., they may interact with the FDMS in this middle layer, and (e.g., all) the details regarding how to interoperate with the underlying blockchain system may be handled by this middleware layer. The applications may host certain client-side functionalities of the FDMS. The upper-layer application may interact with the FDMS using a client-server architecture, where the FDMS in the middle layer acts as a server and upper-layer applications may operate as a client. For example, an FDMS client may be hosted on a WTRU, and this client may provide help to WTRU for communicating with the FDMS in the middle layer.

The FDMS may have any of the following capabilities (e.g., for supporting blockchain-enabled data collection):

- For a particular application, if it wants to initiate a particular data collection task, it can send a data collection task request to FDMS.
- The data collection initiator can also indicate which data collectors should participate in the data collection task or the FDMS may analyze the needed information stored in the underlying blockchain system in order to decide a set of qualified data collectors.
- The FDMS can also interact with the underlying blockchain system to create a certain smart contract, in order to build trust as well as the collaborative relationship among the task initiator and the data collectors, if they are not from the same organization and do not trust each other.

An identity of data collector can be assigned by, stored to, and/or managed by underlying blockchain system via the FDMS in the middleware.

The collected data or their hash summaries and/or digests can be written into the blockchain as well. The FDMS may decide how the collected data should be stored in the underlying blockchain system, such as which data should be stored in which particular chain. The FDMS may need to make sure a given data collector has the right privilege to operate the desired chain.

The FDMS can also help to conduct an integrity check for the collected data. For example, once the collected data is sent to the data collection initiator, it may want to make sure whether the data is the original data and did not get tampered with. The data collection initiator can send the hash summary and/or digest to the FDMS and the FDMS may compare this hash summary and/or digest with the records stored in the underlying blockchain system so that the data integrity can be verified.

In the cases where a reward mechanism may be needed in the system, the FDMS can help to create a smart contract for rewards allocation among the different untrusted data collectors. For example, rewards may be allocated based on how much data a given data collector contributes.

Federated data collection usually involves multiple parties (e.g., multiple organizations, multiple data owners, multiple data providers, and/or multiple devices). As a result, the successful completion of a federated data collection process may need to successfully collect the correct/appropriate data from each and every involved party. The FDMS may leverage underlying blockchain system to assist managing a completion of a federated data collection process. For example, an operation of collecting one piece of data from one party may be recorded by the FDMS in a blockchain transaction, which may be sent to the blockchain system by the FDMS. The FDMS may instruct the underlying blockchain system not to generate any new block for these transactions until data collection from all parties may be successfully completed and all corresponding blockchain transactions have been written to underlying blockchain system and have been validated.

The FDMS may have any of the following capabilities (e.g., for supporting blockchain-enabled data sharing, data storage, data discovery and data marketplace), An FDMS client-1 may send the data to be shared to the FDMS and the FDMS may be responsible for storing the data in an appropriate location (e.g., a new transaction in an appropriate chain) in the underlying blockchain system.

An FDMS client-1 may indicate that the data can be shared with various entities and whether the data sharing may be free or not.

Another FDMS client-2 may interface with the FDMS for requiring a particular piece of data shared by FDMS client-1. The FDMS can build a smart contract between FDMS client-1 and FDMS client-2 for this data sharing.

If the data to be shared is stored in a particular chain, then the FDMS may need to and may make sure the FDMS client-2 has the appropriate privileges to access the chain so that the shared data can be retrieved. For example, the FDMS may make sure the access right of client-2 is dynamically adjusted, in order to support the data sharing needs from the upper-layer applications.

If the data sharing is only valid in a limited time period, then the FDMS may need to and may make sure that once the time expires, the FDMS client-2 can no longer retrieve data from the chain.

After FDMS client-2 may receive the data, the rewards may be automatically paid to FDMS client-1.

The FDMS may support advanced data sharing, e.g., one-to-many or many-to-many sharing. For example, by using a blockchain system, a given piece of data created by a FDMS client-1 can be shared and delivered by and/or to multiple other parties (as receivers) in an efficient way. For example, the FDMS may identify whether the multiple data receivers support the same type of multicast mechanism, if so, the data can be multicasted to those receivers.

In addition, a data marketplace can be supported by the FDMS. A data owner or a data provider can publish its data to the FDMS for sharing and/or trading. The FDMS can write the published data or their summaries and/or digest to underlying blockchain systems. Other parties can send a data discovery request to the FDMS to look up and identify the desired data. The FDMS may act as a negotiator between a data provider and a data consumer. A data trading deal may be created as a smart contract and stored in the blockchain system for traceability purposes.

Figure 22:
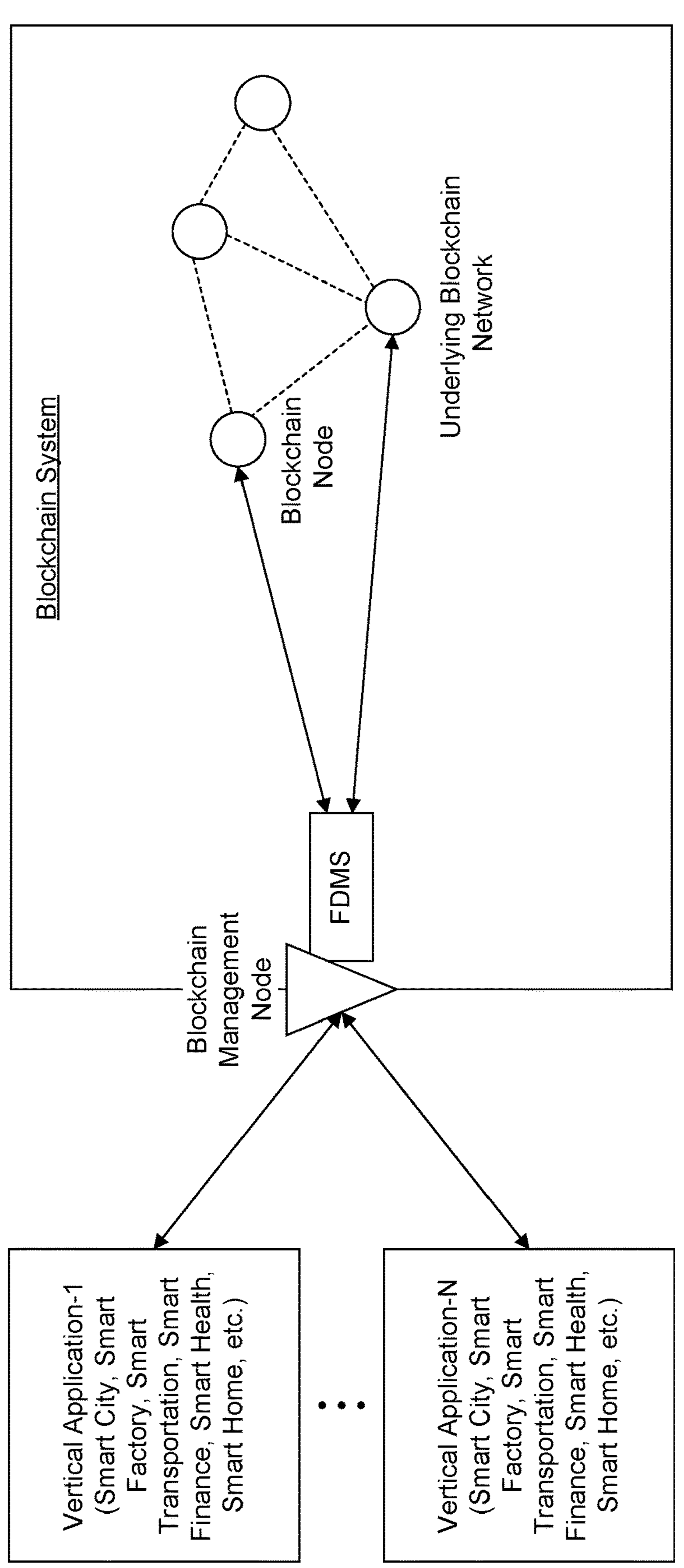
FIG. 22 illustrates an example interoperating architecture for enabling federated data management for any type of application.

FIG. 22 illustrates an example interoperating architecture for enabling federated data management for any type of application (Alternative-1). For general applications, when they want to interoperate with blockchain system for data management operations, they may communicate with a certain blockchain management node having FDMS capability. Such a blockchain management node may be inside the blockchain system or outside the blockchain system. The blockchain management node may be a proxy node or an interworking function node, which may be disposed between and interconnect blockchain system and application-specific system. Similarly, for the applications, they can also host certain client-side functionalities of the FDMS. The applications may interact with the FDMS using a client-server architecture.

Alternatively, the FDMS can directly be deployed on each of the blockchain nodes as well. In such a case, there may not be a blockchain management node in the system.

Figure 23:
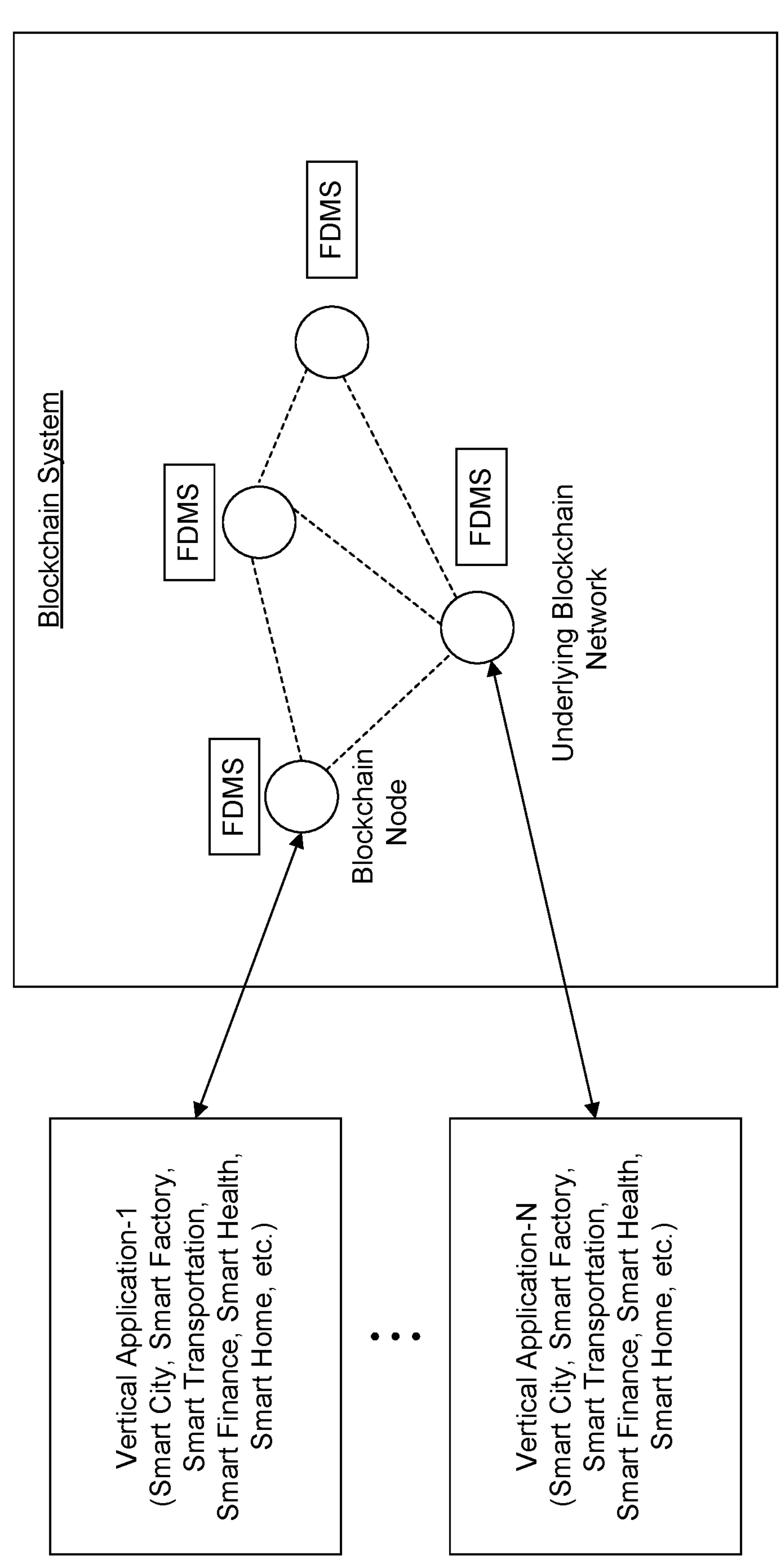
FIG. 23 illustrates an example interoperating architecture for enabling federated data management for any type of application.

FIG. 23 illustrates an example interoperating architecture for enabling federated data management for any type of application (Alternative-2). FIG. 23 illustrates this fully distributed implementation choice for the FDMS service. Similarly, for applications, they can also host certain client-side functionalities of FDMS. The applications may interact with the FDMS using a client-server architecture. For example, an FDMS client may be hosted on a WTRU and this WTRU communicate with the FDMS hosted by blockchain nodes.

Figure 24:
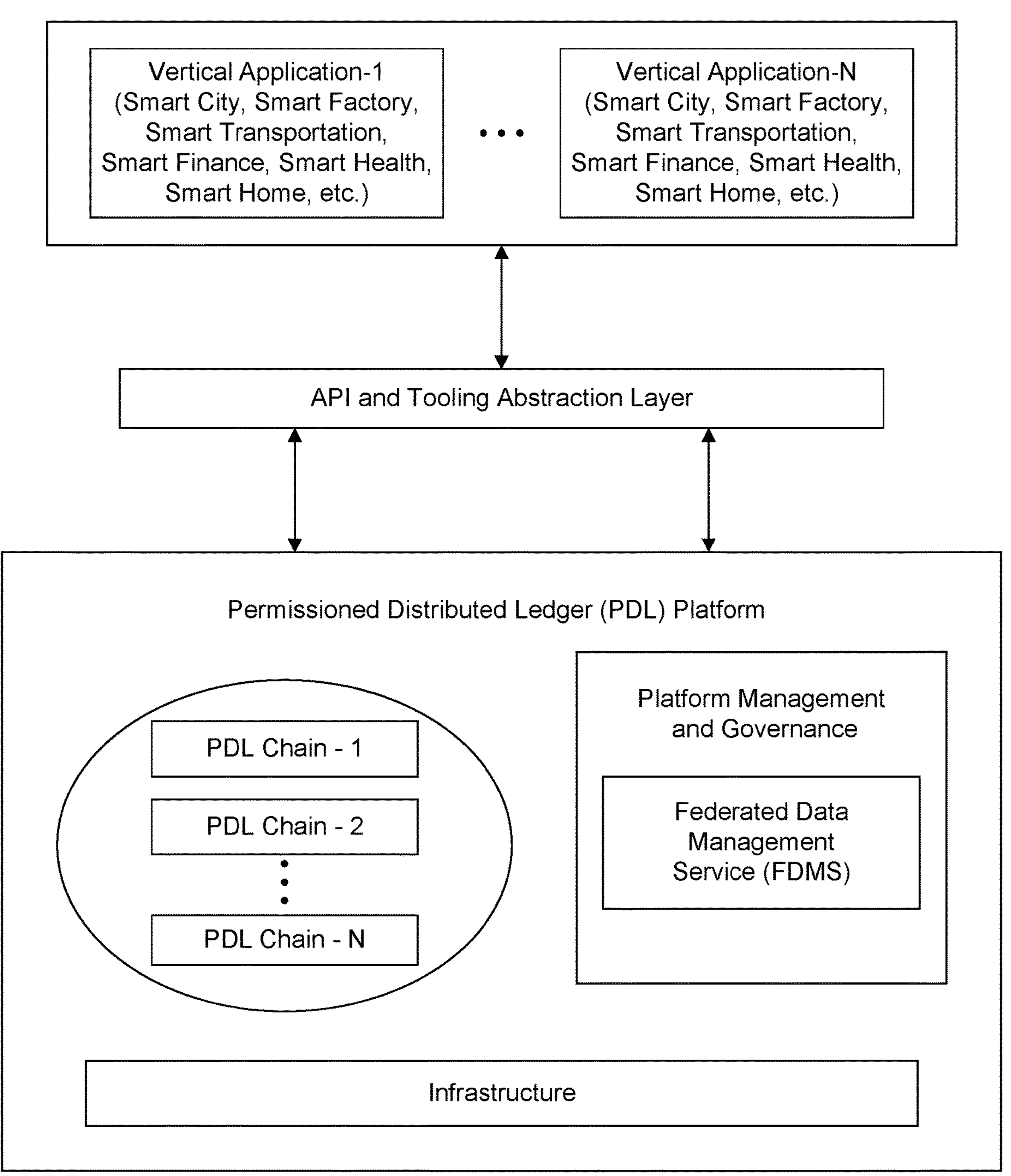
FIG. 24 illustrates an example ETSI PDL embodiment for FDMS.

FIG. 24 illustrates an example ETSI PDL embodiment for the FDMS—Alternative Embodiment 1. FIG. 24 illustrates the PDL embodiment for the FDMS. The FDMS may be regarded as new services of the PDL platform management and governance module. Alternatively, the FDMS can be implemented as a part of API and a tooling abstraction layer. Alternatively, the FDMS can be implemented as a part of the common function in the ETSI PDL framework.

Figure 25:
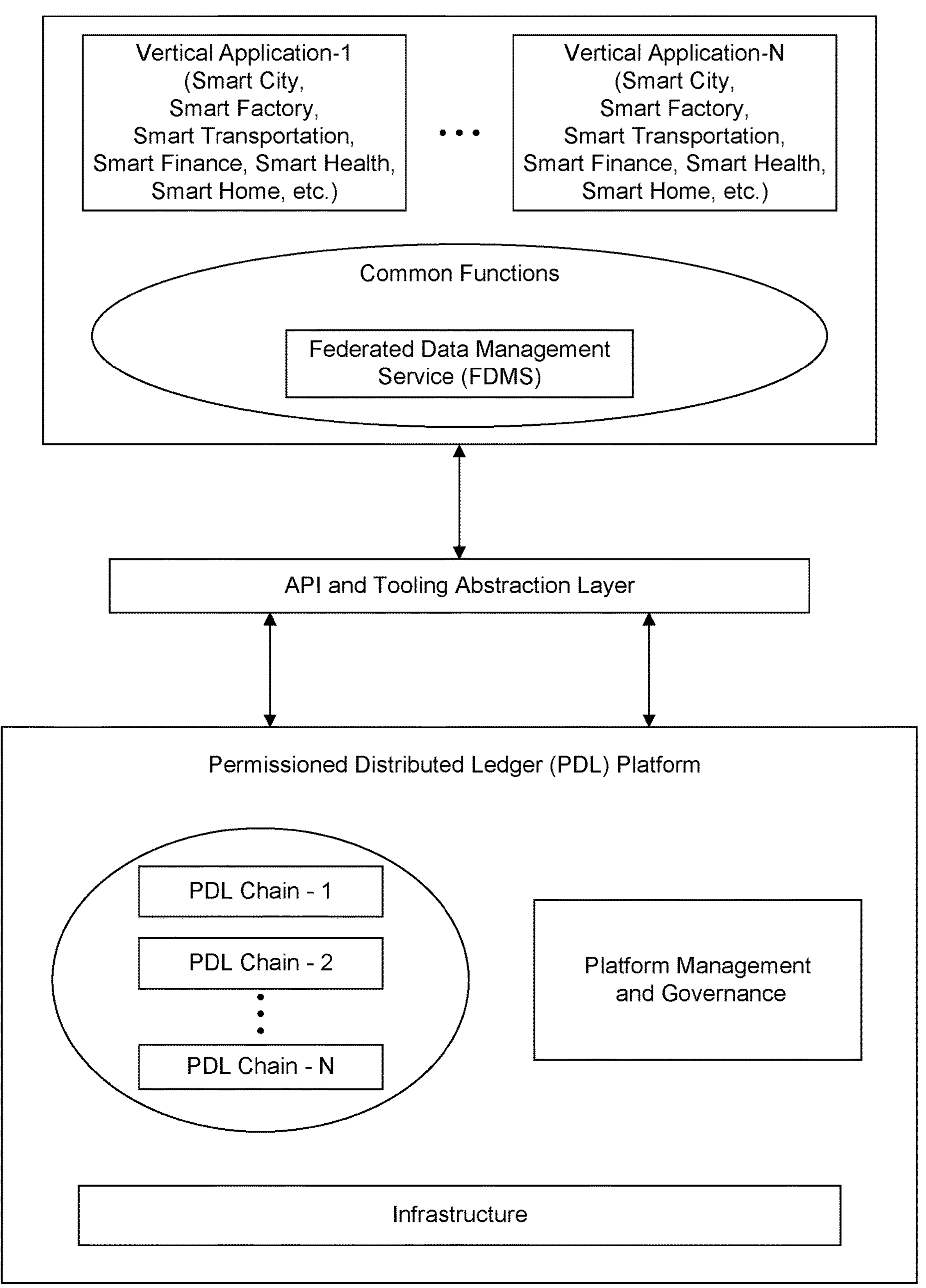
FIG. 25 illustrates an example ETSI PDL embodiment for FDMS.

FIG. 25 illustrates an example ETSI PDL embodiment for FDMS, in which FDMS is part of common functions. There is another way to define the interaction between the FDM system and PDL system. In the context of PDL-based Federated Data Management (FDM), there are two separate systems, e.g., PDL system and FDM system. The FDM system consists of FDM nodes. Each FDM node has traditional FDM functions. The PDL system includes PDL nodes and each PDL node has PDL functions. To leverage PDL, these two systems need to interact with each other. The proposed FDMS can be implemented by an FDM-PDL Proxy, which is included as a logical entity to connect both systems. A primary component of the FDM-PDL Proxy (FPP) is a FDM service (FDMS). Via the FDMS, the FDM system may access PDL systems, for instance, to store FDM-related operation records to a PDL chain. The FDMS may provide the following functions: 1) find appropriate PDL chains from PDL system based on requirements from FDM system; 2) interact with PDL system on behalf of FDM system; 3) buffer and send requests from FDM system to PDL system; and 4) buffer and forward notifications and/or responses from PDL system to FDM system. As a logical entity, the FPP may be integrated with PDL system. In an embodiment, the FPP may be implemented as a part of common functions in a PDL framework. In this embodiment, the FDM applications may leverage the FPP to access other Common Functions, and to access the API and a tooling abstraction layer. In an embodiment, the FPP may be implemented as a part of the API and the tooling abstraction layer. The FDM applications may use FPP and other APIs to access PDL platform. In an embodiment, the FPP may be implemented as a part of platform, governance and interoperability support. With this embodiment, the FPP can access PDL platform information and thus it can help find appropriate PDL chains for different FDM applications. Alternatively, another distributed architectural solution is to integrate traditional FDM functions, PDL functions, and FPP into each FDM node. In an embodiment, each FDM node is extended to have FPP and PDL functions. The FDM functions within a FDM node invoke PDL functions via the FPP. In an embodiment, the FDM functions in one FDM node can interact FDM functions within another FDM node via FPP and underlying PDL functions in each FDM node. The FDM functions in two or more FDM nodes exchange messages via underlying PDL functions and PDL networks. In an embodiment, the FDM functions may be leveraged for managing underlaying PDL functions and PDL networks, especially from PDL-related data management.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A method, implemented in a transmit and receive unit, to enable storage of distributed learning data, the method comprising:

receiving, from a client device via any of wired and wireless communications, information indicating a blockchain storage request, including information associated with a distributed task;

obtaining information identifying one or more blockchains based on a blockchain storage solution, wherein the blockchain storage solution is based on the information indicating a blockchain storage request, and wherein obtaining information identifying one or more blockchains comprises identifying, based on the blockchain storage solution, an availability of one or more blockchains in a blockchain system;

determining instructions based on the blockchain storage solution, wherein the instructions comprise at least some of the information identifying one or more blockchains, and wherein the instructions specify a first blockchain for storing a first version of a model update and a second blockchain, different from the first blockchain, for storing a second version of the model update; and transmitting the instructions, via any of wired and wireless communications, to a plurality of participant nodes configured to participate in generating the distributed learning data.

2. The method of claim 1, comprising:

determining the blockchain storage solution based on the information indicating a blockchain storage request.

3. The method of claim 1, wherein obtaining information identifying one or more blockchains comprises:

obtaining, from the blockchain system, information identifying at least one blockchain created by the blockchain system responsive to a request, sent from the transmit and receive unit, to create the at least one blockchain, the request being sent via any of wired and wireless communications and responsive to a determination based on an amount of available blockchains in the blockchain system and the blockchain storage solution.

4. The method of claim 1, wherein the one or more blockchains are at one or more of a plurality of nodes of the blockchain system, and wherein the information identifying one or more blockchains comprises information identifying the one or more of the plurality of nodes.

5. The method of claim 1, wherein the instructions are configured to implement the blockchain storage solution.

6. The method of claim 1, wherein the information indicating a blockchain storage request indicates the blockchain storage request is for a distributed task.

7. The method of claim 1, wherein the information indicating a blockchain storage request comprises an identifier of the distributed task.

8. The method of claim 1, wherein the client device comprises an application, and wherein at least one of (i) the blockchain storage request is initiated from the application executing at the transmit and receive unit or at another transmit and receive unit, and (ii) the information indicating a blockchain storage request is received from the application executing at the transmit and receive unit or at another transmit and receive unit.

9. The method of claim 1, wherein:

the first version is a full version; and the second version is a tailored version.

10. The method of claim 1, wherein the blockchain storage request indicates a model-tailoring operation and an entity or node to conduct the tailoring.

11. A transmit and receive unit comprising circuitry, including a transmitter, a receiver, a processor and memory, and configured to:

receive, from a client device via any of wired and wireless communications, information indicating a blockchain storage request, including information associated with a distributed task;

obtain information identifying one or more blockchains based on a blockchain storage solution, wherein the blockchain storage solution is based on the information indicating a blockchain storage request, and wherein obtaining information identifying one or more blockchains comprises identifying, based on the blockchain storage solution, an availability of one or more blockchains in a blockchain system;

determine instructions based on the blockchain storage solution, wherein the instructions comprise at least some of the information identifying one or more blockchains, and wherein the instructions specify a first blockchain for storing a first version of a model update and a second blockchain, different from the first blockchain, for storing a second version of the model update; and transmit the instructions, via any of wired and wireless communications, to a plurality of participant nodes configured to participate in generating distributed learning data.

12. The transmit and receive unit of claim 11, configured to:

determine the blockchain storage solution based on the information indicating a blockchain storage request.

13. The transmit and receive unit of claim 11, wherein the transmit and receive unit being configured to obtain information identifying one or more blockchains comprises the transmit and receive unit being configured to:

obtain, from the blockchain system, information identifying at least one blockchain created by the blockchain system responsive to a request, sent from the transmit and receive unit, to create the at least one blockchain, the request being sent via any of wired and wireless communications and responsive to a determination based on availability of one or more blockchains in a blockchain system and the blockchain storage solution.

14. The transmit and receive unit of claim 11, wherein the one or more blockchains are at one or more of a plurality of nodes of the blockchain system, and wherein the information identifying one or more blockchains comprises information identifying the one or more of the plurality of nodes.

15. The transmit and receive unit of claim 11, wherein the instructions are configured to implement the blockchain storage solution.

16. The transmit and receive unit of claim 11, wherein the information indicating a blockchain storage request indicates the blockchain storage request is for the distributed task.

17. The transmit and receive unit of claim 11, wherein the information indicating a blockchain storage request comprises an identifier of a distributed task.

18. The transmit and receive unit of claim 11, wherein the client device comprises an application, and wherein at least one of (i) the blockchain storage request is initiated from the application executing at the transmit and receive unit or at another transmit and receive unit, and (ii) the information indicating a blockchain storage request is received from the application executing at the transmit and receive unit or at another transmit and receive unit.

19. The transmit and receive unit of claim 11, wherein:

the first version is a full version; and the second version is a tailored version.

20. The transmit and receive unit of claim 11, wherein the blockchain storage request indicates a model-tailoring operation and an entity or node to conduct the tailoring.

* * * * *